US012561626B2

(12) United States Patent
DaCosta et al.

(10) Patent No.: US 12,561,626 B2
(45) Date of Patent: *Feb. 24, 2026

(54) INTERACTIVE NETWORK AND METHOD FOR SECURING CONVEYANCE SERVICES

(71) Applicant: TELEPORT MOBILITY, INC., San Diego, CA (US)

(72) Inventors: Alexis DaCosta, San Diego, CA (US); Vince Coletti, San Marcos, CA (US)

(73) Assignee: TELEPORT MOBILITY, INC., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/087,762

(22) Filed: Dec. 22, 2022

(65) Prior Publication Data

US 2023/0162107 A1 May 25, 2023

Related U.S. Application Data

(60) Continuation of application No. 17/397,858, filed on Aug. 9, 2021, now Pat. No. 11,574,264, which is a
(Continued)

(51) Int. Cl.
*H04W 4/029* (2018.01)
*G01C 21/34* (2006.01)
(Continued)

(52) U.S. Cl.
CPC ... *G06Q 10/063114* (2013.01); *G01C 21/343* (2013.01); *G01C 21/3438* (2013.01);
(Continued)

(58) Field of Classification Search
CPC ........... G06Q 10/063114; G06Q 10/02; G06Q 10/063112; G06Q 10/06316;
(Continued)

(56) References Cited

U.S. PATENT DOCUMENTS

| 10,169,804 B2 * | 1/2019 | Thangaraj | G01C 21/34 |
| 2003/0139950 A1 * | 7/2003 | Daum | G06Q 10/02 |
| | | | 705/5 |

(Continued)

FOREIGN PATENT DOCUMENTS

| WO | WO-2004013733 A2 * | 2/2004 | G06Q 10/02 |
| WO | WO-2016113602 A1 * | 7/2016 | G06Q 10/02 |

OTHER PUBLICATIONS

A. Dorofeev, "Development of Internet-Based Applications for Fleet Management and Logistics," 2013 IEEE 15th Conference on Business Informatics, Vienna, Austria, 2013, pp. 428-432, doi: 10.1109/CBI.2013.69. (Year: 2013).*

(Continued)

*Primary Examiner* — Crystol Stewart
(74) *Attorney, Agent, or Firm* — Eleanor Musick; Torrey Pines Law Group PC

(57) ABSTRACT

The inventive platform and method enhance the efficiency of systems in the interactive conveyance industry for goods and services by providing for the filtering, selection and securing of conveyance services in accordance with one or more of client and representative preferences in substantially real time.

54 Claims, 14 Drawing Sheets

Related U.S. Application Data continuation of application No. 17/124,833, filed on Dec. 17, 2020, now Pat. No. 11,087,253, which is a continuation of application No. 16/222,817, filed on Dec. 17, 2018, now Pat. No. 11,182,709, which is a continuation-in-part of application No. PCT/US2018/043359, filed on Jul. 24, 2018, and a continuation-in-part of application No. PCT/US2018/043363, filed on Jul. 24, 2018, and a continuation-in-part of application No. 16/038,487, filed on Jul. 18, 2018, now Pat. No. 11,087,252, which is a continuation-in-part of application No. 15/680,439, filed on Aug. 18, 2017, now Pat. No. 11,087,250, which is a division of application No. 15/675,757, filed on Aug. 13, 2017, now Pat. No. 11,176,500.

(60) Provisional application No. 62/539,706, filed on Aug. 1, 2017, provisional application No. 62/482,306, filed on Apr. 6, 2017, provisional application No. 62/426,549, filed on Nov. 27, 2016, provisional application No. 62/375,491, filed on Aug. 16, 2016.

(51) Int. Cl.

| | |
|---|---|
| *G06F 16/2457* | (2019.01) |
| *G06F 16/248* | (2019.01) |
| *G06Q 10/02* | (2012.01) |
| *G06Q 10/0631* | (2023.01) |
| *G06Q 10/0833* | (2023.01) |
| *G06Q 30/0601* | (2023.01) |
| *G06Q 50/40* | (2024.01) |
| *G06Q 50/47* | (2024.01) |
| *G06Q 50/60* | (2024.01) |
| *G08G 1/00* | (2006.01) |
| *G08G 1/005* | (2006.01) |
| *G08G 1/127* | (2006.01) |
| *G08G 5/55* | (2025.01) |
| *G08G 5/56* | (2025.01) |
| *G08G 5/57* | (2025.01) |
| *H04W 4/20* | (2018.01) |
| *H04W 4/42* | (2018.01) |
| *G06F 3/0485* | (2022.01) |

(52) U.S. Cl.
CPC ....... *G06F 16/24578* (2019.01); *G06Q 10/02* (2013.01); *G06Q 10/063112* (2013.01); *G06Q 10/06316* (2013.01); *G06Q 30/0629* (2013.01); *G06Q 30/0633* (2013.01); *G06Q 30/0635* (2013.01); *G06Q 50/47* (2024.01); *G08G 1/005* (2013.01); *G08G 1/127* (2013.01); *G08G 1/202* (2013.01); *G08G 5/55* (2025.01);

*G08G 5/56* (2025.01); *G08G 5/57* (2025.01); *H04W 4/029* (2018.02); *H04W 4/20* (2013.01); *H04W 4/42* (2018.02); *G01C 21/34* (2013.01); *G06F 3/0485* (2013.01); *G06F 16/248* (2019.01); *G06Q 10/0833* (2013.01); *G06Q 50/40* (2024.01); *G06Q 50/60* (2024.01)

(58) Field of Classification Search
CPC .......... G06Q 30/0633; G06Q 10/0833; G06Q 50/30; G06Q 50/32; G06Q 30/0629; G06Q 50/47; G01C 21/343; G01C 21/34; G01C 21/3438; G05D 1/00; G06F 16/24578; G06F 3/0485; G06F 16/248; G06F 3/0482; G06F 3/04847; G06F 16/245; G08G 1/123; G08G 1/127; G08G 1/202; B60W 60/00253
See application file for complete search history.

(56) References Cited

U.S. PATENT DOCUMENTS

| | | | | |
|---|---|---|---|---|
| 2006/0059023 | A1* | 3/2006 | Mashinsky | G06Q 10/02 705/5 |
| 2009/0240515 | A1* | 9/2009 | Trossen | H04L 67/53 705/346 |
| 2013/0311211 | A1* | 11/2013 | Zafar | G06Q 10/02 705/5 |
| 2014/0026065 | A1* | 1/2014 | Wang | G06F 3/0484 715/744 |
| 2014/0067491 | A1* | 3/2014 | James | G06Q 10/02 705/13 |
| 2014/0173511 | A1* | 6/2014 | Lehmann | G06Q 10/02 715/810 |
| 2015/0206267 | A1* | 7/2015 | Khanna | G06Q 50/30 705/417 |
| 2016/0026936 | A1* | 1/2016 | Richardson | G06Q 10/02 705/5 |
| 2016/0356615 | A1* | 12/2016 | Arata | G01C 21/3438 |
| 2016/0370194 | A1* | 12/2016 | Colijn | G08G 1/202 |
| 2017/0011324 | A1* | 1/2017 | Truong | G06Q 50/60 |
| 2018/0025407 | A1* | 1/2018 | Zhang | G06Q 10/02 705/26.81 |
| 2018/0046981 | A1* | 2/2018 | Honig | G06Q 10/0637 |

OTHER PUBLICATIONS

M. Piorkowski, "Collaborative Transportation Systems," 2010 IEEE Wireless Communication and Networking Conference, Sydney, NSW, Australia, 2010, pp. 1-6 (Year: 2010).*

* cited by examiner

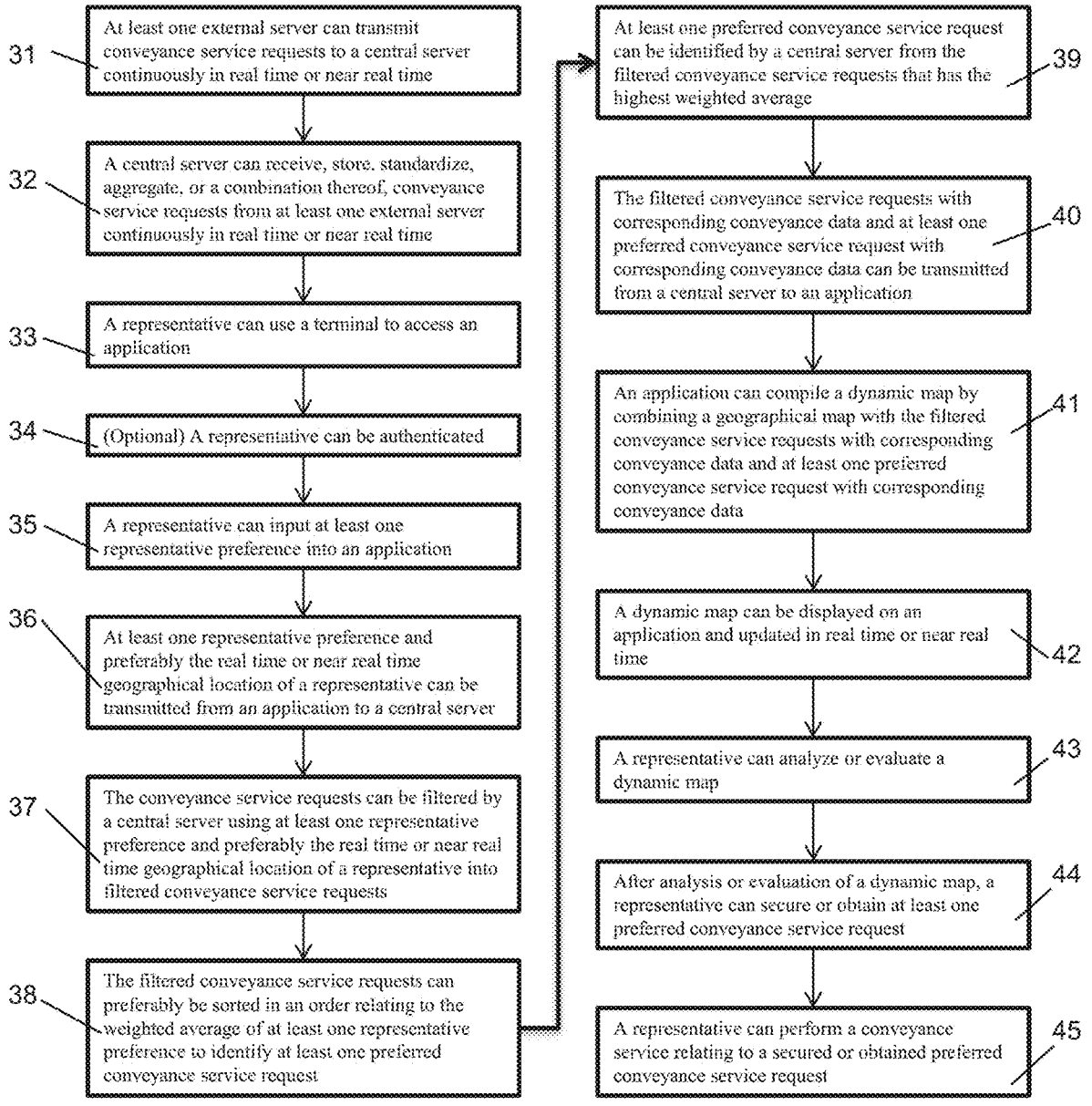

31 — At least one external server can transmit conveyance service requests to a central server continuously in real time or near real time 32 — A central server can receive, store, standardize, aggregate, or a combination thereof, conveyance service requests from at least one external server continuously in real time or near real time 33 — A representative can use a terminal to access an application 34 — (Optional) A representative can be authenticated 35 — A representative can input at least one representative preference into an application 36 — At least one representative preference and preferably the real time or near real time geographical location of a representative can be transmitted from an application to a central server 37 — The conveyance service requests can be filtered by a central server using at least one representative preference and preferably the real time or near real time geographical location of a representative into filtered conveyance service requests 38 — The filtered conveyance service requests can preferably be sorted in an order relating to the weighted average of at least one representative preference to identify at least one preferred conveyance service request 39 — At least one preferred conveyance service request can be identified by a central server from the filtered conveyance service requests that has the highest weighted average 40 — The filtered conveyance service requests with corresponding conveyance data and at least one preferred conveyance service request with corresponding conveyance data can be transmitted from a central server to an application 41 — An application can compile a dynamic map by combining a geographical map with the filtered conveyance service requests with corresponding conveyance data and at least one preferred conveyance service request with corresponding conveyance data 42 — A dynamic map can be displayed on an application and updated in real time or near real time 43 — A representative can analyze or evaluate a dynamic map 44 — After analysis or evaluation of a dynamic map, a representative can secure or obtain at least one preferred conveyance service request 45 — A representative can perform a conveyance service relating to a secured or obtained preferred conveyance service request

FIG. 3

INTERACTIVE NETWORK AND METHOD FOR SECURING CONVEYANCE SERVICES

RELATED APPLICATIONS

This is a continuation of U.S. application Ser. No. 17/397,858, filed Aug. 9, 2021, issued as U.S. Pat. No. 11,574,264, which is a continuation of U.S. application Ser. No. 17/124,833, filed Dec. 17, 2020, issued as U.S. Pat. No. 11,087,253, which is a continuation of U.S. application Ser. No. 16/222,817, filed Dec. 17, 2018, which is a continuation-in-part of PCT Application No. PCT/US18/043363, filed Jul. 24, 2018, and is a continuation-in-part of PCT Application No. PCT/US18/043359, filed Jul. 24, 2018, and is a continuation-in-part of U.S. application Ser. No. 16/038,487, filed Jul. 18, 2018, issued as U.S. Pat. No. 11,087,252, which is a continuation-in-part of U.S. application Ser. No. 15/680,439, filed Aug. 18, 2017, issued as U.S. Pat. No. 11,087,250, which is a divisional of U.S. application Ser. No. 15/675,757, filed Aug. 13, 2017, issued as U.S. Pat. No. 11,176,500, which claims benefit of the priority of each of U.S. Provisional Application No. 62/539,706, filed Aug. 1, 2017, U.S. Provisional Application No. 62/482,306, filed Apr. 6, 2017, U.S. Provisional Application No. 62/426,549, filed Nov. 27, 2016, and U.S. Provisional Application No. 62/375,491 filed Aug. 16, 2016, the disclosure of each of which is incorporated herein by reference in its entirety.

FIELD OF THE INVENTION

The present invention relates generally to the field of conveyance service management and more particularly to an interactive network and method for offering, managing and securing conveyance services in substantially real time based on a representative's preferences.

BACKGROUND

As in many new industries, there are inefficiencies in existing support systems and methods due to the lack of experience in optimizing these systems for the needs of the new industry. These inefficiencies are typically identified over time through trial and error, eventually leading to technological advancement in the field. This generalization holds true for the conveyance industry, which includes a large number of new industry segments such as ride-hail, rideshare, and on-demand delivery services.

The existing inefficient support systems and methods available to many conveyance industry segments impose disadvantages on nearly all involved: the clients, the service providers, and the representatives who perform the services on behalf of the service providers.

Many failings within the existing systems and methods are rooted in computer technology and tied to the fact that the modern conveyance industry segments operate and change quite rapidly: a conveyance service offering that is available one minute can be snapped up by another client in the next minute, or a service request can be answered by another representative before the service provider can respond and dispatch its representative. In the fast pace of the conveyance industry segment, neither representatives nor conveyance clients can procure the available information and evaluate it rapidly and accurately to make a well-informed decision on the fly. There is currently no system available to assist both representatives and conveyance clients with the rapid processing capability needed to keep up with the rate of change. This lack of a real time or near real time capability leads to a representative obtaining a suboptimal, one-size-fits-all conveyance service request and a conveyance client obtaining a suboptimal, one-size-fits-all conveyance service offering due to the inability to easily and rapidly apply their own preferences.

Currently, a conveyance client requesting a ride in the ride-hail industry segment is offered different ride options, prices, wait times, and times to destination depending on which service provider is offering a given conveyance service and when the conveyance service offering is secured. Often, a conveyance client is provided options of conveyance service offerings from only one service provider to accept or decline. A representative is limited even further as only one conveyance service request is shown when a representative wants to provide a conveyance service in any conveyance industry segment. The current approaches for matching up representatives with conveyance service requests, and conveyance service offerings to conveyance clients, is inefficient and wasteful.

The current systems and methods for a representative to analyze incoming conveyance service requests are very difficult and time consuming in the fast-paced, real time or near real time environment of conveyance industry segments. The current technology does not permit a representative to analyze or evaluate and then accept conveyance service requests that the representative would prefer based on their individual preferences. Representatives are currently given a single conveyance service request and only have the option of accepting or declining that specific conveyance service request, without an alternative. Frequently, the details of a conveyance service request that a representative is responding to are not provided in advance, but are only revealed after that conveyance service request has already been secured. Thus, a representative is forced to either blindly accept a conveyance service request or decline to work at all.

In addition, a representative will often be penalized for canceling a conveyance service request that they may not wish to fulfill, even when the representative would ordinarily not have accepted the request in the first place had they been given a choice. This disadvantage, among others, has led to the common practice of representatives working for more than one service provider at the same time to allow some semblance of choice. However, the effort required to evaluate incoming requests from multiple service providers injects its own delays and detracts from the ability to rapidly respond as needed in the substantially real time environment of conveyance industry segments. Specifically, to evaluate conveyance service requests, a representative would have to login to multiple applications from different service providers and navigate between these applications, viewing one individual conveyance service request per application. The serial approach to evaluating conveyance service requests can cause a representative to miss out on desirable conveyance service requests that a representative might have preferred. Currently there is no system that permits the simultaneously evaluation of multiple conveyance service requests from multiple service providers in substantially real time.

Without a way to evaluate conveyance service requests continuously in substantially real time, a representative currently cannot maximize their efforts as efficiently as they would like. To secure a preferred conveyance service request, a representative might be tempted to forego less desirable conveyance service requests in the hope that a more preferred request to become available, but this risks missing out on income if none comes along.

There is also currently no system or method to evaluate and secure conveyance service requests in real time or near real time across more than one conveyance industry segment. The absence of this capability further limits a representative's exposure in the conveyance industry and their ability to operate more efficiently if the representative wants to provide conveyance services across conveyance industry segments. In addition, current limitations also reduce the amount of potential preferred conveyance service requests available to a representative. For example, if a representative wants to provide a ride in the ride-hail industry segment, then deliver food in the good delivery industry segment to take advantage of overlaps in locations or routes, the representative does not have the ability to evaluate and secure the requests in real time or near real time. If there were a system and method to allow a representative to easily work across industry segments, the representative would have access to a greater number of diverse conveyance service requests allowing more efficient use of their time and vehicle resources.

Currently, some service providers dynamically increase prices in certain areas for various reasons. Representatives looking to work more efficiently or earn more money try to work in these areas as much as possible, however, by the time a representative gets to the area with elevated pricing, the increased pricing may have moved or been removed. Representatives experience the challenge of chasing the elevated pricing areas but often cannot capitalize on them. This problem could be addressed by providing a tool to allow representatives to predict where the areas of elevated pricing will be in order to maximize their earning potential.

Conveyance clients often experience the same or similar challenges as representatives experience. For example, when a conveyance client is looking to secure a conveyance service offering, the conveyance client is only shown the closest representatives from an individual service provider. The only way for conveyance clients to evaluate conveyance service offerings from a number of different service providers is a very tedious and time-consuming process similar to that for representatives. It also assumes that the conveyance client would be aware that there is a competitor available, access to which would require downloading the competitor's application, and inputting the same search criteria that was entered for the first service provider. This process would need to be repeated for each additional competitor the client might wish to evaluate—an arduous process that likely leads to frustration more often than success.

In fast-paced conveyance industry segments, where seconds matter in being able to secure a preferred conveyance service offering, existing approaches are not practical for quickly analyzing conveyance service offerings. In most cases, by the time a conveyance client goes through the steps of considering the services offered by two or three different service providers, the preferred offering may no longer available. As a result, a conveyance client often pays more or waits longer for a conveyance service than needed. Existing technology is also lacking in a way to dynamically and visually present updated offerings from multiple service providers in an interactive manner.

Further, when service providers increase their pricing in certain areas, conveyance clients currently do not have a means to determine if there is an area nearby that does not have elevated pricing. Currently, there is no way for a conveyance client to visually analyze or evaluate different areas on a geographical map to see pricing information for an individual service provider, much less for multiple service providers. This lack in transparency denies clients the opportunity to make an informed purchasing decisions. In view of the foregoing, it is clear that the conveyance industry has many unmet needs for improvement.

SUMMARY

In one aspect of the invention, an interactive network and method are provided for requesting, offering, managing, obtaining, and/or providing conveyance services for transportation of persons or objects within a variety of different conveyance industries.

In another aspect of the invention, an interactive network and method are provided for managing and/or optimizing efficiency within businesses that provide and/or operate conveyance services and vehicles for transportation of persons or objects within a variety of different industries.

The inventive approach provides improvements including visual displays of preferred conveyance service requests from multiple service providers on a geographical map with dynamic icons that can be updated in real time or near real time. These visual presentations assist representatives and/or conveyance clients in quickly identifying and securing preferred conveyance services.

BRIEF DESCRIPTION OF THE DRAWINGS

FIG. 3 is a flow diagram of steps according to an embodiment of the present invention that utilizes representative preferences.

DETAILED DESCRIPTION OF EMBODIMENTS

Definitions

Figure 1:
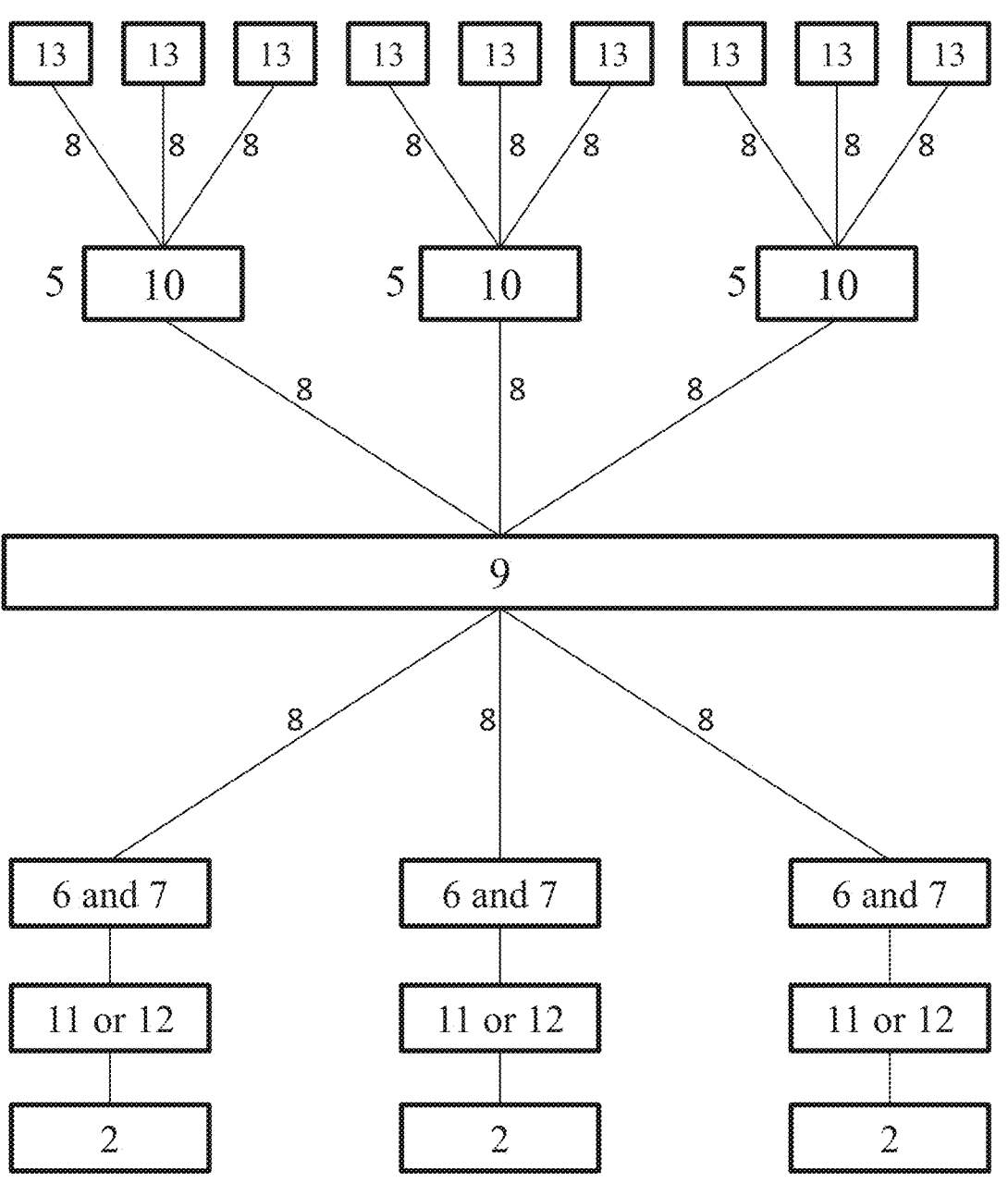
FIG. 1 is a high-level schematic of a conveyance system according to one embodiment of the present invention that utilizes representative preferences.

Unless defined otherwise, all technical and scientific terms used herein have the plain and ordinary meaning as would be understood by a person of skill in the art. Unless expressly limited, where a term is provided in the singular, the description contemplates the plural of that term, and where a term is provided in the plural, the inventors also contemplate the singular of that term. To provide a clarifying example, when an object is described, unless that object is expressly described as a single object, "one or more object", or "at least one object" also falls within the meaning of that term.

In an exemplary embodiment, the present invention includes several general and useful aspects, including an interactive system in the conveyance and other industries and a method of use of the interactive system of the present invention. In one aspect, the present invention can be a technology-based solution that can use a real time or near real time system, i.e., substantially real time, and a real time or near real time method to assist one or more representative in analyzing or evaluating and then securing one or more preferred conveyance service request using a visual representation of the present invention.

The inventive network and method are configured to receive and filter conveyance service requests based on one or more representative preference and one or more substantially real time geographical location of the representative (s). The present invention can identify one or more preferred conveyance service request from one or more filtered conveyance service request. A visual representation of a filtered conveyance service request with corresponding conveyance data, a preferred conveyance service request with corresponding conveyance data, or a combination thereof, can be compiled with a geographical map on an application. The present invention can provide a representative with a visual tool to help evaluate and then secure a preferred conveyance service request.

One example of a visual representation within the inventive scheme is a dynamic map. The dynamic map can be a geographical map that displays one or more preferred conveyance service requests with corresponding conveyance data, a filtered conveyance service request with corresponding conveyance data, or a combination thereof. A dynamic map can display the geographical location of a conveyance client, a beginning service geographical location, an ending service geographical location, pricing information, or combinations thereof. The representative can visually identify one or more preferred conveyance service request to make well-informed decisions when evaluating and then securing a preferred conveyance service request. An important improvement provided by the invention approach is that a conveyance client, service provider, good supplier, corresponding conveyance service request, or combinations thereof, can be displayed individually as visually distinct features, each of which can be updated in real time or near real time.

Another example of a visual representation within the inventive scheme is a heat map, which is a geographical map in which an area can be shaded, colored, patterned, or a combination thereof, in proportion to a measurement of one or more statistical variable to assist the representative when evaluating a conveyance service request. Heat maps may be used to display substantially real time data or historical data or may be predictive.

Predictive heat maps display information compiled from one or more statistical variable of a real time or near real time filtered conveyance service request, a past filtered conveyance service request, or a combination thereof. The predictive heat map can estimate a future supply, future demand, a future statistical variable, or a combination thereof. In some embodiments, the predictive heat map can employ machine learning technology for generating the predictions.

Historical heat maps can display information compiled from one or more statistical variable of a past filtered conveyance service request. The historical heat map can show past supply, past demand, one or more past statistical variable, or a combination thereof.

The visual representation can be a combination of dynamic maps and heat maps. This combination map may be configured to allow the representative to view one or more service provider operating within a conveyance industry segment on both macro and micro levels.

A key feature of the inventive scheme is the improved display of information to facilitate different approaches to evaluate available services requests and options. For example, a dynamic map of the present invention allows a representative to visually distinguish between preferred conveyance service requests and filtered conveyance service requests. The representative can use heat maps to determine whether a given geographical location is a desirable area to work in. This highly visual approach gives the representative quick insights for securing conveyance service requests particularly because the visual representation can be updated continuously in substantially real time.

Another benefit of the inventive approach is the ability to generate new data that can be useful to the representative. In one embodiment, the predictive function can transform real time and/or past filtered conveyance service requests, into a predictive heat map that the representative can employ to meet their work/revenue goals. Predictive heat maps help avoid missed opportunities that result from chasing an area of elevated pricing. For example, a predictive heat map can provide the representative with new data for analysis based on combinations of real time and/or past filtered conveyance service requests and can utilize machine learning technology to predict future supply or future demand.

The inventive approach also increases the representative's ability to interact with one or more of the conveyance client, the good or service provider, or a combination thereof, due to increased insight into the conveyance industry segment. The present invention provides a tool for presenting one or more preferred conveyance service request, one or more filtered conveyance service request, conveyance data, or a combination thereof, to be analyzed or evaluated by the representative.

The inventive approach enhances the representative's decision-making ability, allowing the representative to use one or more representative preference, improving the ability for the representative to secure the most preferred conveyance service request available at that time.

In some embodiments, the inventive network and method can be configured to receive and filter conveyance service offerings based on conveyance client preference and the substantially real time geographical location of the client.

The inventive approach can identify a preferred conveyance service offering from a filtered conveyance service offering. A visual representation of a filtered conveyance service offering with corresponding conveyance data, a preferred conveyance service offering with corresponding conveyance data, or a combination thereof, can be compiled with a geographical map for display. The inventive system provides a conveyance client with a visual tool to help evaluate and then secure a preferred conveyance service offering.

Visual representations of the conveyance service offerings can be displayed alone or in combinations in a similar manner to that described above for displaying conveyance service requests. Specifically, dynamic and/or heat maps can be displayed to allow the conveyance client to visually identify preferred conveyance service offering(s) to make a well-informed decision when evaluating and then securing the offerings. A dynamic map can display one or more of geographical location of the representative, a beginning service geographical location, an ending service geographical location, pricing information, or a combination thereof using visually distinguishable symbols for various providers and offerings, or combinations thereof, which can be updated in substantially real time.

In a similar manner to that described above with regard to conveyance service requests, heat maps can be used to assist conveyance clients in evaluating conveyance service offerings by displaying conveyance service offerings, or parameters thereof, that are real time, predictive, and/or historical.

The visual representations used to display the conveyance service offerings can be a combination of one or more dynamic map and heat map, allowing the conveyance client to view one or more service provider operating within a conveyance industry segment on both a macro and micro level.

The improved visualization described herein give conveyance clients the tool to easily identify and select a preferred conveyance service offering relative to filtered conveyance service offerings. The conveyance client can use a heat map to quickly determine whether they are in an area of elevated pricing. The information provided on the maps is updated continuously in substantially real time, providing the client with the ability to easily identify a preferred conveyance service offering.

Another benefit of the inventive approach is the ability to generate new data that can be useful to the conveyance client. In one embodiment, the predictive function can transform real time and/or past filtered conveyance service offerings, into a predictive heat map that the conveyance client can use to help identify a future preferred conveyance service offering. For example, a predictive heat map can help a client avoid paying more for a similar conveyance service. For example, a predictive heat map can provide the client with new data for analysis based on combinations of real time and/or past filtered conveyance service offerings and can utilize machine learning technology to predict future supply or future demand.

The inventive approach also increases the conveyance client's ability to interact with one or more of the representative, the good or service provider, or a combination thereof, due to increased insight into the conveyance industry segment. The present invention provides a tool for presenting one or more preferred conveyance service offering, one or more filtered conveyance service offering, conveyance data, or a combination thereof, to be analyzed or evaluated by the client.

The inventive approach enhances the conveyance client's decision-making ability, allowing the conveyance client to use one or more client preference, improving the ability for the conveyance client to secure the most preferred conveyance service offering available at that time.

The visual representations generated by the inventive platform and method provide increased knowledge that allows informed selection of conveyance requests by representatives and/or conveyance offerings by clients. Trends can be identified, and changes can be seen in substantially real time, allowing quick response, whether it is the representative responding to a conveyance request or a client seeking to secure a conveyance offering. The inventive approach provides the improved transparency needed for securing preferred requests and/or offerings. For representatives, this translates to more control or flexibility over how and where they want to work. For conveyance clients, improved insight into pricing, location, demand, and other variables that impact the desirability and availability of conveyance services improve transparency and assist the client in making better informed choices.

In some embodiments, the processing of the conveyance service requests and/or conveyance service offerings is enhanced through the use of quantum computing, machine learning technology, or a combination thereof.

The inventive platform and method enable a large number of conveyance service requests and offerings available to be considered by the representative and client, respectively. The larger the number of choices presented, the greater the chance of identifying and securing a most preferred conveyance service. For representatives, the increased number of service requests translates to more opportunities, increased earning potential, improved flexibility, and greater efficiency. For conveyance clients, the increased selection of conveyance offerings represents money saving, reduced wait times, convenience, level of service, and more. For example, a conveyance client can use a heat map to determine if they are in an area of elevated pricing and look for a nearby area that does not have elevated pricing.

An important benefit of the invention scheme is the ability for a representative to operate or provide a conveyance service across multiple conveyance industry segments, e.g., ride-hail and food delivery. Currently, service providers lack the ability to enable a representative to operate in an additional conveyance industry segment at the same time. The inventive approach allows a representative to operate initially in one conveyance industry segment, then perform a conveyance service in a different conveyance industry segment, and then go back to operate in the first conveyance industry segment. The inventive platform and method allow the representative to seamlessly transfer between different conveyance industry segments based on the representative preference.

The inventive platform and method add value to the conveyance industry as a whole. Representatives can enhance job satisfaction and income through the use of representative preferences. Conveyance clients can obtain shorter wait times, higher quality of conveyance service, and/or more price transparency, using client preferences. Together, the inventive approach improves an existing system and method to enhance the conveyance industry segment to the benefit of all users.

The following examples describe non-limiting embodiments and applications of the inventive system and method:

Example 1: Representative Maps

A first aspect of the present invention includes a real time or near real time system to assist a representative in the process of securing a preferred conveyance service request relating to a representative preference and a real time or near real time geographical location of the representative by using a visual representation.

Figure 2:
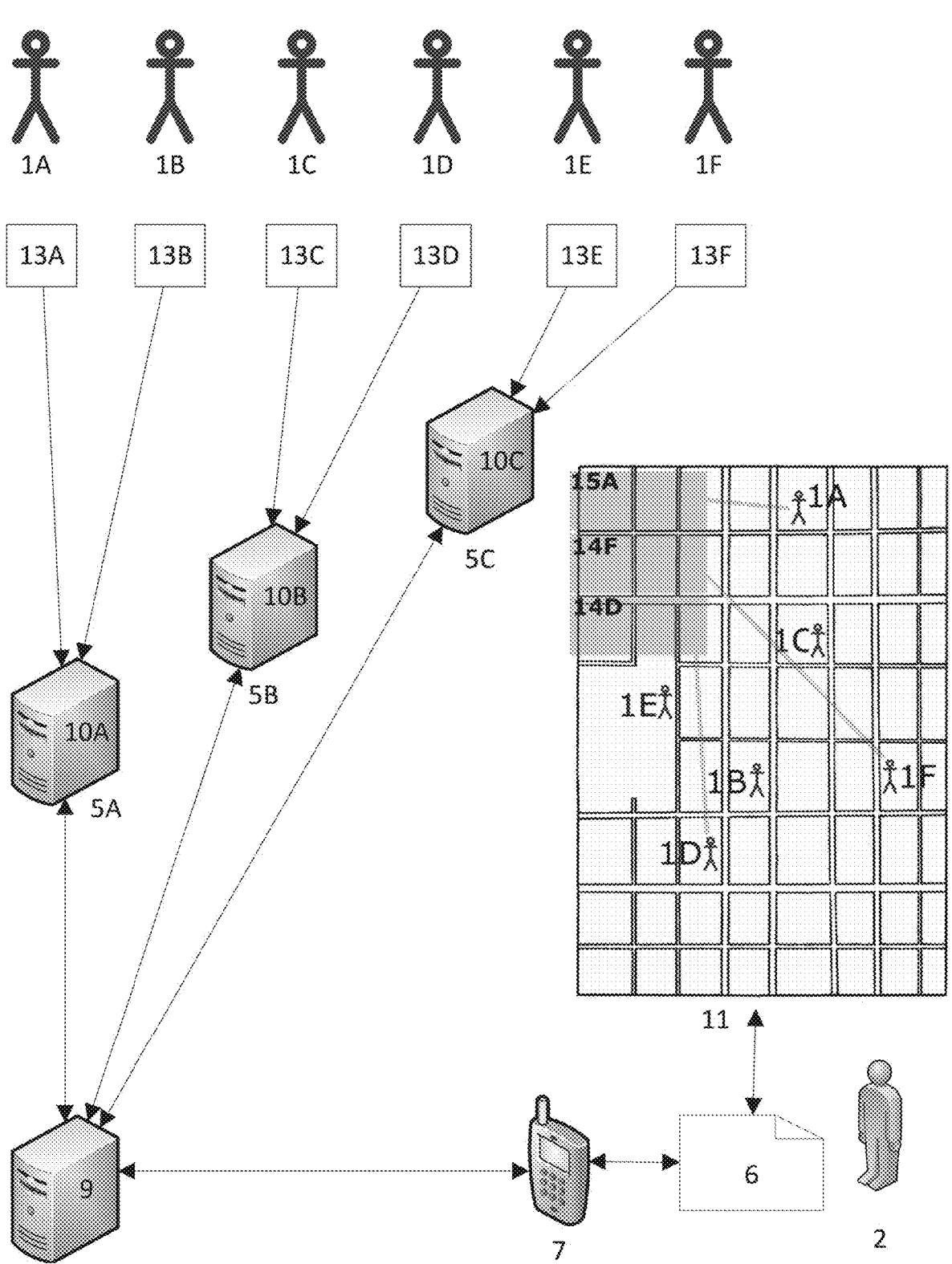
FIG. 2 is a high-level diagram of a conveyance service system according to an embodiment of the present invention that utilizes representative preferences.

FIGS. 1 and 2 provide high-level diagrams of an exemplary embodiment of the inventive system that can be of benefit to a representative operating in on or more conveyance industry segment. As shown in FIG. 1, conveyance service requests 13 can be sourced from an external server 10 and can be transmitted to a central server 9 by way of a link 8. A service provider 5 can be associated with an external server 10. Each service provider 5 is associated with one external server 10. A central server 9 can filter conveyance service requests 13 into filtered conveyance service requests 14 by using a representative preference 3 and the real time or near real time geographical location of the representative 2. A central server 9 can calculate the weighted average of the representative preference 3. A central server 9 can sort the filtered conveyance service requests 14 in an order relating to the corresponding weighted averages to identify a preferred conveyance service request 15. A preferred conveyance service request 15 can be identified by a central server 9 from the filtered conveyance service requests 14 that has the highest weighted average. A preferred conveyance service request 15 with corresponding conveyance data and filtered conveyance service requests 14 with corresponding conveyance data can be transmitted from a central server 9 to an application 6 by way of a link 8. The application 6 can operate on a terminal 7 and can display a visual representation such a dynamic map 11 or a heat map 12, or a combination thereof. The representative 2 can analyze the visual representation and then secure a preferred conveyance service request 15. A link 8 can be a connection or an association with a software function or a software component relating to an application 6, a terminal 7, a central server 9, an external server 10, or a combination thereof.

Referring to FIG. 2, an individual conveyance service request 13 can be submitted by each individual conveyance client 1A, 1B, 1C, 1D, 1E, and 1F. An individual conveyance service request 13 corresponds with each individual conveyance client 1 in the figure. Conveyance service requests 13A and 13B are submitted by conveyance clients 1A and 1B to external server 10A associated with service provider 5A. Conveyance service requests 13C and 13D are submitted by conveyance clients 1C and 1D to external server 10B associated with service provider 5B. Conveyance service requests 13E and 13F are submitted by conveyance clients 1E and 1F to external server 10C associated with service provider 5C. Each service provider 5 can have one or more external server 10.

Central server 9 can receive conveyance service requests 13 and then filter the conveyance service requests 13 into filtered conveyance service requests 14 by comparing to, for example, the two representative preferences 3 and the real time or near real time geographical location of a representative 2. Conveyance service requests 13 that match the indicated two representative preferences 3 can be identified as filtered conveyance service requests 14. Conveyance service requests 13 that do not match the indicated two representative preferences 3 can be discarded or ignored as not being filtered conveyance service requests 14. Filtered conveyance service requests 14 can be sorted by a weighted average of the two representative preferences 3 to identify a preferred conveyance service request 15. Representative preferences 3 can be assigned equal weights of 50% when calculating a weighted average. Representative preferences 3 chosen by a representative 2 can optionally be given unequal weights, e.g., 60% and 40% respectively. A representative 2 can optionally choose for representative preferences 3 to have equal or unequal weights.

A filtered conveyance service request 14 with the highest weighted average can be identified as a preferred conveyance service request 15. Central server 9 can identify a preferred conveyance service request 15 from filtered conveyance service requests 14 by using the highest weighted average of the pricing preference and service duration preference. Additional conveyance service requests 13 can be received and continuously filtered by a central server 9 into additional filtered conveyance service requests 14. Additional filtered conveyance service requests 14 can be sorted by a central server 9 into preferred conveyance service requests 15.

Filtered conveyance service requests 14 and a preferred conveyance service request 15 can be transmitted from a central server 9 to an application 6 by way of a link 8. An application 6 can then compile a dynamic map 11 of filtered conveyance service requests 14 and a preferred conveyance service request 15 based on a representative's 2 preferences. A dynamic map 11 can be compiled on an application 6 by combining a geographical map relating to the real time or near real time geographical location of a representative 2 with filtered conveyance service requests 14 and a preferred conveyance service request 15. Filtered conveyance service requests 14 and a preferred conveyance service request 15 can be positioned on a dynamic map 11 relating to corresponding geographical locations contained therein.

A preferred conveyance service request 15 can be displayed on a dynamic map 11 as a visually distinguishable icon compared to filtered conveyance service requests 14. A dynamic map 11 can be refreshed continuously in real time or near real time with updated filtered conveyance service requests 14 and a preferred conveyance service request 15.

A representative 2 can then visually evaluate a dynamic map 11 prior to securing a filtered conveyance service request 14 or a preferred conveyance service request 15. For example, in order to find another filtered conveyance service request 14 or another preferred conveyance service request 15, a representative 2 can update a representative preference 3. In this example, a representative 2 chooses to secure a preferred conveyance service request 15 identified by a central server 9. A representative 2 can then perform a conveyance service. An application 6, a central server 9, an external server 10, a terminal 7, a link 8, or a combination thereof, can be combined or integrated. A representative 2 can utilize a visual representation that can display a dynamic map 11 on a terminal 7 that can be integrated or associated with an application 6, a central server 9, an external server 10, a link 8, or a combination thereof. The representative uses the application to evaluate the visual representation and then secure the preferred conveyance service request.

The external server(s) are real time or near real time sources of all or some of the conveyance service requests transmitted in real time or near real time from the external server to the central server by way of a link. All or some of the plurality of conveyance service requests are updated in real time or near real time. The central server standardizes, aggregates, or a combination thereof, in real time or near real time, all or some of the plurality of conveyance service requests and further filters in real time or near real time, all or some of the plurality of conveyance service requests by using the representative preference and the real time or near real time geographical location of the representative, to identify all or some of the plurality of filtered conveyance service requests. All or some of the plurality of filtered conveyance service requests are updated in real time or near real time. The central server further identifies in real time or near real time, the preferred conveyance service request from all or some of the plurality of filtered conveyance service requests relating to the representative preference. The preferred conveyance service request may be updated in real time or near real time. The central server further transmits in real time or near real time, all or some of the plurality of filtered conveyance service requests, the preferred conveyance service request, the representative preference, or a combination thereof, to the application by way of a link between the central server and the application. The terminal facilitates or provides an input function, a display function, and operation of the application and is used by the representative to interface with the application. The terminal, the application, the central server, the external server, a link, or a combination thereof, may be combined or integrated, and one or more function of the central server may be performed by the application. The application may compile in real time or near real time, the visual representation of all or some of the plurality of filtered conveyance service requests, the preferred conveyance service request, the representative preference, or a combination thereof. The application displays the visual representation updated in real time or near real time. The representative may use the application to evaluate the visual representation and then secure the preferred conveyance service request and perform the conveyance service.

In a further embodiment of the present invention, where all or some of the plurality of conveyance service requests, the real time or near real time geographical location of the representative, or a combination thereof, are structured in a different format, the central server standardizes or converts them into a uniform format.

An additional embodiment of the present invention includes, wherein all or some of the plurality of conveyance service requests are structured in a uniform format prior to being transmitted from the external server to the central server by way of a link between the external server and the central server and are not standardized.

In some embodiments, all or some of the plurality of conveyance service requests are sourced or provided by one or more service providers or goods suppliers operating in a conveyance industry segment.

In another embodiment, conveyance service requests may include one or more, or a combination of requests for a ride-hail service, a ride-share service, a car-share service, a peer-to-peer conveyance service, a transportation service, a scooter service, a bicycle service, a person delivery service, a taxi service, a shuttle service, a good delivery service, an item delivery service, a medical service and delivery, a food delivery service, a courier delivery service, a freight delivery service, an animal delivery service, a delivery service, or a combination thereof.

In a further embodiment of the present invention the plurality of conveyance service requests may be a single conveyance service request.

Conveyance data may include one or a combination of beginning service geographical location(s), ending service geographical location(s), pricing information, elevated pricing information, a representative preference, a conveyance client preference, a distance parameter, an estimated time of arrival, a time to destination, a conveyance client geographical location, a conveyance client review, a conveyance client rating, a conveyance client detail, conveyance service detail(s), conveyance service route, a preferred conveyance client, sensor data, a representative's geographical location, representative review(s) or rating(s), representative detail(s), autonomous vehicle (AV) geographical location, an AV review or rating, AV detail(s), a preferred AV, a route planning preference, a fuel economy preference, a battery longevity preference, a vehicle capacity preference, a vehicle diagnostic preference, a conveyance data preference, a service provider geographical location, a service provider review, a service provider rating, a service provider detail, a preferred service provider, a good supplier geographical location, a good supplier review, a good supplier rating, a good supplier detail, a preferred good supplier, an owner/controller of an AV geographical location, a review or rating of an AV owner/controller, a detail about an AV owner/controller, a preferred AV owner/controller, a fleet manager geographical location, a fleet manager review, a fleet manager rating, a fleet manager detail, a preferred fleet manager, a logistics provider geographical location, a logistics provider review, a logistics provider rating, a logistics provider detail, a preferred logistics provider, a logistics supplier geographical location, a logistics supplier review, a logistics supplier rating, a logistics supplier detail, a preferred logistics supplier, a conveyance industry segment detail, a preferred conveyance industry segment, a good detail, an item detail, a type of vehicle detail, a vehicle detail, a measurement of one or more statistical variable, a level of service detail, a fuel consumption, a battery level, a vehicle diagnostic, a vehicle capacity, or a combination thereof.

In some embodiments of the present invention, all or some of the plurality of conveyance service requests are filtered relating to the representative preference and the real time or near real time geographical location of the representative, to identify all or some of the plurality of filtered conveyance service requests by one or more of categorizing, filtering, characterizing, screening, selecting, separating, identifying, specifying, distinguishing, naming, numbering, ordering, systematizing, tagging, labeling, recognizing, arranging, bracketing, ranking, organizing, classifying, segregating, isolating, grouping, comparing, or a combination thereof.

Another embodiment of the present invention includes, wherein the preferred conveyance service request is identified from all or some of the plurality of filtered conveyance service requests relating to a weighted average of the representative preference.

In a further embodiment, a different geographical location is used other than the real time or near real time geographical location of the representative when filtering all or some of the plurality of conveyance service requests. In some embodiments, the plurality of filtered conveyance service requests may be single filtered conveyance service request.

The following provides additional details, illustrative examples and embodiments within the system for generating representative maps:

In an embodiment of the present invention, the visual representation is compiled on the central server and transmitted to the application by way of a link between the central server and the application. The visual representation may include one or more of a dynamic map and a heat map, or a combination thereof. The representative may use the visual representation to secure the preferred conveyance service request in real time or near real time, related to the representative preference, the real time or near real time geographical location of the representative, or a combination thereof.

In another embodiment, the representative preference is displayed as one or more icon or visual with or on the visual representation, to allow the representative to evaluate all or some of the plurality of filtered conveyance service requests, the preferred conveyance service request, or a combination thereof, and secure the preferred conveyance service request relating to a service provider or a good supplier operating in a conveyance industry segment.

In another embodiment, the preferred conveyance service request, the representative preference, or a combination thereof, is displayed in a visually identifiable format compared to all or some of the plurality of filtered conveyance service requests relating to a service provider or a good supplier operating in a conveyance industry segment.

In an additional embodiment the dynamic map may include a geographical map that displays in real time or near real time, all or some of the plurality of filtered conveyance service requests, the preferred conveyance service request, the representative preference, or a combination thereof.

All or some of the plurality of filtered conveyance service requests, the preferred conveyance service request, the representative preference, or a combination thereof, relating to a service provider or a good supplier operating in a conveyance industry segment, may be displayed individually as a mobile or transitory icon or a mobile or transitory visual and updates or changes in real time or near real time.

Further, all or some of the plurality of filtered conveyance service requests, the preferred conveyance service request, the representative preference, or a combination thereof, relating to an individual service provider or an individual good supplier operating in a conveyance industry segment, may be displayed as a distinguishable icon or a distinguishable visual and updates or changes in real time or near real time.

All or some of the plurality of filtered conveyance service requests, the preferred conveyance service request, the representative preference, or a combination thereof, relating to an individual service provider or an individual good supplier may be displayed as an icon or visual and updates or changes in real time or near real time.

In another embodiment all or some of the filtered conveyance service requests, the preferred conveyance service request, the representative preference, or a combination thereof, relating to an individual service provider or an individual good supplier may be displayed as or with a different icon, a different symbol, a different color, a different shading, a different pattern, a different visual, or a combination thereof.

All or some of the filtered conveyance service requests, the preferred conveyance service request, the representative preference, or a combination thereof, relating to an individual service provider or an individual good supplier is displayed as or with a similar icon, a similar symbol, a similar color, a similar shading, a similar pattern, a similar visual, or a combination thereof.

In some embodiments, the representative updates, modifies, or changes the representative preference and the dynamic map displays in real time or near real time, all or some of the plurality of filtered conveyance service requests, the preferred conveyance service request, the representative preference, or a combination thereof, based on the updated, modified, or changed the representative preference.

In a further embodiment, the heat map includes the geographical map that displays a visual depiction of a statistical variable of all or some of the conveyance service requests; all or some of the plurality of filtered conveyance service requests; all or some of the preferred conveyance service requests; the representative preference; or a combination thereof.

The statistical variable may include one or more of measurement of conveyance service availability, pricing, elevated pricing, conveyance service request density, filtered conveyance service request density, preferred conveyance service request density, level of service density, conveyance service distance, estimated time of arrival, preferred conveyance client density, preferred good supplier density, preferred conveyance industry segment, conveyance industry segment density, representative density, conveyance client density, service provider density, good supplier density, or a combination thereof.

Areas of the heat map may be distinguished in proportion to a measurement of the statistical variable and displayed as having one or a combination of a distinguishable visual characteristics such as hue, shade, saturation, opacity, color, color value, pattern, fill, shape, image, animation, or a combination thereof.

In some embodiments, the preferred conveyance service request is not identified prior to compiling the heat map, a real time or near real time heat map, a historical heat map, a predictive heat map, or a combination thereof.

In a further embodiment, a real time or near real time heat map is compiled from the statistical variable of the conveyance service request(s), the filtered conveyance service request(s), the preferred conveyance service request(s), the representative preference, or a combination thereof.

An additional embodiment of the present invention includes a historical heat map compiled from the statistical variable of all or some of past the plurality of conveyance service requests, all or some of past the plurality of filtered conveyance service requests, all or some of past the preferred conveyance service request, the representative preference, or a combination thereof.

An embodiment of the present invention includes a predictive heat map compiled from the statistical variable of all or some of past the plurality of conveyance service requests, all or some of past the plurality of filtered conveyance service requests, all or some of past the preferred conveyance service request, all or some of the plurality of conveyance service requests, all or some of the plurality of filtered conveyance service requests, all or some of the preferred conveyance service request, the representative preference, or a combination thereof.

In an embodiment, the predictive heat map identifies or estimates one or more of future conveyance service availability, future pricing, future elevated pricing, future conveyance service request density, future filtered conveyance service request density, future preferred conveyance service request density, future level of service density, future conveyance industry segment density, future representative density, future conveyance client density, future service provider density, future good supplier density, future level of service demand, future conveyance industry segment demand, future conveyance service demand, future service provider demand, future good supplier demand, future conveyance service supply, future representative supply, or a combination thereof.

The predictive heat map generates a visual notification or an audio notification to notify the representative of a future change or update to the statistical variable, the measurement of the statistical variable, or a combination thereof.

In one embodiment of the present invention, the representative, the central server, the application, or a combination thereof, secures the preferred conveyance service request. In another embodiment, the representative may secure multiple preferred conveyance service requests concurrently.

In a further embodiment, one or more of the preferred conveyance service request(s), the filtered conveyance service request(s), the conveyance service request(s), the additional filtered conveyance service request(s), the additional preferred conveyance service request(s), the real time or near real time geographical location(s) of the representative (s), the representative preference(s), the beginning service geographical location, the ending service geographical location, or a combination thereof, is identified or updated in real time or near real time as the real time or near real time geographical location of the representative updates or changes or as traffic information updates or changes.

In another embodiment, the representative browses or navigates an area of the visual representation to identify and then secure the preferred conveyance service request or the filtered conveyance service request by selecting or accepting the preferred conveyance service request, the filtered conveyance service request, the representative preference, or a combination thereof.

In another embodiment, one or more of the application, terminal, central server, external server(s), link, or a combination thereof, are combined or integrated.

One or more of the preferred conveyance service request (s), the filtered conveyance service request(s), the conveyance service requests, the real time or near real time geographical location of the representative, the representative preference, the additional filtered conveyance service request(s), the additional preferred conveyance service request(s), a secured preferred conveyance service request, the beginning service geographical location, the ending service geographical location, or a combination thereof, may be transmitted and/or updated in real time or near real time by way of a link between the application and the central server.

In another embodiment, one or more of the preferred conveyance service request(s), the filtered conveyance service request(s), the conveyance service request(s), the real time or near real time geographical location of the representative, the representative preference, the additional filtered conveyance service request(s), the additional preferred conveyance service request(s), a secured preferred conveyance service request, the beginning service geographical location, the ending service geographical location, or a combination thereof, are transmitted in real time or near real time between the application and the external server and updated in real time or near real time.

In another embodiment, one or more of the preferred conveyance service request(s), the filtered conveyance service request(s), the conveyance service request(s), the real time or near real time geographical location of the representative, the representative preference, the additional filtered conveyance service request(s), the additional preferred conveyance service request(s), a secured preferred conveyance service request, the beginning service geographical location, the ending service geographical location, or a combination thereof, are transmitted in real time or near real time between the central server and the external server and updated in real time or near real time.

Example 2: Representative Maps

A second aspect of the invention includes a real time or near real time method to assist a representative in the process of securing a preferred conveyance service request relating to a representative preference and a real time or near real time geographical location of the representative by using a visual representation, the method including, in the system described in Example 1 above.

FIG. 3 provides a flowchart of steps of an exemplary method in a preferable but not necessarily required order. The flowchart describes steps of how a representative 2 can secure a preferred conveyance service request 15 by analyzing or evaluating a visual representation, in this example, a dynamic map 11. A link can be a connection or an association with a software function or a software component relating to an application 6, a terminal 7, a central server 9, one or more external server 10, or a combination thereof. Referring to FIG. 3:

Step 31. A conveyance service request can be transmitted from an external server to a central server continuously in real time or near real time by way of a link Step 32. A conveyance service request can be stored, standardized, aggregated, or a combination thereof, at least once on a central server.

Step 33. A representative can use a terminal to access an application.

Step 34. A representative can be authenticated.

Step 35. A representative can input or provide a representative preference into an application.

Step 36. A representative preference and a real time or near real time geographical location of a representative can be transmitted from an application to a central server by way of a link.

Step 37. A conveyance service request can be filtered by a central server using a representative preference and a real time or near real time geographical location of a representative into a filtered conveyance service request.

Step 38. A filtered conveyance service request can be sorted in an order relating to a weighted average of a representative preference to identify a preferred conveyance service request.

Step 39. A preferred conveyance service request can be identified by a central server as a filtered conveyance service request that has the highest weighted average from a filtered conveyance service request.

Step 40. A filtered conveyance service request and a preferred conveyance service request can be transmitted from a central server to an application by way of a link.

Step 41. An application can compile a dynamic map by combining a geographical map with a filtered conveyance service request with corresponding conveyance data and a preferred conveyance service request with corresponding conveyance data and then a dynamic map can be displayed on an application and updated in real time or near real time.

Step 42. A preferred conveyance service request can be displayed as a visually distinguishable icon alongside a filtered conveyance service request on a dynamic map Step 43. A representative can analyze or evaluate a dynamic map Step 44. After analysis or evaluation of a dynamic map, a representative can secure or obtain a preferred conveyance service request Step 45. A representative can perform a conveyance service.

In an embodiment of the invention for use in the ride-hail industry segment, a representative 2 can be a driver, a conveyance client 1 can be a passenger, and a conveyance service request 13 can be a ride service request. Central server 9 can continuously receive conveyance service requests 13 from more than one external server 10 by way of a link 8 in real time or near real time and can store, standardize, aggregate, and filter conveyance service requests 13 in real time or near real time. A central server 9 can sort filtered conveyance service requests 14 in real time or near real time, or use another technique, to identify a preferred conveyance service request 15. In a situation where a representative 2 does not have an application 6 downloaded to a terminal 7, a representative 2 could download an application 6 and optionally register an account to create a representative 2 profile if desired/required. A representative 2 can access an application 6 using a terminal 7 to gain knowledge of the ride-hail industry segment. When a representative 2 would like to provide a ride in the ride-hail industry segment, a representative 2 would login to an application 6 and can be authenticated.

Once logged into an application 6, a representative 2 can input or provide representative preferences 3 into an application 6. In this example, a representative 2 can input or provide two representative preferences 3, a pricing preference and a service duration preference. A pricing preference can be, e.g., a preference of over $20 income per each individual conveyance service request 13. A service duration preference can be, for example, a preference of conveyance services shorter than 15 minutes.

Figure 4:
FIG. 4 is a sample display of a dynamic map according to an embodiment of the invention that utilizes representative preferences.

These two representative preferences 3 enable a representative 2 to evaluate a dynamic map 11, an example of which is provided in FIG. 4, with a preferred conveyance service request 15 and filtered conveyance service requests 14 that can be more desired by a representative 2. Central server 9 can filter out conveyance service requests 13 that do not match or satisfy the two representative preferences 3 for a representative 2. Benefits of representative preferences 3 can be to allow a representative 2 to better meet their criteria in providing conveyance services such as higher earning potential, better efficiencies, more suitable conveyance service requests 13, or a combination thereof. The two representative preferences 3 for this example and the real time or near real time geographical location of a representative 2 can be transmitted from an application 6 to a central server 9 by way of a link 8.

The dynamic map 11 can be used by the representative 2 to evaluate and then secure the preferred conveyance service request 15A. The filtered conveyance service requests 14A, 14B, 14C, and 14D and the preferred conveyance service request 15A are associated with different service providers 5A, 5B, 5C, and 5D respectively. A link can be a connection or an association with a software function or a software component relating to an application 6, a terminal 7, a central server 9, an external server 10, or a combination thereof.

The preferred conveyance service request 15A can be visually identifiable compared to the filtered conveyance service requests 14A, 14B, 14C and 14D. In this figure, a star is used in addition to a larger icon to demonstrate the preferred conveyance service request 15A as being visually identifiable. At least one different icon, symbol, color, shade, or visual can be used to identify individual filtered conveyance service requests 14A, 14B, 14C and 14D and the preferred conveyance service request 15A that are from different conveyance industry segments, different service providers 5, or a combination thereof. For example, in this figure, icons displaying a person are ride service requests from the ride-hail industry segment, icons displaying a van are good delivery service requests from the courier industry segment, and icons with a spoon and fork are food delivery service requests from the food delivery industry segment.

Each individual icon, symbol, color, shade, or visual can be mobile or dynamic and updated in real time or near real time on an application 6.

Figure 5:
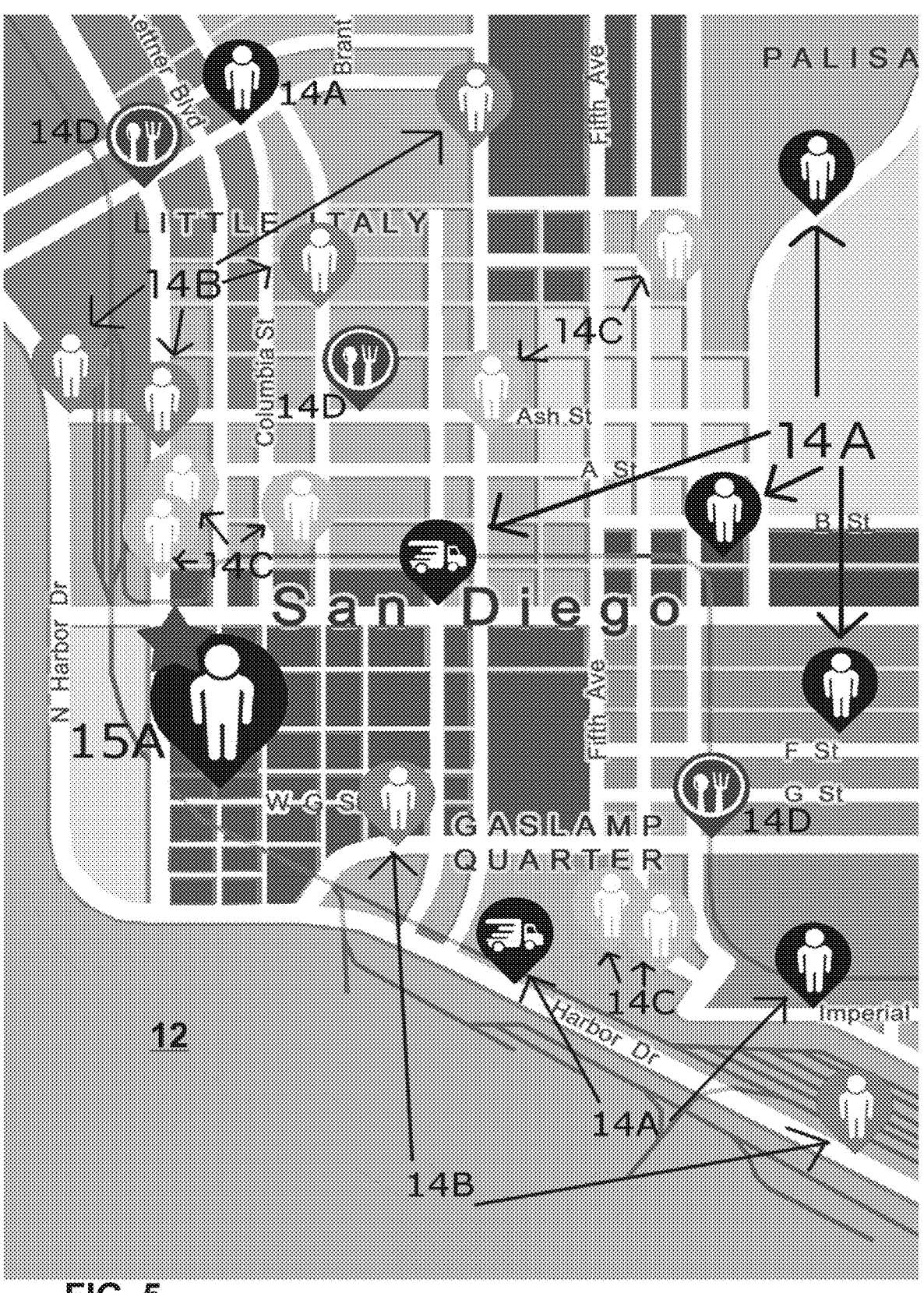
FIG. 5 provides a sample display of a combination of a dynamic map and a heat map according to an embodiment of the invention that utilizes representative preferences.

FIG. 5 provides an example of a combination of a dynamic map and a heat map which may be used by representative 2 to evaluate on both a micro and macro level view of a conveyance industry segment and then secure the preferred conveyance service request 15A. The filtered conveyance service requests 14A, 14B, 14C, and 14D and the preferred conveyance service request 15A are associated with different service providers 5A, 5B, 5C, and 5D respectively. A link can be a connection or an association with a software function or a software component relating to an application 6, a terminal 7, a central server 9, an external server 10, or a combination thereof.

The preferred conveyance service request 15A can be visually identifiable compared to the filtered conveyance service requests 14A, 14B, 14C, and 14D. In this example, a star is used in addition to a larger icon to demonstrate the preferred conveyance service request 15A as being visually identifiable. At least one different icon, symbol, color, shade, or visual can be used to identify individual filtered conveyance service requests 14A, 14B, 14C and 14D and the preferred conveyance service request 15A that are from different conveyance industry segments, different service providers 5, or a combination thereof. For example, in this figure, icons displaying a person are ride service requests from the ride-hail industry segment, icons displaying a van are good delivery service requests from the courier industry segment, and icons with a spoon and fork are food delivery service requests from the food delivery industry segment. Each individual icon, symbol, color, shade, or visual can be mobile or dynamic and updated in real time or near real time on an application 6.

In the example of FIG. 5, a dynamic map showing filtered conveyance service requests 14A, 14B, 14C, and 14D and the preferred conveyance service request 15A is displayed in combination with a heat map showing areas with elevated pricing. Areas of the combination of a dynamic map and a heat map can be shaded or patterned in proportion to the measurement of an elevated pricing metric being displayed on a geographical map. Darker shaded areas can represent areas with higher elevated pricing whereas lighter shaded areas can represent areas with lower elevated pricing or potentially no elevated pricing. A representative 2 can use this combination of a dynamic map 11 and a heat map 12 to analyze and identify areas of elevated pricing shown as darker shaded areas to position themselves closer to areas of elevated pricing. In this figure, the representative 2 can drive to a darker shaded area with higher pricing and then secure the preferred conveyance service request 15 to provide the requested conveyance service.

Additional definitions, features and embodiments of the representative maps and method(s) for generating them are described below:

Standardizing Conveyance Service Requests: In one embodiment, some or all of the plurality of conveyance service requests, the real time or near real time geographical location of the representative, or a combination thereof, may be structured in a different format, and are standardized or converted into a uniform format. In another embodiment, all or some of the plurality of conveyance service requests are structured in a uniform format prior to being transmitted from the external server to the central server and are not standardized.

Transmitting a Representative Preference and a Geographical Location: In an embodiment of the present invention, the representative preference, once inputted or provided into the application, may be stored or cached on the application, the computer readable memory of the central server, or a combination thereof, and the representative preference is not inputted or provided again into the application by the representative. In another embodiment, the representative preference is stored or cached in the computer readable memory of the central server and the representative preference is not transmitted again from the application to the central server. In still another embodiment, the representative preference, the real time or near real time geographical location of the representative, or a combination thereof, may be transmitted from the application to the central server at any time prior to filtering all or some of the plurality of conveyance service requests.

Filtering Conveyance Service Requests

In some embodiments, all or some of the conveyance service requests are filtered relating to the representative preference and the real time or near real time geographical location of the representative, to identify all or some of the plurality of filtered conveyance service requests by one or more process of categorizing, filtering, characterizing, screening, selecting, separating, identifying, specifying, distinguishing, naming, numbering, ordering, systematizing, tagging, labeling, recognizing, arranging, bracketing, ranking, organizing, classifying, segregating, isolating, grouping, comparing, or a combination thereof.

In another embodiment, all or some of the plurality of conveyance service requests are filtered in real time or near real time and the preferred conveyance service request is identified in real time or near real time from all or some of the plurality of filtered conveyance service requests on the application by: (a) transmitting in real time or near real time, all or some of the plurality of conveyance service requests from the central server to the application by way of a link between the central server and the application; (b) filtering in real time or near real time, all or some of the plurality of conveyance service requests by using the representative preference and the real time or near real time geographical location of the representative, to identify all or some of the plurality of filtered conveyance service requests; and (c) identifying in real time or near real time, the preferred conveyance service request from all or some of the plurality of filtered conveyance service requests relating to the representative preference.

In a further embodiment of the present invention a different geographical location may be used other than the real time or near real time geographical location of the representative when filtering all or some of the plurality of conveyance service requests.

Identifying Preferred Conveyance Service Request(s)

In some embodiments, the preferred conveyance service request relating to the representative preference is identified from all or some of the plurality of filtered conveyance service requests by using one or more of a sorting algorithm, a selection algorithm, a search algorithm, a merge algorithm, a maximum function, a minimum function, a graph algorithm, a graph search algorithm, a tree algorithm, a tree search algorithm, a matrix calculation, a matrix algorithm, a comparison, or a combination thereof.

Another embodiment of the present invention includes, wherein the preferred conveyance service request is identified from all or some of the plurality of filtered conveyance service requests relating to a weighted average of the representative preference.

In a further embodiment, the preferred conveyance service request is identified in real time or near real time from all or some of the plurality of filtered conveyance service requests on the application by: (a) transmitting in real time or near real time, all or some of the plurality of filtered conveyance service requests from the central server to the application by way of a link between the central server and the application; and (b) identifying in real time or near real time, the preferred conveyance service request from all or some of the plurality of filtered conveyance service requests relating to the representative preference.

In some embodiments, the visual representation may be compiled on the central server and transmitted to the application by way of a link between the central server and the application.

Displaying a Visual Representation

The visual representation may be displayed on a remote display and may include one or more of a dynamic map and heat map, or a combination thereof.

The representative may use the visual representation to secure the preferred conveyance service request in real time or near real time, related to the representative preference, the real time or near real time geographical location of the representative, or a combination thereof. The representative preference may be displayed as one or more icon or visual with or on the visual representation, to allow the representative to evaluate all or some of the plurality of filtered conveyance service requests, the preferred conveyance service request, or a combination thereof, and secure the preferred conveyance service request relating to a service provider or a good supplier operating.

Another embodiment of the present invention includes, wherein the preferred conveyance service request, the representative preference, or a combination thereof, is displayed in a visually identifiable format compared to all or some of the plurality of filtered conveyance service requests relating to a service provider or a good supplier operating.

An additional embodiment of the present invention includes, wherein the dynamic map includes the geographical map that displays in real time or near real time, all or some of the plurality of filtered conveyance service requests, the preferred conveyance service request, the representative preference, or a combination thereof.

A further embodiment of the present invention includes, wherein all or some of the plurality of filtered conveyance service requests, the preferred conveyance service request, the representative preference, or a combination thereof, relating to a service provider or a good supplier operating in a conveyance industry segment, is displayed individually as a mobile or transitory icon or a mobile or transitory visual and updates or changes in real time or near real time.

A further embodiment of the present invention includes, wherein all or some of the plurality of filtered conveyance service requests, the preferred conveyance service request, the representative preference, or a combination thereof, relating to an individual service provider or an individual good supplier operating is displayed as a distinguishable icon or visual and updates or changes in real time or near real time.

A further embodiment of the present invention includes, wherein all or some of the plurality of filtered conveyance service requests, the preferred conveyance service request, the representative preference, or a combination thereof, relating to an individual service provider or an individual good supplier operating is displayed as an icon or visual and updates or changes in real time or near real time.

A further embodiment of the present invention includes, wherein all or some of the plurality of filtered conveyance service requests, the preferred conveyance service request, the representative preference, or a combination thereof, relating to an individual service provider or an individual good supplier is displayed as or with a different icon, a different symbol, a different color, a different shading, a different pattern, a different visual, or a combination thereof.

A further embodiment of the present invention includes, wherein all or some of the plurality of filtered conveyance service requests, the preferred conveyance service request, the representative preference, or a combination thereof, relating to an individual service provider or an individual good supplier is displayed as or with a similar icon, a similar symbol, a similar color, a similar shading, a similar pattern, a similar visual, or a combination thereof.

A further embodiment of the present invention includes, wherein the representative updates, modifies, or changes the representative preference and the dynamic map displays in real time or near real time, all or some of the plurality of filtered conveyance service requests, the preferred conveyance service request, the representative preference, or a combination thereof, based on the updated, modified, or changed the representative preference.

An additional embodiment of the present invention includes, wherein the heat map includes the geographical map that displays a visual depiction of one or more statistical variable of all or some of the plurality of conveyance service requests; all or some of the plurality of filtered conveyance service requests; all or some of the preferred conveyance service request; the representative preference; or a combination thereof.

An embodiment of the present invention includes, wherein the statistical variable includes a measurement of conveyance service availability, pricing, elevated pricing, conveyance service request density, filtered conveyance service request density, preferred conveyance service request density, level of service density, a conveyance service distance, an estimated time of arrival, preferred conveyance client density, preferred good supplier density, a preferred conveyance industry segment, conveyance industry segment density, representative density, conveyance client density, service provider density, good supplier density, or a combination thereof.

Another embodiment of the present invention includes, wherein an area of the heat map is distinguished in proportion to a measurement of the statistical variable and displayed as having one or more of a distinguishable hue, shade, saturation, opacity, color, value of color, pattern, fill, shape, image, animation, or a combination thereof.

A further embodiment includes wherein the preferred conveyance service request is not identified prior to compiling the heat map, a real time or near real time heat map, a historical heat map, a predictive heat map, or a combination thereof.

Another embodiment includes wherein a real time or near real time heat map is compiled from the statistical variable of all or some of the conveyance service requests, all or some of the filtered conveyance service requests, all or some of the preferred conveyance service request, the representative preference, or a combination thereof.

An embodiment includes wherein a historical heat map is compiled from the statistical variable of all or some of past the plurality of conveyance service requests, all or some of past the plurality of filtered conveyance service requests, all or some of past the preferred conveyance service request, the representative preference, or a combination thereof.

In another embodiment, a predictive heat map may be compiled from the statistical variable of all or some past conveyance service requests, all or some past filtered conveyance service requests, all or some past preferred conveyance service request(s), all or some of the conveyance service requests, all or some filtered conveyance service requests, all or some preferred conveyance service request, the representative preference, or a combination thereof.

The predictive heat map may identify or estimate one or more of future conveyance service availability, future pricing, future elevated pricing, future conveyance service request density, future filtered conveyance service request density, future preferred conveyance service request density, future level of service density, future conveyance industry segment density, future representative density, future conveyance client density, future service provider density, future good supplier density, future level of service demand, future conveyance industry segment demand, future conveyance service demand, future service provider demand, future good supplier demand, future conveyance service supply, future representative supply, or a combination thereof.

An additional embodiment includes wherein the predictive heat map generates a visual notification or an audio notification to notify the representative of a future change or update to the statistical variable, the measurement of the statistical variable, or a combination thereof.

In one embodiment, a function of the central server or the external server may be performed by the application. In some embodiments, the application operates on the central server. Further, a function of the application is performed by the central server or the external server.

An additional embodiment includes wherein the representative, the central server, the application, or a combination thereof, secures the preferred conveyance service request.

An embodiment includes wherein all or some of the plurality of conveyance service requests are sourced or provided by a service provider or a good supplier operating in a conveyance industry segment.

Another embodiment includes wherein the representative secures more than one the preferred conveyance service requests concurrently.

A further embodiment includes wherein the representative secures a filtered conveyance service request other than the preferred conveyance service request.

An additional embodiment includes wherein the preferred conveyance service request, all or some of the plurality of filtered conveyance service requests, all or some of the plurality of conveyance service requests, all or some of subsequent or additional the plurality of filtered conveyance service requests, all or some of subsequent or additional the preferred conveyance service request, all or some of the real time or near real time geographical location of the representative, the representative preference, the beginning service geographical location, the ending service geographical location, or a combination thereof, is identified or updated in real time or near real time as the real time or near real time geographical location of the representative updates or changes or as traffic information updates or changes.

A further embodiment includes wherein the representative browses or navigates an area of the visual representation to identify and then secure the preferred conveyance service request or the filtered conveyance service request by selecting or accepting the preferred conveyance service request, the filtered conveyance service request, the representative preference, or a combination thereof.

In some embodiments, the central server is located on or associated with the terminal. In other embodiments, the application, the terminal, the central server, the external server, a link, or a combination thereof, may be combined or integrated.

Another embodiment of the present invention includes, wherein the beginning service geographical location, the ending service geographical location, the representative preference, or a combination thereof, is provided prior to receiving all or some of the plurality of conveyance service requests on or at the central server.

Another embodiment includes wherein the preferred conveyance service request, all or some of the plurality of filtered conveyance service requests, all or some of the plurality of conveyance service requests, all or some of the real time or near real time geographical location of the representative, the representative preference, all or some of subsequent or additional the plurality of filtered conveyance service requests, all or some of subsequent or additional the preferred conveyance service request, a secured preferred conveyance service request, the beginning service geographical location, the ending service geographical location, or a combination thereof, is transmitted in real time or near real time between the application and the central server and updated in real time or near real time by way of a link between the application and the central server.

Another embodiment includes wherein the preferred conveyance service request, all or some of the plurality of filtered conveyance service requests, all or some of the plurality of conveyance service requests, all or some of the real time or near real time geographical location of the representative, the representative preference, all or some of subsequent or additional the plurality of filtered conveyance service requests, all or some of subsequent or additional the preferred conveyance service request, a secured preferred conveyance service request, the beginning service geographical location, the ending service geographical location, or a combination thereof, is transmitted in real time or near real time between the application and the external server and updated in real time or near real time by way of a link between the application and the external server.

In some embodiments, the preferred conveyance service request, all or some of the plurality of filtered conveyance service requests, all or some of the plurality of conveyance service requests, all or some of the real time or near real time geographical location of the representative, the representative preference, all or some of subsequent or additional the plurality of filtered conveyance service requests, all or some of subsequent or additional the preferred conveyance service request, a secured preferred conveyance service request, the beginning service geographical location, the ending service geographical location, or a combination thereof, is transmitted in real time or near real time between the central server and the external server and updated in real time or near real time by way of a link between the central server and the external server.

Example 3: Conveyance Client Maps

A third aspect of the present invention includes a real time or near real time system to assist a conveyance client to secure a preferred conveyance service offering.

Figure 6:
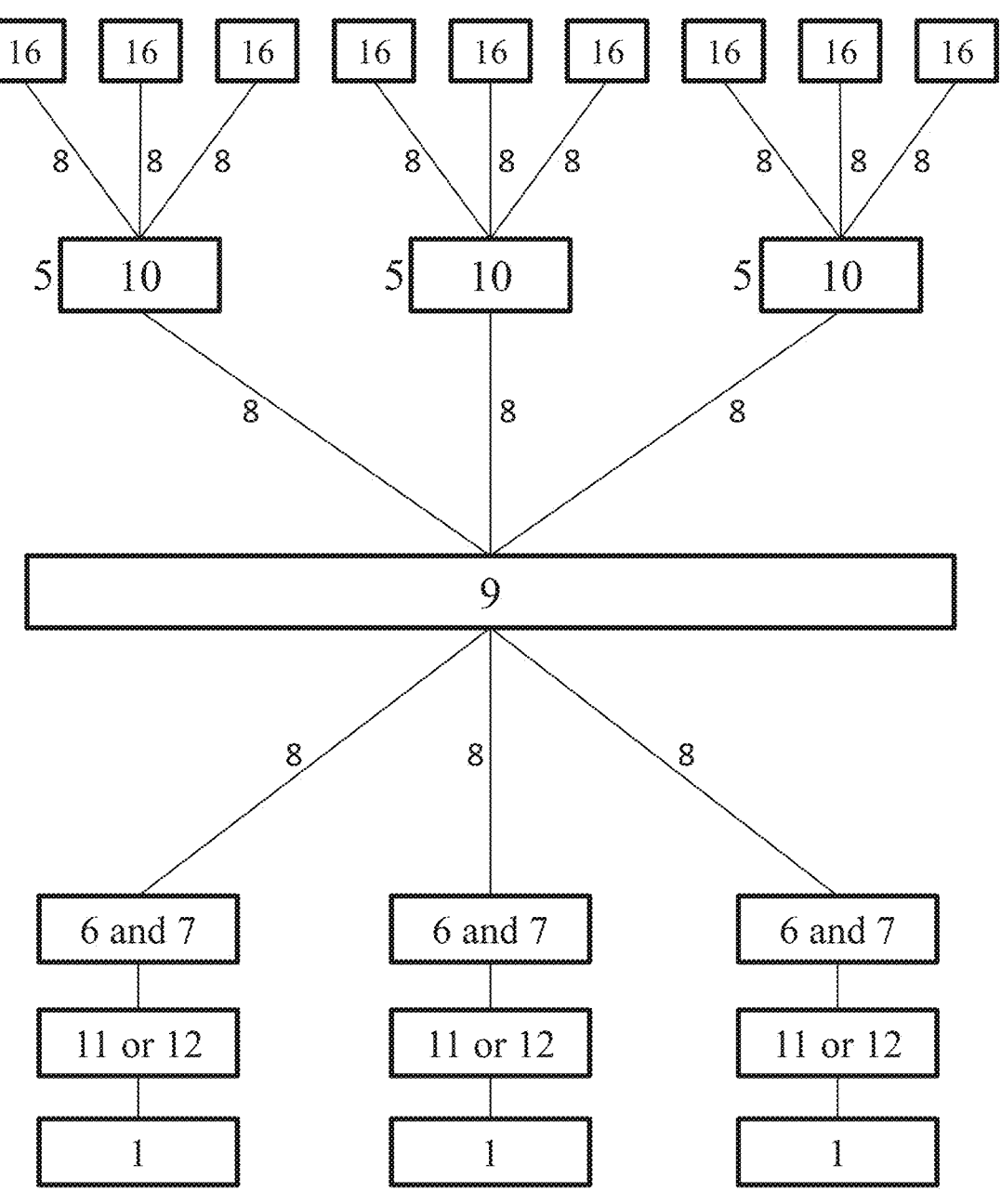
FIG. 6 is a high-level schematic of a conveyance system according to an embodiment of the present invention that utilizes conveyance client preferences.
Figure 7:
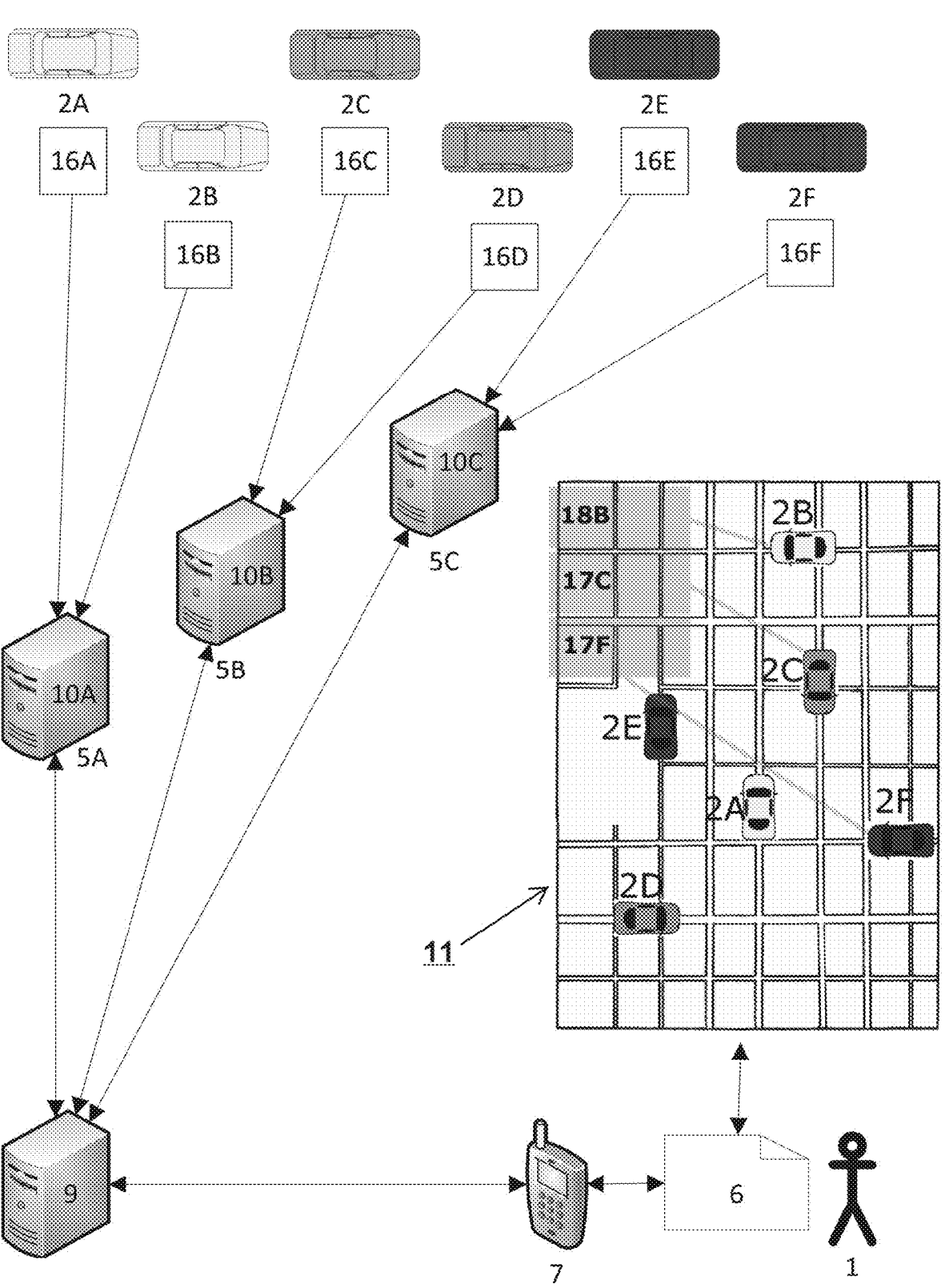
FIG. 7 is a high-level diagram of a conveyance service system according to an embodiment of the present invention that utilizes conveyance client preferences.

Referring to FIGS. 6 and 7, conveyance service offerings 16 can be sourced from an external server 10 and can be transmitted to a central server 9 by way of a link 8. A service provider 5 can be associated with one or more external servers 10. In this figure, each service provider 5 is associated with one external server 10. A central server 9 can filter conveyance service offerings 16 into filtered conveyance service offerings 17 by using a conveyance client preference 4 and the real time or near real time geographical location of a conveyance client 1. A central server 9 can calculate the weighted average of the conveyance client preference 4. A central server 9 can sort the filtered conveyance service offerings 17 in an order relating to the corresponding weighted averages to identify at least one preferred conveyance service offering 18. A preferred conveyance service offering 18 can be identified by a central server 9 from the filtered conveyance service offerings 17 that has the highest weighted average. A preferred conveyance service offering 18 with corresponding conveyance data and filtered conveyance service offerings 17 with corresponding conveyance data can be transmitted from a central server 9 to an application 6 by way of a link 8. An application 6 can operate on a terminal 7 and can display a visual representation such as a dynamic map 11, a heat map 12, or a combination thereof. A conveyance client 1 can evaluate the visual representation and then secure a preferred conveyance service offering 18. A link 8 can be a connection or an association with a software function or a software component relating to an application 6, a terminal 7, a central server 9, an external server 10, or a combination thereof.

FIG. 7 provides a sample diagram of a substantially real time conveyance service system according to an embodiment of the inventive network and method, which is designed to benefit a conveyance client 1. An individual conveyance service offering 16 can be performed by each individual representative 2A, 2B, 2C, 2D, 2E, and 2F. An individual conveyance service offering 16 corresponds with each individual representative 2 in the figure. Conveyance service offerings 16A and 16B are offered by representatives 2A and 2B to external server 10A associated with service provider 5A. Conveyance service offerings 16C and 16D are offered by representatives 2C and 2D to external server 10B associated with service provider 5B. Conveyance service offerings 16E and 16F are offered by representatives 2E and 2F to external server 10C associated with service provider 5C. Each service provider 5 can have an external server 10.

A central server 9 can receive conveyance service offerings 16 and then filter the conveyance service offerings 16 into filtered conveyance service offerings 17 by using a conveyance client preference 4 and the substantially real time geographical location of a conveyance client 1. A central server 9 can calculate the weighted average of a conveyance client preference 4. A central server 9 can sort the filtered conveyance service offerings 17 in an order relating to the corresponding weighted averages to identify one or more preferred conveyance service offering 18. The preferred conveyance service offering 18 can be identified by the central server 9 from the filtered conveyance service offerings 17 that has the highest weighted average. At least one preferred conveyance service offering 18 with corresponding conveyance data and filtered conveyance service offerings 17 with corresponding conveyance data can be transmitted from the central server 9 to an application 6 by way of a link 8. An application 6 can operate on a terminal 7 and can display a visual representation, for example, a dynamic map 11. Individual filtered conveyance service offerings 17C, 17F and the preferred conveyance service offering 18B can be shown on a dynamic map 11 as dynamic icons or visuals and can optionally show conveyance data. A conveyance client 1 can evaluate a dynamic map 11 and then secure the preferred conveyance service offering 18B.

A link can be a connection or an association with a software function or a software component relating to the application 6, a terminal 7, a central server 9, an external server 10, or a combination thereof. The terminal 7 may be associated with a conveyance client 1.

Conveyance service offerings may include an individual conveyance service offering including an offering for transporting one or more of a person, a good, a thing, or a combination thereof, from one geographical location another geographical location, where the individual conveyance service offering is updated in real time or near real time, and where individual conveyance service offering includes qualitative and quantitative conveyance data corresponding thereto. A plurality of filtered conveyance service offerings include at least a subset of the plurality of conveyance service offerings that result from filtering all or some of the conveyance service offerings using the conveyance client preference and the real time or near real time geographical location of the conveyance client, where all or some of the plurality of filtered conveyance service offerings are updated in real time or near real time. A preferred conveyance service offering includes an offering for transporting the person, the good, the thing, or a combination thereof, from one geographical location to another geographical location that is identified from all or some of the plurality of filtered conveyance service offerings, where the preferred conveyance service offering is updated in real time or near real time. The conveyance client may include one or more of a person and a machine, or a combination thereof, that analyzes or evaluates the visual representation and then secures the preferred conveyance service offering. The conveyance client provides one or more conveyance client preferences including an option selected or provided by the conveyance client that is used to filter all or some of the plurality of conveyance service offerings into all or some of the plurality of filtered conveyance service offerings.

The visual representation includes one or more geographical map displaying all or some of the plurality of filtered conveyance service offerings, the preferred conveyance service offering, the conveyance client preference, or a combination thereof. A beginning service geographical location and one or more ending service geographical location are inputted or provided to the application to be transmitted in real time or near real time to the central server by way of a link between the application and the central server. The beginning service geographical location and the ending service geographical location are transmitted in real time or near real time from the central server to the external server by way of a link between the central server and the external server.

All or some of the plurality of conveyance service offerings are transmitted in real time or near real time between the external server and the central server by way of ae link between the external server and the central server. All or some of the plurality of filtered conveyance service offerings, the preferred conveyance service offering, the conveyance client preference, the real time or near real time geographical location of the conveyance client, or a combination thereof, are transmitted in real time or near real time between the central server and the application by way of a link between the central server and the application. The application may operate on the terminal and the conveyance client uses the application to evaluate the visual representation of all or some of the plurality of filtered conveyance service offerings, the preferred conveyance service offering, or a combination thereof. The conveyance client may use the application to evaluate the visual representation and then secure the preferred conveyance service offering.

The external server(s) are real time or near real time sources of all or some of the plurality of conveyance service offerings transmitted in real time or near real time from the external server to the central server by way of a link between the external server and the central server. All or some of the plurality of conveyance service offerings are updated in real time or near real time.

The central server standardizes, aggregates, or a combination thereof, in real time or near real time, all or some of the plurality of conveyance service offerings. The central server filters, in real time or near real time, all or some of the plurality of conveyance service offerings by using the conveyance client preference and the real time or near real time geographical location of the conveyance client, to identify all or some of the plurality of filtered conveyance service offerings, all or some of which may be updated in real time or near real time. The central server identifies in real time or near real time, the preferred conveyance service offering from all or some of the plurality of filtered conveyance service offerings relating to the conveyance client preference. The preferred conveyance service offering may be updated in real time or near real time.

The central server transmits in real time or near real time, all or some of the plurality of filtered conveyance service offerings, the preferred conveyance service offering, or a combination thereof, to the application by way of a link between the central server and the application.

The terminal facilitates or provides one or more of an input function, a display function, and operation of the application, and is used by the conveyance client to interface with the application. The application compiles in real time or near real time, the visual representation of all or some of the plurality of filtered conveyance service offerings, the preferred conveyance service offering, or a combination thereof. The application displays the visual representation, which is updated in real time or near real time. The conveyance client uses the application to evaluate the visual representation and then secure the preferred conveyance service offering.

Definitions, descriptions and examples of certain features and elements of the inventive network and method are provided below:

Conveyance Service Offerings: The following are illustrative, non-limiting examples of "conveyance service offerings" as used in the present disclosure:

All or some of the plurality of conveyance service offerings are sourced or provided by service provider or a good supplier operating in a conveyance industry segment.

All or some of the plurality of conveyance service offerings include one or more of a ride-hail service, a ride-share service, a car-share service, a peer-to-peer conveyance service, a transportation service, a scooter service, a bicycle service, a person delivery service, a taxi service, a shuttle service, a good delivery service, an item delivery service, a medical service and delivery, a food delivery service, a courier delivery service, a freight delivery service, an animal delivery service, a delivery service, or a combination thereof.

The plurality of conveyance service offerings may be a single conveyance service offering.

In some embodiments, all or some of the plurality of conveyance service offerings are filtered relating to the conveyance client preference and the real time or near real time geographical location of the conveyance client, to identify all or some of the plurality of filtered conveyance service offerings by one or more of a process of categorizing, filtering, characterizing, screening, selecting, separating, identifying, specifying, distinguishing, naming, numbering, ordering, systematizing, tagging, labeling, recognizing, arranging, bracketing, ranking, organizing, classifying, segregating, isolating, grouping, comparing, or a combination thereof.

The preferred conveyance service offering may be identified from all or some of the plurality of filtered conveyance service offerings relating to a weighted average of the conveyance client preference.

A different geographical location may be used other than the real time or near real time geographical location of the conveyance client when filtering all or some of the plurality of conveyance service offerings.

The plurality of filtered conveyance service offerings may be a single filtered conveyance service offering.

Visual Representation: The following are illustrative, non-limiting examples and embodiments of "visual representation" as used in the present disclosure:

The visual representation includes one or more of a dynamic map and a heat map, or a combination thereof. The conveyance client utilizes the visual representation to secure the preferred conveyance service offering in real time or near real time, related to the conveyance client preference, the real time or near real time geographical location of the conveyance client, or a combination thereof.

The conveyance client preference is displayed as one or more icon or visual with or on the visual representation, to allow the conveyance client to evaluate all or some of the plurality of filtered conveyance service offerings, the preferred conveyance service offering, or a combination thereof, and secure the preferred conveyance service offering relating to a service provider or a good supplier.

The visual representation may include a display of the preferred conveyance service offering, the conveyance client preference, or a combination thereof, in a visually identifiable format compared to all or some of the plurality of filtered conveyance service offerings relating to a service provider or a good supplier.

The dynamic map may include a geographical map that displays in real time or near real time, all or some of the plurality of filtered conveyance service offerings, the preferred conveyance service offering, the conveyance client preference, or a combination thereof.

All or some of the plurality of filtered conveyance service offerings, the preferred conveyance service offering, the conveyance client preference, or a combination thereof, relating to a service provider or a good supplier may be displayed individually as a mobile or transitory icon or a mobile or transitory visual and updates or changes in real time or near real time.

All or some of the plurality of filtered conveyance service offerings, the preferred conveyance service offering, the conveyance client preference, or a combination thereof, relating to an individual service provider or an individual good supplier may be displayed as a distinguishable icon or visual and updates or changes in real time or near real time.

All or some of the plurality of filtered conveyance service offerings, the preferred conveyance service offering, the conveyance client preference, or a combination thereof, relating to an individual service provider or an individual good supplier may be displayed as an icon or visual and updates or changes in real time or near real time.

All or some of the plurality of filtered conveyance service offerings, the preferred conveyance service offering, the conveyance client preference, or a combination thereof, relating to an individual service provider or an individual good supplier may be displayed as or with one or more of a different icon, symbol, color, shading, pattern, visual, or a combination thereof.

All or some of the plurality of filtered conveyance service offerings, the preferred conveyance service offering, the conveyance client preference, or a combination thereof, relating to an individual service provider or an individual good supplier may be displayed as or with one or more of a similar icon, symbol, color, shading, pattern, visual, or a combination thereof.

When a conveyance client updates, modifies, or changes the conveyance client preference and the dynamic map displays in real time or near real time, all or some of the plurality of filtered conveyance service offerings, the preferred conveyance service offering, the conveyance client preference, or a combination thereof, based on the updated, modified, or changed the conveyance client preference.

The heat map includes the geographical map that displays a visual depiction of one or more statistical variable of all or some of the plurality of conveyance service offerings; all or some of the plurality of filtered conveyance service offerings; all or some of the preferred conveyance service offering; the conveyance client preference; or a combination thereof.

The statistical variable may include one or more of a measurement of conveyance service availability, pricing, elevated pricing, conveyance service offering density, filtered conveyance service offering density, preferred conveyance service offering density, preferred good supplier density, a preferred conveyance industry segment, conveyance industry segment density, level of service density, a conveyance service distance, an estimated time of arrival, preferred representative density, representative density, conveyance client density, service provider density, good supplier density, or a combination thereof.

An area of the heat map may be distinguished in proportion to one or more of a measurement of the statistical variable and displayed in the visual representation as having one or more of a distinguishable hue, shade, saturation, opacity, color, color value, pattern, fill, shape, image, animation, or a combination thereof.

In one embodiment, the preferred conveyance service offering is not identified prior to compiling one or more of a heat map, a real time or near real time heat map, a historical heat map, a predictive heat map, or a combination thereof.

In a further embodiment of the present invention includes a real time or near real time heat map is compiled from the statistical variable of all or some of the plurality of conveyance service offerings, all or some of the plurality of filtered conveyance service offerings, all or some of the preferred conveyance service offering, the conveyance client preference, or a combination thereof.

A historical heat map may be compiled from the statistical variable of all or some of past the plurality of conveyance service offerings, all or some of past the plurality of filtered conveyance service offerings, all or some of past the preferred conveyance service offering, the conveyance client preference, or a combination thereof.

A predictive heat map may be compiled from the statistical variable of all or some of past the plurality of conveyance service offerings, all or some of past the plurality of filtered conveyance service offerings, all or some of past the preferred conveyance service offering, all or some of the plurality of conveyance service offerings, all or some of the plurality of filtered conveyance service offerings, all or some of the preferred conveyance service offering, the conveyance client preference, or a combination thereof.

The predictive heat map identifies or estimates one or more of future conveyance service availability, future pricing, future elevated pricing, future conveyance service offering, future filtered conveyance service offering density, future preferred conveyance service offering density, future level of service density, future conveyance industry segment density, future representative density, future conveyance client density, future service provider density, future good supplier density, future level of service supply, future conveyance industry segment supply, future conveyance service supply, future service provider supply, future good supplier supply, future conveyance service demand, future conveyance client demand, or a combination thereof.

The predictive heat map can generate a visual notification or audio notification to notify the conveyance client of a future change or update to the statistical variable, the measurement of the statistical variable, or a combination thereof.

Another embodiment includes wherein the preferred conveyance service offering, all or some of the plurality of filtered conveyance service offerings, all or some of the plurality of conveyance service offerings, all or some of subsequent or additional the plurality of filtered conveyance service offerings, all or some of subsequent or additional the preferred conveyance service offering, all or some of the real time or near real time geographical location of the conveyance client, the conveyance client preference, the beginning service geographical location, the ending service geographical location, or a combination thereof, is identified or updated in real time or near real time as the real time or near real time geographical location of the conveyance client updates or changes or as traffic information updates or changes.

An embodiment includes wherein the conveyance client browses or navigates an area of the visual representation to identify and then secure the preferred conveyance service offering or the filtered conveyance service offering by selecting or accepting the preferred conveyance service offering, the filtered conveyance service offering, the conveyance client preference, or a combination thereof.

Another embodiment includes wherein the application, the terminal, the central server, the external server, a link, or a combination thereof, is combined or integrated.

Another embodiment includes wherein the preferred conveyance service offering, all or some of the plurality of filtered conveyance service offerings, all or some of the plurality of conveyance service offerings, all or some of the real time or near real time geographical location of the conveyance client, the conveyance client preference, all or some of subsequent or additional the plurality of filtered conveyance service offerings, all or some of subsequent or additional the preferred conveyance service offering, a secured preferred conveyance service offering, the beginning service geographical location, the ending service geographical location, or a combination thereof, is transmitted in real time or near real time between the application and the central server and updated in real time or near real time by way of a link between the application and the central server.

Another embodiment includes wherein the preferred conveyance service offering, all or some of the plurality of filtered conveyance service offerings, all or some of the plurality of conveyance service offerings, all or some of the real time or near real time geographical location of the conveyance client, the conveyance client preference, all or some of subsequent or additional the plurality of filtered conveyance service offerings, all or some of subsequent or additional the preferred conveyance service offering, a secured preferred conveyance service offering, the beginning service geographical location, the ending service geographical location, or a combination thereof, is transmitted in real time or near real time between the application and the external server and updated in real time or near real time by way of a link between the application and the external server.

Another embodiment includes wherein the preferred conveyance service offering, all or some of the plurality of filtered conveyance service offerings, all or some of the plurality of conveyance service offerings, all or some of the real time or near real time geographical location of the conveyance client, the conveyance client preference, all or some of subsequent or additional the plurality of filtered conveyance service offerings, all or some of subsequent or additional the preferred conveyance service offering, a secured preferred conveyance service offering, the beginning service geographical location, the ending service geographical location, or a combination thereof, is transmitted in real time or near real time between the central server and the external server and updated in real time or near real time by way of a link between the central server and the external server.

Example 4: Conveyance Client Maps

A fourth aspect of the present invention includes a real time or near real time method to assist a conveyance client in a process of securing a preferred conveyance service offering relating to a conveyance client preference and a real time or near real time geographical location of the conveyance client by using a visual representation, the method being carried out in a system of Example 3.

Figure 8:
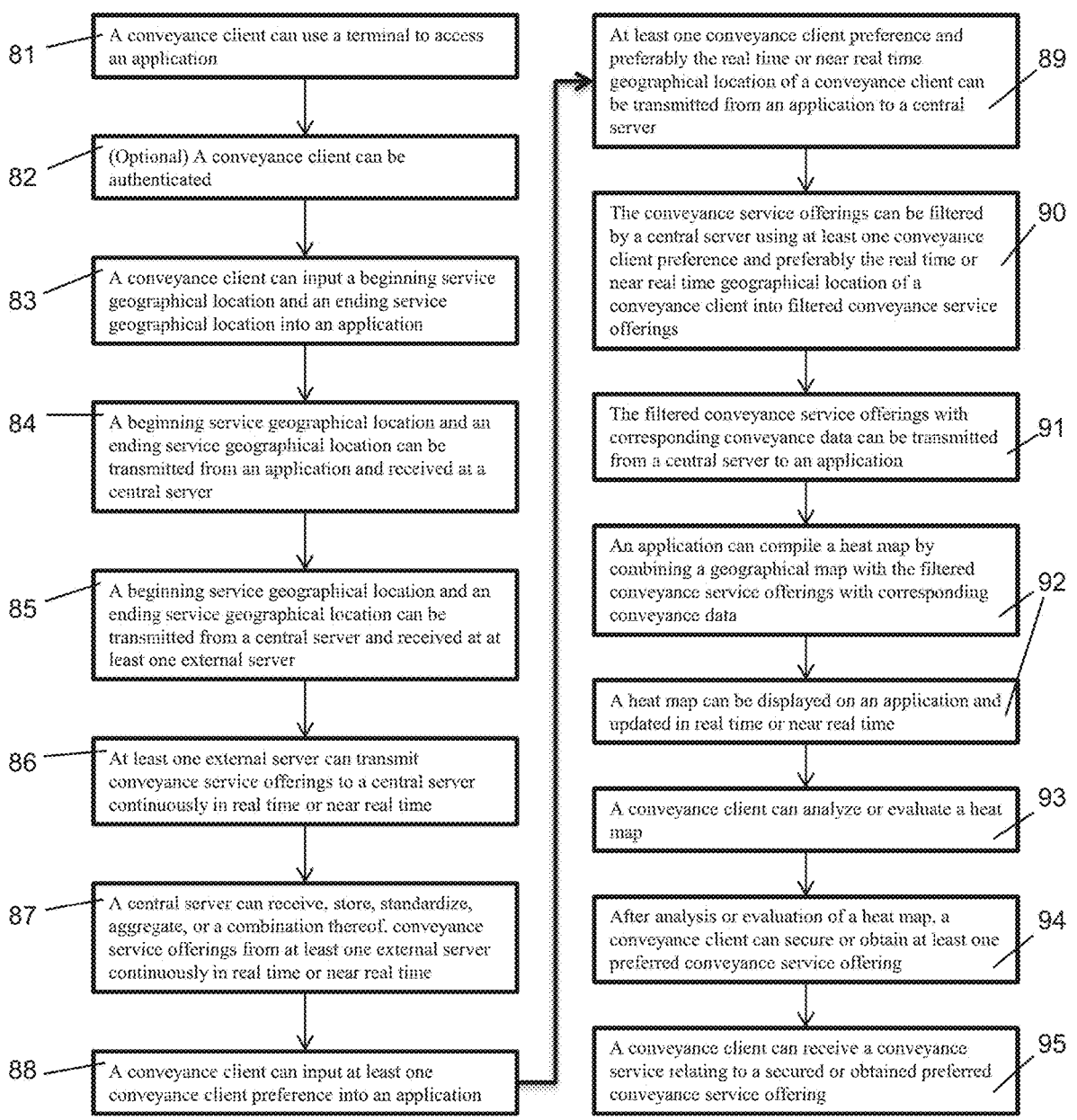
FIG. 8 is a flow diagram of steps according to an embodiment of the present invention that utilizes conveyance client preferences.

FIG. 8 provides as a flowchart of steps of an exemplary method in which a benefit is provided to a conveyance client 1. The flowchart describes steps of how a conveyance client 1 can secure a preferred conveyance service offering 18 by analyzing or evaluating a visual representation, in this example, a heat map 12. A link can be a connection or an association with a software function or a software component relating to an application 6, a terminal 7, a central server 9, an external server 10, or a combination thereof. Referring to FIG. 8:

Step 81. A conveyance client uses a terminal to access an application.

Step 82. The conveyance client can optionally be authenticated.

Step 83. The conveyance client enters a beginning service geographical location and an ending service geographical location.

Step 84. The beginning service geographical location and the ending service geographical location are transmitted to the central server.

Step 85. A beginning service geographical location and an ending service geographical location are transmitted from the central server to the external server.

Step 86. Conveyance service offering are transmitted continuously from the external server to the central server.

Step 87. The conveyance service offerings can be stored, standardized, and/or aggregated, at least once on the central server.

Step 88. The conveyance client uses the application to enter conveyance client preference(s).

Step 89. The conveyance client preference(s) and the client's geographical location are transmitted to the central server.

Step 90. The conveyance service offering(s) can be filtered by the central server according to the conveyance client preference(s) and the client's geographical location to generate filtered conveyance service offering(s).

Step 91. The filtered conveyance service offering(s) are transmitted from the central server to the application.

Step 92. The application compiles a heat map by combining a geographical map with conveyance data relating to the filtered conveyance service offering. The heat map can be displayed on the application and updated in substantially real time.

Step 93. The conveyance client evaluates the heat map.

Step 94. After evaluating the heat map, the conveyance client can use the application to secure a preferred conveyance service offering.

Step 95. A conveyance client can then receive the conveyance service.

Using an example within the ride-hail industry segment and referring to FIGS. 6 and 7, a conveyance client 1 can be a passenger, a representative 2 can be a driver, and a preferred conveyance service offering 18 can be a ride service offering. A central server 9 can continuously receive conveyance service offerings 16 from more than one external server 10 by way of a link 8 in real time or near real time and can store, standardize, and aggregate conveyance service offerings 16 in real time or near real time. A central server 9 can sort filtered conveyance service offerings 17 in real time or near real time, or use another technique, to identify a preferred conveyance service offering 18. A conveyance client 1 can access an application 6 using a terminal 7 to gain knowledge of the ride-hail industry segment, such as current prices of conveyance service offerings 16. When a conveyance client 1 would like to receive a ride in the ride-hail industry segment, a conveyance client 1 would optionally login to an application 6 and be authenticated.

Once logged into an application 6, a conveyance client 1 can input or provide a beginning service geographical location, an ending service geographical location, and a conveyance client preference 4 into an application 6. In this example, a conveyance client 1 can input or provide one conveyance client preference 4, a pricing preference. A pricing preference can be, e.g., a preference of elevated pricing of no more than 2× normal pricing for the cost of a conveyance service.

The conveyance client preference 4 allows a conveyance client 1 to evaluate a heat map 12 with filtered conveyance service offerings 17 that are more desirable to a conveyance client 1. Central server 9 can filter out conveyance service offerings 16 that do not match or satisfy the conveyance client preference 4 for a conveyance client 1. Benefits of conveyance client preferences 4 can be to allow a conveyance client 1 to better meet their criteria in receiving a conveyance service such as lower pricing, shorter wait time, shorter time to destination, more suitable conveyance service offerings 16, or a combination thereof. The conveyance client preference 4 for this example and the real time or near real time geographical location of a conveyance client 1 can be transmitted to a central server 9 by way of a link 8.

A central server 9 can filter conveyance service offerings 16 into filtered conveyance service offerings 17 by comparing to a conveyance client preference 4 and the real time or near real time geographical location of a conveyance client 1. Conveyance service offerings 16 that match the indicated two conveyance client preferences 4 can be identified as filtered conveyance service offerings 17. Conveyance service offerings 16 that do not match the indicated two conveyance client preferences 4 can be discarded or ignored as not being filtered conveyance service offerings 17. Preferably, additional conveyance service offerings 16 can be received and continuously filtered by a central server 9 into additional filtered conveyance service offerings 17.

Filtered conveyance service offerings 17 can be transmitted from a central server 9 to an application 6 by way of a link 8. An application 6 can then compile a heat map 12 displaying, e.g., elevated pricing metrics of filtered conveyance service offerings 17 as distinguishable shades of color on a heat map 12. A heat map 12 can be compiled on an application 6 by combining a geographical map relating to the real time or near real time geographical location of a conveyance client 1 with conveyance data relating to elevated pricing metrics of filtered conveyance service offerings 17. Conveyance data relating to the elevated pricing metrics of filtered conveyance service offerings 17 can be positioned on a heat map 12 relating to corresponding geographical locations contained therein. A heat map 12 can be refreshed continuously in real time or near real time with updated conveyance data relating to the elevated pricing metrics of filtered conveyance service offerings 17.

A conveyance client 1 can then visually evaluate a heat map 12 prior to securing a filtered conveyance service offering 17 or a preferred conveyance service offering 18 after which the conveyance client receives the requested conveyance service.

In one example, service providers 5 #1 and #2 can display elevated pricing of 1.5× at the real time or near real time geographical location of a conveyance client 1. Service provider 5 #3 can display elevated pricing of 2× at the real time or near real time geographical location of a conveyance client 1 and elevated pricing of 1.8× one hundred yards east of the real time or near real time geographical location of a conveyance client 1. Conveyance client 1 can evaluate a heat map 12 and find that just two hundred feet north of the real time or near real time geographical location of a conveyance client 1, there is no elevated pricing for service provider 5 #1.

In this example, a conveyance client 1 chooses to walk from his or her current location north two hundred feet to secure the preferred conveyance service offering 18 with no elevated pricing from service provider 5 #1. A conveyance client 1 can receive a conveyance service from service provider 5 #1.

The application 6, central server 9, external server (s) 10, terminal 7, link 8, or a combination thereof, can be combined or integrated. The conveyance client 1 can utilize a visual representation that can display a heat map 12 on terminal 7 that can be integrated or associated with application 6, central server 9, external server(s) 10, link 8, or a combination thereof.

Figure 9:
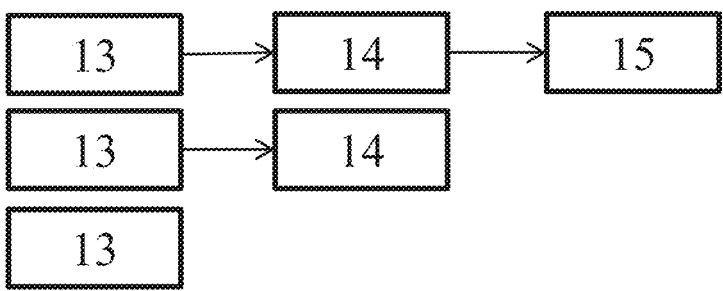
FIG. 9 is a flow diagram of a sample filtering process according to an embodiment of the present invention that utilizes representative preferences.

FIG. 9 provides a flowchart of the steps involved in an exemplary transformation of a conveyance service request 13 into a preferred conveyance service request 15 according to an embodiment of the invention.

Once a central server 9 receives a conveyance service request 13 from an external server 10, a central server 9 can filter a conveyance service request 13 using a representative preference 3 and the real time or near real time geographical location of a representative 2 into a filtered conveyance service request 14. A central server 9 can calculate the weighted average of a representative preference 3. A central server 9 can sort a filtered conveyance service request 14 in an order relating to the corresponding weighted averages to identify one or more preferred conveyance service request 15. A preferred conveyance service request 15 can be identified by a central server 9 as a filtered conveyance service request 14 that has the highest weighted average from a filtered conveyance service request 14. Not every conveyance service request 13 can become a filtered conveyance service request 14 and not every filtered conveyance service request 14 can become a preferred conveyance service request 15. One or more function of a central server 9 can be performed by an application 6. A link can be a connection or an association with a software function or a software component relating to an application 6, a terminal 7, a central server 9, an external server 10, or a combination thereof.

Figure 10:
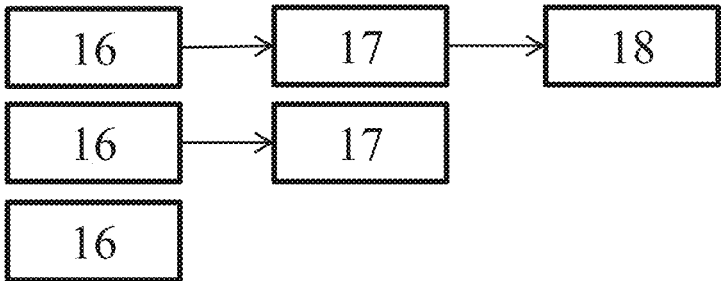
FIG. 10 is a flow diagram of a sample filtering process according to an embodiment of the present invention that utilizes conveyance client preferences.

FIG. 10 provides a flowchart of the steps involved in the transformation of a conveyance service offering 16 into a preferred conveyance service offering 18 according to an embodiment of the invention. Once a central server 9 receives a conveyance service offering 16 from an external server 10, a central server 9 can filter a conveyance service offering 16 using a conveyance client preference 4 and the real time or near real time geographical location of a conveyance client 1 into a filtered conveyance service offering 17. A central server 9 can calculate the weighted average of a conveyance client preference 4. A central server 9 can sort a filtered conveyance service offering 17 in an order relating to the corresponding weighted averages to identify a preferred conveyance service offering 18. A preferred conveyance service offering 18 can be identified by a central server 9 as one or more filtered conveyance service offering 17 that has the highest weighted average from a filtered conveyance service offering 17. Not every conveyance service offering 16 can become a filtered conveyance service offering 17 and not every filtered conveyance service offering 17 can become a preferred conveyance service offering 18. One or more function of a central server 9 can be performed by an application 6.

Example 5: Conveyance Client Maps

A fifth aspect of the present invention includes a real time or near real time method to assist a conveyance client in a process of securing, within the conveyance industry, a preferred conveyance service offering relating to a conveyance client preference and a real time or near real time geographical location of the conveyance client by using a visual representation that may be generated in the system of Example 3.

Figure 11:
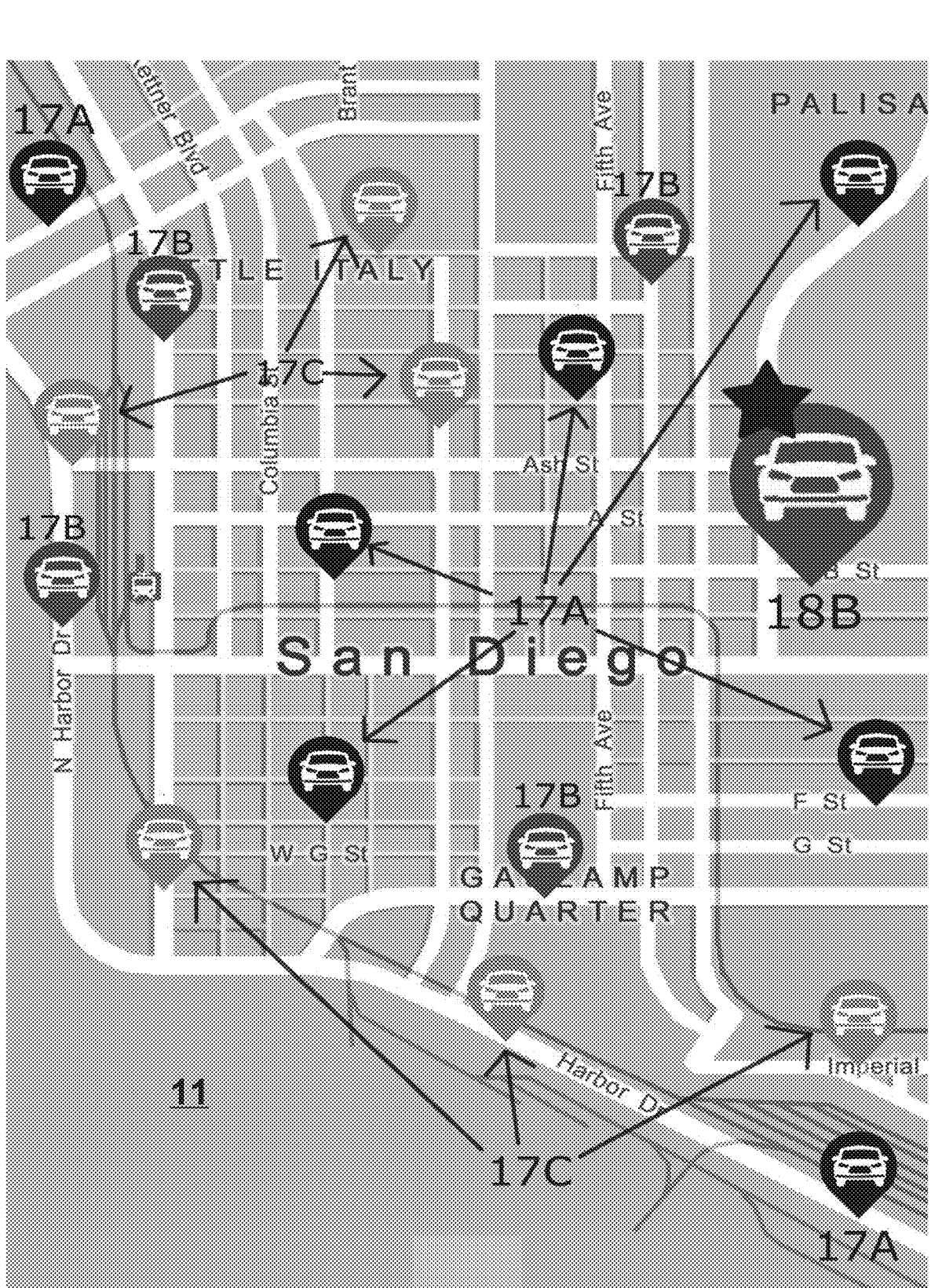
FIG. 11 is a sample display of a dynamic map according to an embodiment of the invention that utilizes conveyance client preferences.

FIG. 11 provides an example of a dynamic map that can be generated according to the system and method for use by the conveyance client to evaluate and then secure a preferred conveyance service offering 18B. The filtered conveyance service offerings 17A, 17B, and 17C and the preferred conveyance service offering 18B are associated with different service providers 5A, 5B, and 5C respectively.

The preferred conveyance service offering 18B can be visually identifiable compared to the filtered conveyance service offerings 17A, 17B, and 17C. In this figure, a star is used in addition to a larger icon to demonstrate the preferred conveyance service offering 18B as being visually identifiable. At least one different icon, symbol, color, shade, or visual can be used to identify individual filtered conveyance service offerings 17A, 17B, and 17C and the preferred conveyance service offering 18B that are from different service providers 5. In this figure, icons displaying a car are ride service offerings from the ride-hail industry segment. Each individual icon, symbol, color, shade, or visual can be mobile or dynamic and updated in real time or near real time on an application 6.

Figure 12:
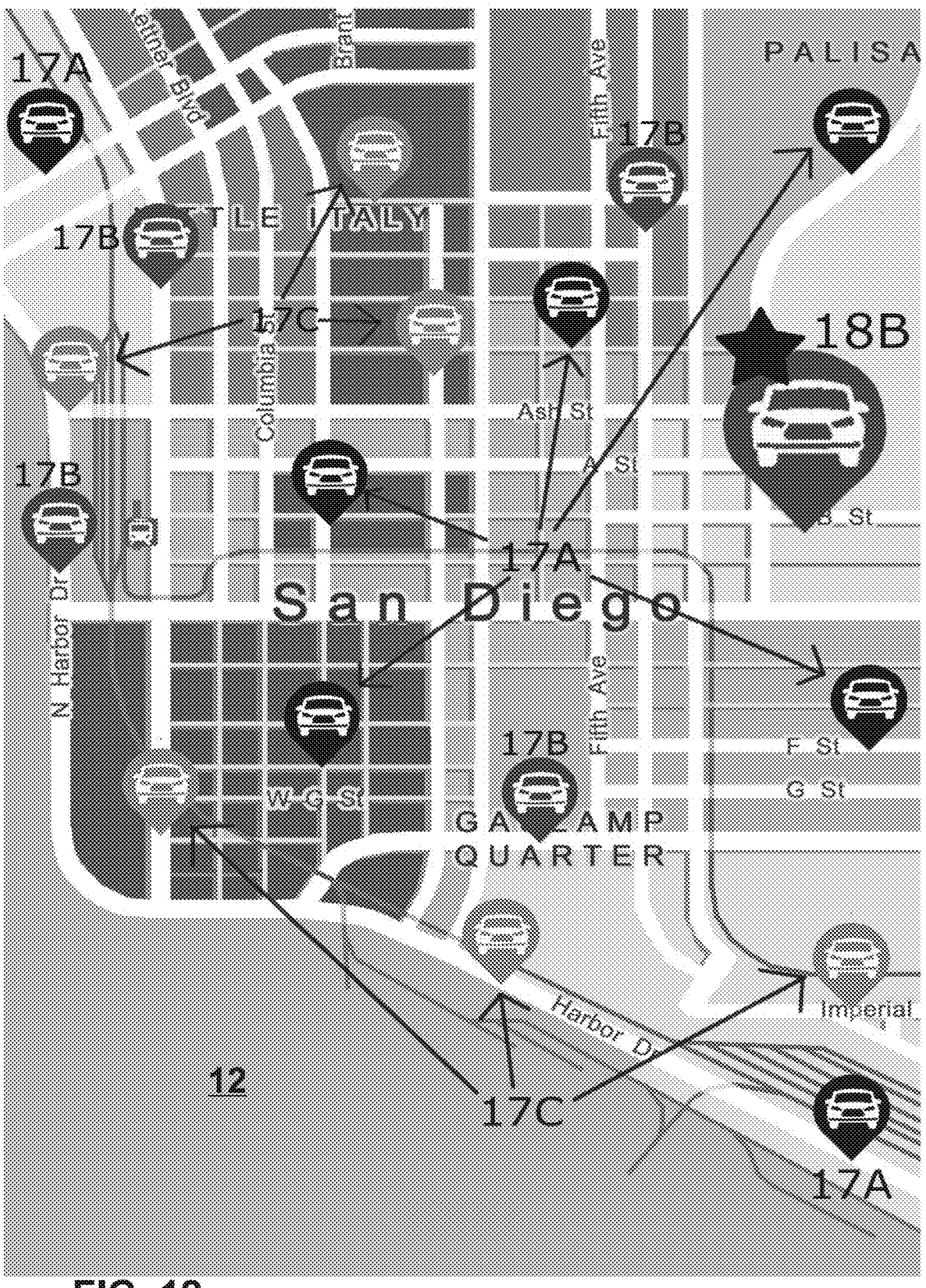
FIG. 12 provides a sample display of a combination of a dynamic map and a heat map according to an embodiment of the invention that utilizes conveyance client preferences.
Figure 13:
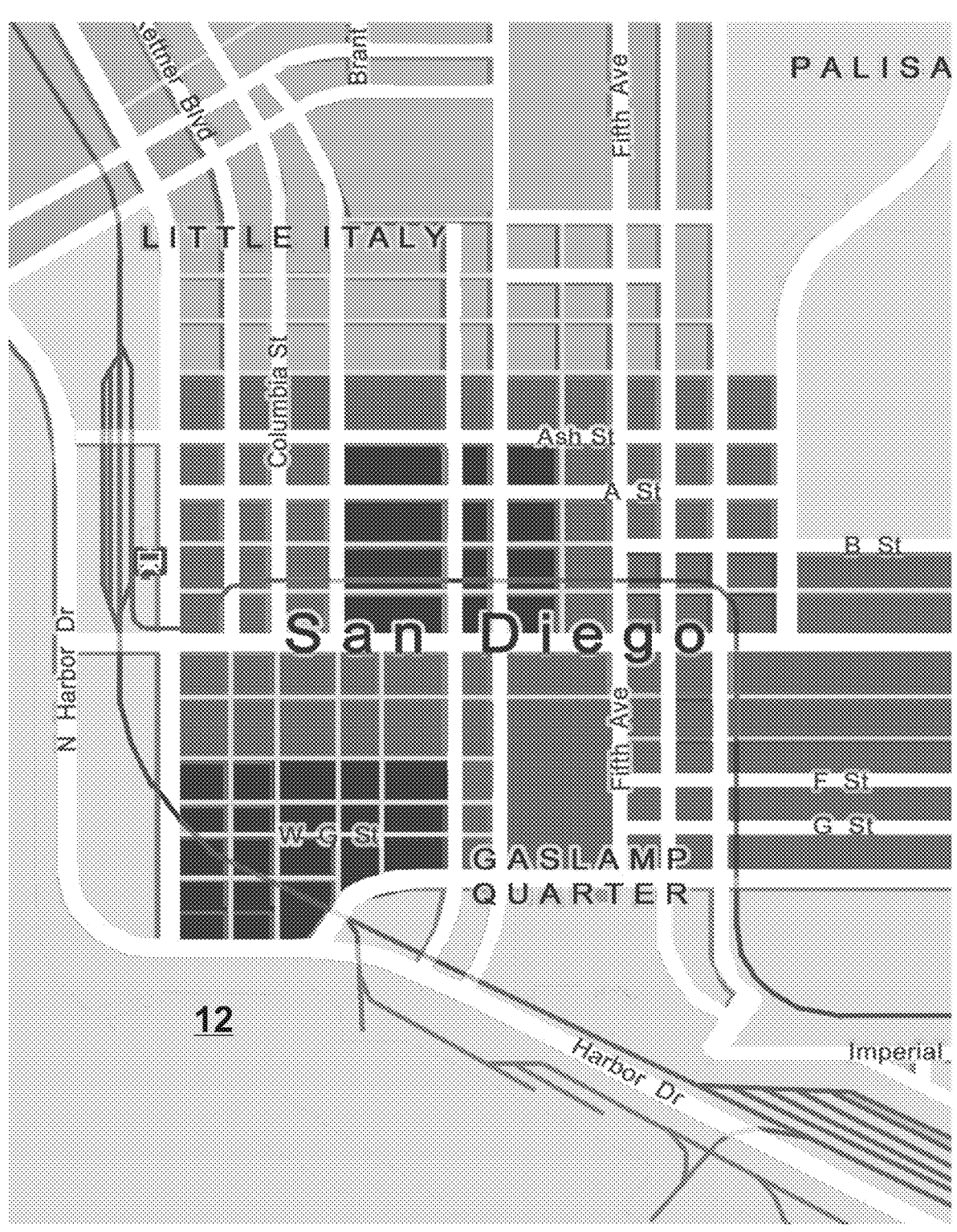
FIG. 13 provides a sample display of a combination of a dynamic map and a heat map according to an embodiment of the invention that utilizes representative preferences and conveyance client preferences.
Figure 14:
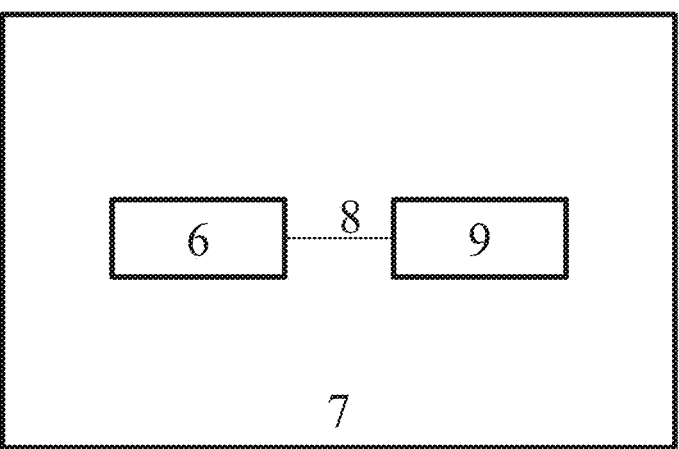
FIG. 14 is a schematic showing a sample integration of hardware and software according to an embodiment of the present invention.

FIG. 12 relates to an exemplary implementation a combination of a dynamic map 11 and a heat map 12 that can be generated to assist a conveyance client 1. A combination of a dynamic map 11 and a heat map 12 can be used by the conveyance client 1 to evaluate on both a micro and macro level view of a conveyance industry segment and then secure the preferred conveyance service offering 18B. The filtered conveyance service offerings 17A, 17B, and 17C and the preferred conveyance service offering 18B are associated with different service providers 5A, 5B, and 5C respectively.

The preferred conveyance service offering 18B can be visually identifiable compared to the filtered conveyance service offerings 17A, 17B, and 17C. In this figure, a star is used in addition to a larger icon to demonstrate the preferred conveyance service offering 18B as being visually identifiable. At least one different icon, symbol, color, shade, or visual can be used to identify individual filtered conveyance service offerings 17A, 17B, and 17C and the preferred conveyance service offering 18B that are from different service providers 5. In this figure, icons displaying a car are ride service offerings from the ride-hail industry segment. Each individual icon, symbol, color, shade, or visual can be mobile or dynamic and updated in real time or near real time on an application 6.

The sample dynamic map shown in FIG. 12 displays filtered conveyance service offerings 17A, 17B, and 17C and the preferred conveyance service offering 18B in combination with a heat map showing areas with elevated pricing. Areas of the combination of a dynamic map and a heat map can be shaded or patterned in proportion to the measurement of an elevated pricing metric being displayed on a geographical map. Darker shaded areas can represent areas with higher elevated pricing whereas lighter shaded areas can represent areas with lower elevated pricing or potentially no elevated pricing. A conveyance client 1 can use this combination of a dynamic map and a heat map to analyze and identify areas of elevated pricing to position themselves in areas of lower pricing shown as lighter shaded areas. In this figure, the conveyance client 1 can walk to a lighter shaded area with lower pricing and then secure the preferred conveyance service offering 18B.

Example 6: Conveyance Client Maps

The following example illustrates the steps within the processing of conveyance service offerings 16 to provide filtered conveyance service offerings 17 and then a preferred conveyance service offering 18 using a system such as that shown in FIG. 7. A conveyance client 1 can be a passenger, a representative 2 can be a driver, and a preferred conveyance service offering 18 can be a ride service offering. In this example, a conveyance client 1 can use a dynamic map 11 to secure a preferred conveyance service offering 18.

A central server 9 can receive conveyance service offerings 16 from an external server 10 continuously or repeatedly in real time or near real time. A central server 9 can store, standardize, aggregate, or a combination thereof, conveyance service offerings 16 in any order. A conveyance client 1 can input or provide two conveyance client preferences 4, the real time or near real time geographical location of a conveyance client 1, or a combination thereof, to a central server 9.

A central server 9 can compare conveyance service offerings 16 to the real time or near real time geographical location of a conveyance client 1 and discard or ignore conveyance service offerings 16 that are not associated with selected service providers 5. A subset of conveyance service offerings 16 that match or satisfy a service provider inclusion preference can be identified as filtered conveyance service offerings 17.

A service provider inclusion preference can be given a weight of 40% by a conveyance client 1 and can be set to include only Company A and Company B. A filtered conveyance service offering 17 associated with Company A and Company B can be assigned a score of 10 out of 10 by a central server 9. A filtered conveyance service offering 17 not associated with Company A and Company B can be assigned a score of 0 out of 10 by a central server 9.

A pricing preference can be given a weight of 60% and can be set by a conveyance client 1 to include filtered conveyance service offerings 17 that cost less than $20.00. A filtered conveyance service offering 17 that costs more than $20.00 can be assigned a score of 0 out of 10 by a central server 9. A filtered conveyance service offering 17 that costs between $10.00-$20.00 can be assigned a score of 5 out of 10 by a central server 9. A filtered conveyance service offering 17 that costs less than $10.00 can be assigned a score of 10 out of 10 by a central server 9.

A filtered conveyance service offering 17 associated with Company A and costs $15.00 can be calculated or determined by a central server 9 as having a weighted average of (40% of 10) plus (60% of 5) that can equal 7 based on a service provider inclusion preference and a pricing preference. A filtered conveyance service offering 17 can be sorted in a descending order relating to a weighted average of 7 in this instance and can be identified as a preferred conveyance service offering 18 in comparison to other filtered conveyance service offerings 17 with lower weighted averages.

A conveyance client 1 can evaluate a dynamic map such as the example shown in FIG. 11, and then secure a preferred conveyance service offering 18 relating to Company A and costs $15.00. A conveyance client 1 can receive a conveyance service provided by Company A.

Example 7: Representative Preferences

This example describes use of the inventive method and system by a representative who enters a representative preference to identify and secure a preferred conveyance service request. For purposes of this example, reference is made to FIGS. 1-3.

Using an example in a freight delivery industry segment, a conveyance client 1 can be a company that orders biohazardous material, a representative 2 can be a truck driver, and a preferred conveyance service request 15 can be a freight delivery service request.

A central server 9 can receive conveyance service requests 13 from an external server 10 continuously or repeatedly in real time or near real time and can pre-categorize conveyance service requests 13 by city. A central server 9 can store, standardize, aggregate, or a combination thereof, conveyance service requests 13 in any order. A representative 2 can input or provide one or more representative preference 3, the real time or near real time geographical location of a representative 2, or a combination thereof, to a central server 9.

A central server 9 can compare pre-categorized conveyance service requests 13 to the real time or near real time geographical location of a representative 2 and discard or ignore conveyance service requests 13 being in a different city other than a representative 2. A subset of conveyance service requests 13 within the city of a representative 2 that also matches or satisfies a freight preference can be identified as filtered conveyance service requests 14.

To illustrate, a freight preference can be given a weight of 100% and can be set to include only conveyance service requests 13 relating to conveying biohazardous materials. A filtered conveyance service request 14 relating to conveying biohazardous materials can be assigned a score of 10 out of 10 by a central server 9. A filtered conveyance service request 14 not relating to conveying biohazardous materials can be assigned a score of 0 out of 10 by a central server 9.

A filtered conveyance service request 14 in a freight delivery industry segment that relates to conveying biohazardous materials can be calculated or determined by a central server 9 as having a weighted average of (100% of 10) that can equal 10 based on a freight preference. A maximum function can be utilized to identify a filtered conveyance service request 14 having the highest weighted average in comparison to other filtered conveyance service requests 14 with lower weighted averages as a preferred conveyance service request 15. A representative 2 can secure the preferred conveyance service request 15.

Example 8: Conveyance Client Preferences

This example illustrates the use of the inventive system and method by a conveyance client who enters one or more conveyance client preference to identify and secure a preferred conveyance service offering. For purposes of this example, reference can be made to FIGS. 6-8.

In a sample application to a food delivery industry segment, a conveyance client 1 can be a person that can order food, a representative 2 can be a driver, and a preferred conveyance service offering 18 can be a food delivery service offering.

A central server 9 can receive conveyance service offerings 16 from an external server 10 continuously or repeatedly in real time or near real time and can pre-categorize conveyance service offerings 16 by zip code. A central server 9 can store, standardize, aggregate, or a combination thereof, conveyance service offerings 16 in any order. A conveyance client 1 can input or provide one conveyance client preference 4, the real time or near real time geographical location of a conveyance client 1, or a combination thereof, to a central server 9.

A central server 9 can compare pre-categorized conveyance service offerings 16 to the real time or near real time geographical location of a conveyance client 1 and discard or ignore conveyance service offerings 16 being in a different zip code area other than a conveyance client 1. A subset of conveyance service offerings 16 within the zip code area of a conveyance client 1 that also matches or satisfies an estimated time of arrival preference can be identified as filtered conveyance service offerings 17.

In this example, an estimated time of arrival preference can be given a weight of 100% and can be set to less than twenty minutes by a conveyance client 1. A filtered conveyance service offering 17 with an estimated time of arrival of more than twenty minutes can be assigned a score of 10 out of 10 by a central server 9. A filtered conveyance service offering 17 with an estimated time of arrival of less than or equal to twenty minutes can be assigned a score of 0.5 per minute by a central server 9. A filtered conveyance service offering 17 with an estimated time of arrival of fourteen minutes can be assigned a score of 7 out of 10 or a filtered conveyance service offering 17 with an estimated time of arrival of six minutes can be assigned a score of 3 out of 10.

A filtered conveyance service offering 17 in a food delivery industry segment with an estimated time of arrival of four minutes can be calculated or determined by a central server 9 as having a weighted average of (100% of 2) that can equal 2 based on an estimated time of arrival preference. A minimum function can be utilized to identify a filtered conveyance service offering 17 having the lowest weighted average in comparison to other filtered conveyance service offerings 17 with higher weighted averages as a preferred conveyance service offering 18. A conveyance client 1 can secure the preferred conveyance service offering 18.

Example 9: Automated Platform

Figure 15:
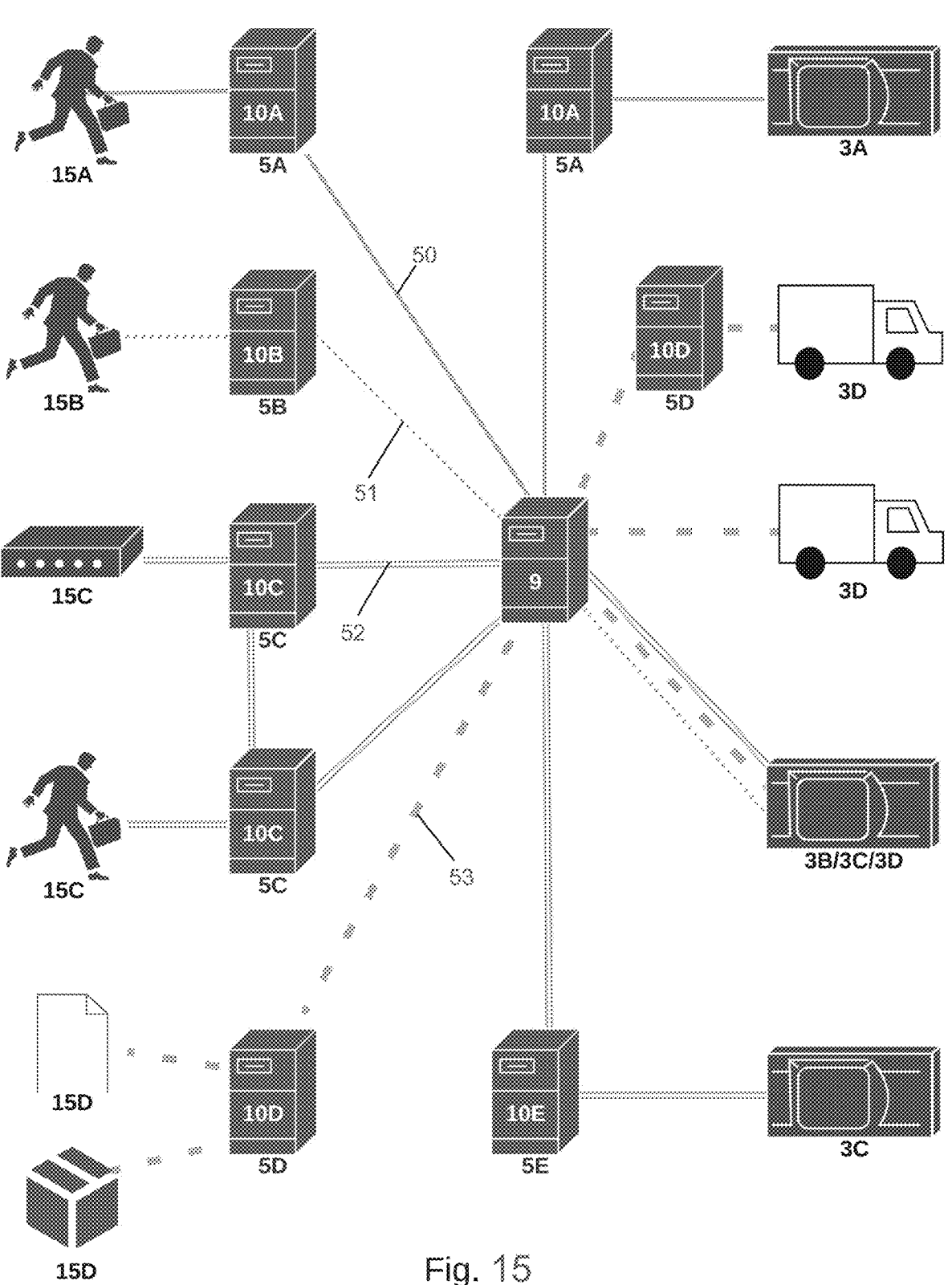
FIG. 15 is a diagram showing an automated platform according to embodiment of the present invention.

FIG. 15 illustrates a macro level view of an exemplary automated platform through which an AV owner/controller, a fleet manager, a good supplier, a service provider 5, a logistics provider, a logistics supplier, or a combination thereof, can benefit. In this example, at least five different scenarios relating to a service provider 5, can be implemented via the automated platform.

Each individual service provider 5 can be displayed with a corresponding letter A, B, C, D, and E to identify different service providers 5. Each individual service provider 5A, 5B, 5C, and 5D can be displayed for example, with a different or unique line representing direct or indirect connections. A service provider 5E or a fleet manager can manage or operate a fleet of autonomous vehicles 3 for another service provider 5C, which is demonstrated and displayed as having a same double solid line as service provider 5C. Each individual service provider 5 can use or utilize an external server 10 in conjunction with a central server 9.

A conveyance service request 15A can be a ride-hail request submitted to an external server 10A associated with a service provider 5A, as indicated by a single solid line. A conveyance service request 15B can be a ride-hail request submitted to an external server 10B associated with a service provider 5B, as indicated by a circular dotted line. Conveyance service requests 15C can be a food delivery request and a ride-hail request that can come from two external servers 10C associated with a service provider 5C, as both can be indicated by a double solid line. Conveyance service requests 15D can be a courier delivery request and a good delivery request submitted to one external server 10D associated with a service provider 5D or good supplier, as indicated by a rectangular dotted line. There are no conveyance service requests 15 submitted to external server 10E associated with service provider 5E or fleet manager.

As illustrated, each individual service provider 5 can control, own, operate, or manage a service provider 5 network that can have a different feature or a different variation. Each individual service provider 5 network can be displayed with a different combination of a connection. Each individual service provider 5 network can display a data flow, via a different or unique line, and who each individual service provider 5 can communicate with. A link can be a connection or an association with a software function or a software component relating to an application 6, an owner/controller application, a terminal 7, a central server 9, an external server 10, or a combination thereof.

A conveyance service request 15A can be a ride-hail request submitted by a conveyance client 1 to an external server 10A associated with a service provider 5A, as indicated by single solid line 50. A conveyance service request 15B can be a ride-hail request submitted by a conveyance client 1 to an external server 10B associated with a service provider 5B, as indicated by circular dotted line 51. Conveyance service requests 15C can be a food delivery request and a ride-hail request that can come from two external servers 10C associated with a service provider 5C, as both can be indicated by double solid line 52. Conveyance service requests 15D can be a courier delivery request and a good delivery request submitted by two conveyance clients 1 to one external server 10D associated with service provider 5D or good supplier, as indicated by dashed line 53. There are no conveyance service requests 15 submitted to an external server 10E associated with a service provider 5E or fleet manager.

Each individual service provider 5 can be displayed with a corresponding letter A, B, C, D, and E to identify different service providers 5. Each individual service provider 5 can optionally have or utilize an owner/controller application 11. Each individual service provider 5A, 5B, 5C, and 5D can be displayed for example, with a different or unique line representing direct or indirect lines of connections. A service provider 5E or a fleet manager can manage or operate a fleet of autonomous vehicles 3 for another service provider 5C, which is demonstrated and displayed as having a same double solid line as service provider 5C.

Each service provider 5 can utilize an external server 10 in conjunction with a central server 9. In this example, a ride-hail request, which is illustrated with a human and briefcase icon or visual, can be characterized as a conveyance service request 15A in conjunction with corresponding conveyance data and can be received, managed, operated, or a combination thereof, on or at one external server 10A that can be associated with service provider 5A. In this example, a service provider 5A can utilize one external server 10A in conjunction with a central server 9 to manage a conveyance service request 15A in conjunction with corresponding conveyance data and another or separate external server 10A in conjunction with the central server 9 for managing or controlling an autonomous vehicle 3A, conveyance data relating to an autonomous vehicle 3A, a substantially real time geographical location of an autonomous vehicles 3A, or a combination thereof. In this example, a service provider 5A can utilize two different external servers 10A in conjunction with a central server 9 that can manage an on-demand service provider 5A network and match the supply of an autonomous vehicle 3A for or with the demand for ride-hail requests.

A service provider 5B can be associated with one external server 10B in conjunction with a central server 9, that can receive, store, standardize, aggregate, or a combination thereof, a conveyance service request 15B in conjunction with corresponding conveyance data. In this example, a ride-hail request, which is illustrated with a human and briefcase icon or visual, can be characterized as a conveyance service request 15B in conjunction with corresponding conveyance data and can be received, stored, or managed on or at one external server 10B in conjunction with a central server 9. In this example, a service provider 5B does not own or control one external server 10B in conjunction with a central server 9 to manage or operate an autonomous vehicle 3B, conveyance data relating to an autonomous vehicle 3B, a substantially real time geographical location of an autonomous vehicle 3B, or a combination thereof, but does have direct communication to or with an autonomous vehicle 3B through a central server 9.

Both external servers 10C in conjunction with a central server 9 can utilize a database table for pre-categorizing, categorizing, storing, organizing, or a combination thereof, all or some of conveyance service requests 15C in conjunction with corresponding conveyance data. In this example, a food delivery request, which is illustrated with a pizza box icon or visual, can be characterized as a conveyance service request 15C in conjunction with corresponding conveyance data and can be received, categorized, stored, operated, and/or organized in one external server 10C in conjunction with a central server 9. A ride-hail request, which is illustrated with a human and briefcase icon or visual, can be characterized as a conveyance service request 15C in conjunction with corresponding conveyance data and can be received, categorized, stored, operated, or organized at a separate external server 10C in conjunction with the central server 9. A service provider 5C can utilize two different external servers 10C or at least two different database tables in conjunction with a central server 9 to manage or control all or some of conveyance services based on an individual conveyance industry segment. In this example, a service provider 5C is the only service provider 5 that can configure both external servers 10C communicate directly with each other, as illustrated by a double solid line between both external servers 10C. In this example, a service provider 5C can update or change a selected preference 19 or all or some of conveyance service requests 15C in conjunction with corresponding conveyance data that can be pre-categorized, categorized, stored, and/or organized on one external server 10C, an external server 10C, both external servers 10C, a central server 9, or a combination thereof.

A service provider 5D or good supplier can be associated with two external servers 10D in conjunction with a central server 9, which can store, standardize, and/or aggregate all or some of conveyance service requests 15D in conjunction with corresponding conveyance data, all or some of conveyance data relating to three autonomous vehicles 3D, all or some of the substantially real time geographical location of three autonomous vehicles 3D, or a combination thereof. In this example, a courier delivery request, which is illustrated with a document icon or visual, can be characterized as a conveyance service request 15D in conjunction with corresponding conveyance data and can be standardized, aggregated, organized, and/or managed in one external server 10D in conjunction with a central server 9.

In this example, a good delivery request, which is illustrated with a package icon or visual, can be characterized as a conveyance service request 15D in conjunction with corresponding conveyance data and can be standardized, aggregated, organized, and/or managed on or at the same external server 10D in conjunction with a central server 9. In this example, a service provider 5D or good supplier can utilize one external server 10D or a database table in conjunction with a central server 9 to administer all or some of conveyance services based on two different conveyance industry segments. In this example, a service provider 5D or a good supplier can utilize one external server 10D or a database table in conjunction with a central server 9 to administer all or some of conveyance service requests 15D in conjunction with corresponding conveyance data. In this example, a service provider 5D or a good supplier can utilize another or separate external server 10D or a database table in conjunction with the central server 9 to administer all or some of AVs 3D, all or some of conveyance data relating to three AVs 3D, all or some of the substantially real time geographical location of three AVs 3D, or a combination thereof. In this example, a service provider 5D or a good supplier can utilize two different external servers 10D in conjunction with a central server 9 to manage an on-demand delivery network with one external server 10D facilitating all or some of the supply of autonomous vehicles 3D and the other external server 10D facilitating all or some of the demand for conveyance services.

A service provider 5E or a fleet manager can be associated with one external server 10E in conjunction with a central server 9, which can store, pre-standardize, and/or aggregate conveyance data relating to an AV 3C, a substantially real time geographical location of an autonomous vehicle 3C, or a combination thereof, that can be directly or indirectly sourced or provided by a service provider 5C that can be associated with two external servers 10C in conjunction with a central server 9. In this example, a service provider 5E or a fleet manager can utilize one external server 10E in conjunction with a central server 9 to control or operate an autonomous vehicle 3C, that can only perform all or some of conveyance services for a service provider 5C.

Service provider 5E or a fleet manager can optionally manage or operate an external server 10C directly or indirectly with a central server 9, that can be associated with a service provider 5C. In this example, a ride-hail request, that is illustrated with a human and briefcase icon or visual, can be characterized as a conveyance service request 15C in conjunction with corresponding conveyance data that can be matched and secured or obtained for or with an autonomous vehicle 3C through an external server 10C, a central server 9, one external server 10E, or a combination thereof.

External servers 10A, 10B, 10C, 10D, and 10E, can be connected to a central server 9 by way of a link 8. Each link 8 can be displayed for example, with a different or unique line representing direct or indirect lines of connections between individual network participants contained therein.

A service provider 5A can only perform ride-hail requests because service provider 5A can only operate in the ride-hail industry segment, as evident with no other conveyance service requests 15 associated with a service provider 5A or an external server 10A. A service provider 5A can employ an automated platform that can only utilize an autonomous vehicle 3A to perform a conveyance service relating to a conveyance service request 15A. In this example, a service provider 5A can have their own autonomous vehicle 3A controlled or operated by a central server 9 in conjunction with one external server 10A and can have their own conveyance service request 15A controlled or operated by the central server 9 in conjunction with the other external server 10A.

Service provider 5A can optionally have direct or indirect communication between a central server 9 and an external server 10A by way of a link 8. In this example, a service provider 5A can demonstrate a preferred system, a preferred method, or a combination thereof, when operating a closed-end or private service provider 5 network. A service provider 5 can however utilize an automated platform that can allow or facilitate other autonomous vehicles 3 to perform conveyance services, as evident by an autonomous vehicle 3C being operated or controlled by a service provider 5E for a service provider 5C.

A service provider 5B can only provide ride-hail requests because service provider 5B can only operate in the ride-hail industry segment, as evident with no other conveyance service requests 15 associated with service provider 5B or external server 10B. In this example, a service provider 5B does have their own autonomous vehicle 3B, however, service provider 5B does not have the appropriate software or logistics to perform and execute conveyance services in an efficient manner and requires resources from a logistics provider. In this example, a service provider 5B can access logistics to perform a conveyance service from a service provider 5E or a fleet manager, as a service provider 5E is also a logistics provider and can provide access to service provider's 5E logistics capabilities for a fee. In this example, a service provider 5B can directly contract or use an autonomous vehicle 3B that can be associated with a service provider 5B by employing an automated platform that utilizes logistics from a service provider 5E to perform a ride-hail request relating to a conveyance service request 15B. In this example, an autonomous vehicle 3B can be illustrated as an autonomous vehicle 3B that can be operated, controlled, and/or managed on other service provider 5C and 5D networks, as indicated with the autonomous vehicle 3B having an additional 3C and 3D and displayed in FIG. 10 as AV 3B/3C/3D.

A service provider 5C can perform a ride-hail request and a food delivery request because a service provider 5C can operate in both the ride-hail industry segment and the food delivery industry segment, as evident with no other conveyance service requests 15 associated with a service provider 5C or both external servers 10C. In this example, a service provider 5C is the only service provider 5 that can categorize or pre-categorize all or some of conveyance service requests 15C in conjunction with corresponding conveyance data on two external servers 10C or at least two database tables in conjunction with a central server 9, based on an individual conveyance industry segment, which can improve efficiencies when a service provider 5 has the correct infrastructure, including both hardware and/or software. A service provider 5C can access and utilize an autonomous vehicle 3C through a central server 9 in conjunction with an external server 10C to perform a conveyance service relating to a conveyance service request 15C, being a food delivery request.

Service provider 5C can manage or operate an autonomous vehicle 3C that can be associated with a service provider 5C by employing an automated platform to perform a food delivery request relating to a conveyance service request 15C. In this example, a service provider 5C is the only service provider 5 that can own and lease out AV 3C to a service provider 5E or a fleet manager along with a conveyance service request 15C being the ride-hail request associated with an external server 10C, in return for access to service provider's 5E logistics. In this example, a service provider 5C needs service provider's 5E logistics as a service provider 5C cannot fulfill or execute conveyance services in an efficient manner due to a greater number of conveyance service requests 15 in multiple conveyance industry segments relative to a smaller number of AVs 3. As a result, a service provider 5E or a fleet manager can utilize an automated platform to gain access and operate on service provider's 5C network to perform or execute a conveyance service request 15C relating to a ride-hail request.

A service provider 5D can also be perceived or referred to as a good supplier. A service provider 5D or a good supplier can perform a courier delivery request and a good delivery request because a service provider 5D or a good supplier can operate in both, the courier industry segment and the good delivery industry segment, as evident with no other conveyance service requests 15 associated with a service provider 5D or an external server 10D. In this example, a service provider 5D or a good supplier is the only service provider 5 that can store, standardize, aggregate, manage, or a combination thereof, all or some of conveyance service requests 15D in conjunction with corresponding conveyance data on one external server 10D or a database table in conjunction with a central server 9, and the conveyance services are related to two different conveyance industry segments. In this example, a service provider 5D or good supplier can optionally utilize at least two database tables on a central server 9 in conjunction with one external server 10D relating to each individual conveyance industry segment.

A service provider 5D or good supplier can directly or indirectly access and utilize all or some of the three autonomous vehicles 3D to perform conveyance services relating to both conveyance service requests 15D. In this example, a service provider 5D or a good supplier is the only service provider 5 that controls or operates two different types of autonomous vehicles 3D. In this example, an autonomous vehicle 3D can be connected and controlled through both external servers 10D and a central server 9, which is illustrated with an autonomous truck icon or visual, that can be characterized as all or some of conveyance data relating to an autonomous vehicle 3D, a substantially real time geographical location of an autonomous vehicle 3D, or a combination thereof, on or at one external server 10D. In this example, an autonomous vehicle 3D can be connected and controlled through one external server 10D and a central server 9, which is illustrated with an autonomous truck icon or visual, that can be characterized as all or some of conveyance data relating to AV 3D, a substantially real time geographical location of an autonomous vehicle 3D, or a combination thereof, on the central server 9.

Autonomous vehicle 3D can be connected and controlled through one external server 10D and a central server 9, which is illustrated with an AV 3D icon or visual, that can be characterized as all or some of conveyance data relating to AV 3D, a substantially real time geographical location of an autonomous vehicle 3D, or a combination thereof, on the central server 9.

In this example, a service provider 5D or a good supplier can employ an automated platform to access and utilize the autonomous vehicle 3D with a truck icon through a central server 9 in conjunction with both external servers 10D to perform a conveyance service relating to a conveyance service request 15D, being a courier delivery request. In this example, a service provider 5D or a good supplier can employ an automated platform to access and utilize the autonomous vehicle 3D with a truck icon through a central server 9 in conjunction with one external server 10D to perform a conveyance service relating to a conveyance service request 15D, being a good delivery request. In this example, a service provider 5D or a good supplier can employ an automated platform to utilize and optionally lease time on the remaining autonomous vehicle 3D through a central server 9 in conjunction with an external server 10D to perform a conveyance service, when a service provider 5D or good supplier has excess supply of autonomous vehicles 3 or a lack of conveyance service requests 15.

A service provider 5E can also be perceived or referred to as a fleet manager and as a result, a service provider 5E or fleet manager has optimized vehicle utilization with great efficiency over time and is also a logistics provider. A service provider 5E or a fleet manager can perform a ride-hail request and optionally a food delivery request because a service provider 5E or a fleet manager can operate in both the ride-hail industry segment and the food delivery industry segment because a service provider 5E or fleet manager operates on a service provider's 5C network.

A service provider 5E or a fleet manager is also a logistics provider and can provide logistics capabilities to a service provider 5B for a fee. A service provider 5E or a logistics provider can provide logistics capabilities to a service provider 5C in exchange for operating or controlling an autonomous vehicle 3C and performing a conveyance service request 15C, being the ride-hail request associated with an external server 10C on service provider's 5C network. In this example, a service provider 5E or a fleet manager does not have their own conveyance network of autonomous vehicles 3 or conveyance service requests 15 and can employ an automated platform to access and utilize service provider's 5C network to perform a conveyance service request 15C relating to the ride-hail request. In this example, a service provider 5B and a service provider 5C can employ an automated platform to access and utilize service provider's 5E logistics capabilities to perform conveyance services.

The following description provides additional definitions, examples, and embodiments of aspects of the inventive system and method:

Autonomous Vehicle: An autonomous vehicle ("AV") can be, for example, a self-governing machine, a self-maneuvering machine, or a self-driving machine that can be used to provide or perform a conveyance service of including, but not limited to, a person, a good, an article, a thing, an item, a conveyance client, or a combination thereof. An AV can be a machine, a robot, or a car that can perform a conveyance service without the aid of a human driver.

Standardizing Conveyance Service Offerings: Where all or some of the plurality of conveyance service offerings, the real time or near real time geographical location of the conveyance client, or a combination thereof, are structured in a different format, there are standardized or converted into a uniform format.

All or some of the plurality of conveyance service offerings may be structured in a uniform format prior to being transmitted from the external server to the central server by way of a link between the external server and the central server and are not standardized.

Transmitting Conveyance Client Preference and Geographical Location: An additional embodiment includes one in which the conveyance client preference, once inputted or provided into the application, is stored or cached on the application, the computer readable memory of the central server, or a combination thereof, and the conveyance client preference is not inputted or provided again into the application by the conveyance client.

An embodiment includes wherein the conveyance client preference is stored or cached in the computer readable memory of the central server and the conveyance client preference is not transmitted again from the application to the central server.

Another embodiment includes wherein the conveyance client preference, the real time or near real time geographical location of the conveyance client, or a combination thereof, is transmitted from the application to the central server at any time prior to filtering all or some of the plurality of conveyance service offerings.

Filtering Plurality of Conveyance Service Offerings: In one embodiment, all or some of the plurality of conveyance service offerings are filtered relating to the conveyance client preference and the real time or near real time geographical location of the conveyance client, to identify all or some of the plurality of filtered conveyance service offerings by a process of categorizing, filtering, characterizing, screening, selecting, separating, identifying, specifying, distinguishing, naming, numbering, ordering, systematizing, tagging, labeling, recognizing, arranging, bracketing, ranking, organizing, classifying, segregating, isolating, grouping, comparing, or a combination thereof.

Another embodiment includes wherein all or some of the plurality of conveyance service offerings are filtered in real time or near real time and the preferred conveyance service offering is identified in real time or near real time from all or some of the plurality of filtered conveyance service offerings on the application by transmitting in real time or near real time, all or some of the plurality of conveyance service offerings from the central server to the application by way of a link between the central server and the application; filtering in real time or near real time, all or some of the plurality of conveyance service offerings by using the conveyance client preference and the real time or near real time geographical location of the conveyance client, to identify all or some of the plurality of filtered conveyance service offerings; and identifying in real time or near real time, the preferred conveyance service offering from all or some of the plurality of filtered conveyance service offerings relating to the conveyance client preference.

A further embodiment includes wherein a different geographical location is used other than the real time or near real time geographical location of the conveyance client when filtering all or some of the plurality of conveyance service offerings.

Identifying Preferred Conveyance Service Offering(s): In one embodiment, the preferred conveyance service offering relating to the conveyance client preference is identified from all or some of the plurality of filtered conveyance service offerings by using one or more of a sorting algorithm, a selection algorithm, a search algorithm, a merge algorithm, a maximum function, a minimum function, a graph algorithm, a graph search algorithm, a tree algorithm, a tree search algorithm, a matrix calculation, a matrix algorithm, a comparison, or a combination thereof.

In another embodiment the preferred conveyance service offering is identified from all or some of the plurality of filtered conveyance service offerings relating to a weighted average of the conveyance client preference.

In some embodiments, the visual representation may be compiled on the central server and transmitted to the application by way of a link between the central server and the application.

The visual representation may be displayed on one or more remote display and may include a dynamic map, a heat map, or a combination thereof. The conveyance client utilizes the visual representation to secure the preferred conveyance service offering in real time or near real time, related to the conveyance client preference, the real time or near real time geographical location of the conveyance client, or a combination thereof.

Another embodiment includes wherein the conveyance client preference is displayed as an icon or visual with or on the visual representation, to allow the conveyance client to evaluate all or some of the plurality of filtered conveyance service offerings, the preferred conveyance service offering, or a combination thereof, and secure the preferred conveyance service offering relating to a service provider or a good supplier.

Another embodiment includes wherein the preferred conveyance service offering, the conveyance client preference, or a combination thereof, is displayed in a visually identifiable format compared to all or some of the plurality of filtered conveyance service offerings relating to a service provider or a good supplier.

An additional embodiment includes wherein the dynamic map includes the geographical map that displays in real time or near real time, all or some of the plurality of filtered conveyance service offerings, the preferred conveyance service offering, the conveyance client preference, or a combination thereof.

An embodiment includes wherein all or some of the plurality of filtered conveyance service offerings, the preferred conveyance service offering, the conveyance client preference, or a combination thereof, relating to a service provider or a good supplier is displayed individually as a mobile or transitory icon or a mobile or transitory visual and updates or changes in real time or near real time.

An embodiment includes wherein all or some of the plurality of filtered conveyance service offerings, the preferred conveyance service offering, the conveyance client preference, or a combination thereof, relating to an individual service provider or an individual good supplier is displayed as a distinguishable icon or visual and updates or changes in real time or near real time.

An embodiment includes wherein all or some of the plurality of filtered conveyance service offerings, the preferred conveyance service offering, the conveyance client preference, the conveyance client preference, or a combination thereof, relating to an individual service provider or an individual good supplier is displayed as an icon or visual and updates or changes in real time or near real time.

An embodiment includes wherein all or some of the plurality of filtered conveyance service offerings, the preferred conveyance service offering, the conveyance client preference, or a combination thereof, relating to an individual service provider or an individual good supplier is displayed as or with one or more of a different icon, symbol, color, shading, pattern, visual, or a combination thereof.

An embodiment includes wherein all or some of the plurality of filtered conveyance service offerings, the preferred conveyance service offering, the conveyance client preference, or a combination thereof, relating to an individual service provider or an individual good supplier is displayed as or with one or more of a similar icon, symbol, color, shading, pattern, visual, or a combination thereof.

An embodiment includes wherein the conveyance client updates, modifies, or changes the conveyance client preference and the dynamic map displays in real time or near real time, all or some of the plurality of filtered conveyance service offerings, the preferred conveyance service offering, the conveyance client preference, or a combination thereof, based on the updated, modified, or changed the conveyance client preference.

Another embodiment includes wherein the heat map includes the geographical map that displays a visual depiction of one or more statistical variable of all or some of the plurality of conveyance service offerings; all or some of the plurality of filtered conveyance service offerings; all or some of the preferred conveyance service offering; the conveyance client preference; or a combination thereof.

A further embodiment includes, wherein the statistical variable includes one or more of a measurement of conveyance service availability, pricing, elevated pricing, conveyance service offering density, filtered conveyance service offering density, preferred conveyance service offering density, preferred good supplier density, a preferred conveyance industry segment, conveyance industry segment density, level of service density, a conveyance service distance, an estimated time of arrival, preferred representative density, representative density, conveyance client density, service provider density, good supplier density, or a combination thereof.

Another embodiment includes, wherein an area of the heat map is distinguished in proportion to a measurement of the statistical variable and displayed as having one or more of a distinguishable hue, shade, saturation, opacity, color, color value, pattern, fill, shape, image, animation, or a combination thereof.

An additional embodiment includes, wherein the preferred conveyance service offering is not identified prior to compiling the heat map, a real time or near real time heat map, a historical heat map, a predictive heat map, or a combination thereof.

An embodiment includes, wherein a real time or near real time heat map is compiled from the statistical variable of all or some of the plurality of conveyance service offerings, all or some of the plurality of filtered conveyance service offerings, all or some of the preferred conveyance service offering, the conveyance client preference, or a combination thereof.

Another embodiment includes, wherein a historical heat map is compiled from the statistical variable of all or some of past the plurality of conveyance service offerings, all or some of past the plurality of filtered conveyance service offerings, all or some of past the preferred conveyance service offering, the conveyance client preference, or a combination thereof.

A further embodiment includes, wherein a predictive heat map is compiled from the statistical variable of all or some of past the plurality of conveyance service offerings, all or some of past the plurality of filtered conveyance service offerings, all or some of past the preferred conveyance service offering, all or some of the plurality of conveyance service offerings, all or some of the plurality of filtered conveyance service offerings, all or some of the preferred conveyance service offering, the conveyance client preference, or a combination thereof.

An additional embodiment includes, wherein the predictive heat map identifies or estimates one or more of future conveyance service availability, future pricing, future elevated pricing, future conveyance service offering density, future filtered conveyance service offering density, future preferred conveyance service offering density, future level of service density, future conveyance industry segment density, future representative density, future conveyance client density, future service provider density, future good supplier density, future level of service supply, future conveyance industry segment supply, future conveyance service supply, future service provider supply, future good supplier supply, future conveyance service demand, future conveyance client demand, or a combination thereof.

An embodiment includes, wherein the predictive heat map generates a visual notification or an audio notification to notify the conveyance client of a future change or update to the statistical variable, the measurement of the statistical variable, or a combination thereof.

An embodiment includes, wherein a function of the central server or the external server is performed by the application. In another embodiment, the application operates on the central server. In still another embodiment, a function of the application is performed by the central server or the external server(s).

An additional embodiment includes, wherein the conveyance client, the central server, the application, or a combination thereof, secures the preferred conveyance service offering.

An embodiment includes, wherein all or some of the plurality of conveyance service offerings are sourced or provided by a service provider or a good supplier operating in a conveyance industry segment.

Another embodiment includes, wherein the conveyance client secures more than one the representatives or more than one autonomous vehicles (AVs) for the preferred conveyance service offering.

A further embodiment includes, wherein the conveyance client secures the filtered conveyance service offering other than the preferred conveyance service offering.

An additional embodiment includes, wherein the preferred conveyance service offering, all or some of the plurality of filtered conveyance service offerings, all or some of the plurality of conveyance service offerings, all or some of subsequent or additional the plurality of filtered conveyance service offerings, all or some of subsequent or additional the preferred conveyance service offering, all or some of the real time or near real time geographical location of the conveyance client, the conveyance client preference, the beginning service geographical location, the ending service geographical location, or a combination thereof, is identified or updated in real time or near real time as the real time or near real time geographical location of the conveyance client updates or changes or as traffic information updates or changes.

In a further embodiment, the conveyance client browses or navigates an area of the visual representation to identify and then secure the preferred conveyance service offering or the filtered conveyance service offering by selecting or accepting the preferred conveyance service offering, the filtered conveyance service offering, the conveyance client preference, or a combination thereof.

In some embodiments, the central server may be located on or associated with the terminal. In other embodiments, the application, the terminal, the central server, the external server, a link, or a combination thereof, is combined or integrated.

In some embodiments, the beginning service geographical location, the ending service geographical location, the conveyance client preference, or a combination thereof, is provided prior to receiving all or some of the plurality of conveyance service offerings on or at the central server.

Another embodiment includes, wherein the preferred conveyance service offering, all or some of the plurality of filtered conveyance service offerings, all or some of the plurality of conveyance service offerings, all or some of the real time or near real time geographical location of the conveyance client, the conveyance client preference, all or some of subsequent or additional the plurality of filtered conveyance service offerings, all or some of subsequent or additional the preferred conveyance service offering, a secured preferred conveyance service offering, the beginning service geographical location, the ending service geographical location, or a combination thereof, is transmitted in real time or near real time between the application and the central server and updated in real time or near real time by way of a link between the application and the central server.

Another embodiment includes, wherein the preferred conveyance service offering, all or some of the plurality of filtered conveyance service offerings, all or some of the plurality of conveyance service offerings, all or some of the real time or near real time geographical location of the conveyance client, the conveyance client preference, all or some of subsequent or additional the plurality of filtered conveyance service offerings, all or some of subsequent or additional the preferred conveyance service offering, a secured preferred conveyance service offering, the beginning service geographical location, the ending service geographical location, or a combination thereof, is transmitted in real time or near real time between the application and the external server and updated in real time or near real time by way of a link between the application and the external server.

Another embodiment includes, wherein the preferred conveyance service offering, all or some of the plurality of filtered conveyance service offerings, all or some of the plurality of conveyance service offerings, all or some of the real time or near real time geographical location of the conveyance client, the conveyance client preference, all or some of subsequent or additional the plurality of filtered conveyance service offerings, all or some of subsequent or additional the preferred conveyance service offering, a secured preferred conveyance service offering, the beginning service geographical location, the ending service geographical location, or a combination thereof, is transmitted in real time or near real time between the central server and the external server and updated in real time or near real time by way of a link between the central server and the external server.

The following provides further definitions and examples of terms and concepts used herein:

Near Real Time: The following are illustrative, non-limiting examples of "near-real time" as used in the invention disclosure:

Near real time can pertain to a delay introduced, by automated data processing, between an occurrence of an event and use of the processed data. Near real time can refer to the timeliness of data or information, which can be delayed by the time required for electronic communication and automatic data processing. Near real time can imply no significant delays. Near real time can refer to the highest level of development or state of the art.

Near real time can be in or similar to real time. Near real time can depict an event or a situation as it existed at the current time less the processing time. A function of a system, a method, or a combination thereof, can be performed in real time or near real time. A real time or near real time geographical location of an AV can be updated in real time or near real time. A real time or near real time geographical location of a conveyance client can be updated in real time or near real time. A real time or near real time geographical location of a representative can be updated in real time or near real time.

Conveyance Client: The following are illustrative, non-limiting examples of a "conveyance client" as used in the present disclosure:

A conveyance client includes one or more of a person, an entity, a robot, a machine, or a combination thereof, that can evaluate and then secure a preferred conveyance service offering. A conveyance client does not have to be a consumer of a conveyance service. A conveyance client can secure a conveyance service offering for one or more of another person, another machine, another conveyance client, or a combination thereof. A conveyance client or a consumer of a service can receive or request a conveyance service.

A conveyance client can input or provide a conveyance client preference to be used to filter a conveyance service offering. A conveyance client can input or provide a conveyance client preference used to identify one or more of a preferred conveyance service offering, a filtered conveyance service offering, or a combination thereof. A conveyance client can perform a function in real time or near real time being updated or refreshed in the highest level of development or state of the art.

A conveyance client can secure a preferred conveyance service offering via one or more of a terminal, an application, a central server, an external server, or a combination thereof. A conveyance client can secure a conveyance service offering, a filtered conveyance service offering, a preferred conveyance service offering, or a combination thereof, relating to a service provider in a conveyance industry segment.

A conveyance client can input or generate a conveyance service request, which can become a filtered conveyance service request and/or a preferred conveyance service request for or with one or more of a representative, an AV, an AV owner/controller, a service provider, a good supplier, a fleet manager, a logistics provider, a logistics supplier, a map provider, a third party, or a combination thereof.

To provide a few examples, a conveyance client can secure a filtered conveyance service offering other than a preferred conveyance service offering. A conveyance client can be a digital personal assistant or a machine, capable of securing a preferred conveyance service offering. A conveyance client can be a passenger in the ride-hail industry segment. A conveyance client can be a consumer of a good in the food delivery industry segment. A conveyance client can be a consumer of freight in the freight delivery industry segment. A conveyance client can use a scooter or a bicycle. A conveyance client can secure a conveyance service offering, a filtered conveyance service offering, a preferred conveyance service offering, or a combination thereof, relating to an individual service provider in an individual conveyance industry segment.

A conveyance client can use a visual representation such as a dynamic map, a heat map, or a combination thereof, to evaluate and then secure a preferred conveyance service offering. A conveyance client can secure more than one representative or more than one AV for a preferred conveyance service offering. A conveyance client can utilize or perform a function of a visual representation the same or similar as a representative.

Service Provider: The following are illustrative, non-limiting examples of a "service provider" as used in the present disclosure:

A service provider can be an entity or business that can retain or contract with one or more of a representative, an AV, an AV owner/controller, a good supplier, a fleet manager, a logistics provider, a logistics supplier, a map provider, a third party, or a combination thereof, to provide a conveyance service. A service provider can facilitate a conveyance service between a representative, an AV, an AV owner/controller, a good supplier, a fleet manager, a conveyance client, a logistics provider, a logistics supplier, a map provider, a third party, or a combination thereof. A service provider can be an entity or business that can provide or perform a service, a delivery service, or a combination thereof.

A service provider, via one or more external server, can be a source or provider of some or all conveyance service requests with corresponding conveyance data, all or some conveyance service offerings with corresponding conveyance data, or a combination thereof, relating to a conveyance industry segment. A service provider can use a central server, an external server, an application, or a combination thereof, to facilitate and perform a conveyance service.

A service provider can operate in one or more conveyance industry segment. A service provider can independently control or operate a conveyance network of one or more of a representative, an AV, a good supplier, a map provider, a third party, a conveyance client, or a combination thereof. A service provider can utilize Information Technology infrastructure relating to one or more of a service provider, a good supplier, an AV owner/controller, a fleet manager, a logistics provider, a logistics supplier, a map provider, a third party, or a combination thereof. A service provider can perform a function in real time or near real time being updated or refreshed in the highest level of development or state of the art. A service provider can accept or decline a preferred conveyance service request or a preferred conveyance service offering.

A service provider can use a visual representation, a dynamic map, a heat map, or a combination thereof, to facilitate, operate, or manage a conveyance service. A service provider can use a visual representation, a dynamic map, a heat map, or a combination thereof, to facilitate, operate, or manage a conveyance service for a conveyance client or a representative. A service provider can use a visual representation, a dynamic map, a heat map, or a combination thereof, as a tool for a conveyance client or a representative to secure a preferred conveyance service offering or a preferred conveyance service request. A map provider can use a visual representation, a dynamic map, a heat map, or a combination thereof, to facilitate, operate, or manage a conveyance service for a service provider.

A service provider can own, operate, or control an AV, i.e., the AV owner/controller. A service provider can operate, own, or control an AV on behalf of a third party. A service provider can optionally be perceived or referred to as the AV owner/controller. A service provider can operate, own, or control a network to facilitate a conveyance service in a conveyance industry segment. A service provider can operate, own, or control an AV, a representative, or a combination thereof, on a network. A service provider can operate, own, or control an AV, a representative, or a combination thereof, on another network. A service provider can operate, own, or control an AV, a representative, or a combination thereof, on behalf of a third party on a network.

To provide further examples, a service provider can be a vehicle that has a designated locker that serve as a good supplier or an AV. A service provider can be a vehicle that has a compartment that can serve as a mobile good supplier, a mobile AV, a mobile store front, a last mile delivery vehicle, a mobile logistics provider, a mobile logistics supplier, or a combination thereof.

Further examples of service providers include a rideshare service controller, a ride-hail service controller, a car-share service controller, a taxi service controller, a shuttle service controller, a person delivery service controller, a food delivery service controller, a good delivery service controller, an animal delivery service controller, a medical service and delivery controller, a courier service controller, an item delivery service controller, a freight delivery service controller, a peer-to-peer conveyance service controller, a delivery service controller, a transportation service controller, or a combination thereof.

A service provider can be perceived or referred to as a representative when utilizing an AV. A provider can be perceived or referred to as an AV, a representative, a good supplier, a fleet manager, an AV owner/controller, a logistics provider, a logistics supplier, a map provider, a third party, or a combination thereof.

A service provider can operate in an individual conveyance industry segment. A service provider can be a source or provider of one or more conveyance service request(s), conveyance service offering(s), real time or near real time geographical location(s) of a representative, real time or near real time geographical location(s) of a conveyance client, conveyance data relating to an AV, real time or near real time geographical location of an AV, or a combination thereof. A service provider can provide a scooter service or a bicycle service.

Providing further illustrative examples, a service provider can have or utilize an API that can provide all or some conveyance service requests, all or some conveyance service offerings, all or some of real time or near real time geographical location of a representative, all or some of real time or near real time geographical location of a conveyance client, all or some of conveyance data relating to an AV, all or some of real time or near real time geographical location of an AV, or a combination thereof. A service provider can have or generate all or some of conveyance data.

A service provider can operate or control an AV for or on behalf of an OEM or an auto manufacturer to provide a conveyance service. A service provider can control or operate an AV or a fleet of AVs for or on behalf of an OEM on a network that can operate in a conveyance industry segment. A service provider can utilize one or more external server for or with a conveyance industry segment. A service provider can lease or sublease an autonomous vehicle. A service provider can lease or sublease a fleet of AVs. A service provider can lease or sublease an AV or a fleet of AVs from a third party.

A service provider can have a conveyance service request displayed on a visual representation that can be provided by a map provider or a map provider application. A service provider can have a conveyance service offering displayed on a visual representation that can be provided by a map provider or a map provider application.

Good Supplier: The following are illustrative, non-limiting examples of a "good supplier" as used in the present disclosure:

A good supplier can be an entity or a business that can provide or supply a good, an article, a thing, an item, or a combination thereof, to be conveyed in a conveyance service. A good supplier can be an entity or a business that provides or supplies a service, a delivery service, or a combination thereof.

A good supplier can be an entity or a business that can retain or contract with one or more of a representative, an AV, an AV owner/controller, a service provider, a fleet manager, a logistics provider, a logistics supplier, a map provider, a third party, or a combination thereof, to provide a conveyance service. A good supplier can facilitate a conveyance service between one or more of a representative, an AV, an AV owner/controller, a service provider, a fleet manager, a logistics provider, a logistics supplier, a conveyance client, a map provider, a third party, or a combination thereof.

A good supplier can utilize an external server that can be a source or a provider of a conveyance service request with corresponding conveyance data, a conveyance service offering with corresponding conveyance data, or a combination thereof, relating to a conveyance industry segment. A good supplier can use one or more of a central server, an external server, an application, or a combination thereof, to facilitate and perform a conveyance service.

A good supplier can operate in a conveyance industry segment. A good supplier can operate for or with a service provider. A good supplier can independently control or operate one or more of a conveyance network of a representative, an AV, a good supplier, a map provider, a third party, a conveyance client, or a combination thereof. A good supplier can utilize Information Technology infrastructure relating to one or more of a good supplier, a service provider, an AV owner/controller, a fleet manager, a logistics provider, a logistics supplier, a map provider, a third party, or a combination thereof. A good supplier can perform a function in real time or near real time being updated or refreshed in the highest level of development or state of the art. A good supplier can accept or decline a preferred conveyance service request or a preferred conveyance service offering.

A good supplier can use a visual representation, a dynamic map, a heat map, or a combination thereof, to facilitate, operate, or manage a conveyance service. A good supplier can use a visual representation, a dynamic map, a heat map, or a combination thereof, to facilitate, operate, or manage a conveyance service for a conveyance client or a representative. A good supplier can use a visual representation, a dynamic map, a heat map, or a combination thereof, as a tool for a conveyance client or a representative to secure a preferred conveyance service offering or a preferred conveyance service request. A map provider can use a visual representation, a dynamic map, a heat map, or a combination thereof, to facilitate, operate, or manage a conveyance service for a good supplier.

A good supplier can operate, own, or control an AV. A good supplier can operate, own, or control an AV on behalf of a third party. A good supplier can operate, own, or control a network to facilitate a conveyance service in a conveyance industry segment. A good supplier can operate, own, or control an AV on a network. A good supplier can operate, own, or control an AV on another network. A good supplier can operate, own, or control an AV on behalf of a third party on a network.

A good supplier can be a vehicle that can have a designated locker that can be a service provider or an AV. A good supplier can be a vehicle that can have or utilize a compartment that can be a mobile service provider, a mobile AV, a mobile store front, a last mile delivery vehicle, a mobile logistics provider, a mobile logistics supplier, or a combination thereof.

A good supplier can be a food delivery service controller, a good delivery service controller, an animal delivery service controller, a medical service and delivery controller, a courier service controller, an item delivery service controller, a freight delivery service controller, a peer-to-peer conveyance service controller, a delivery service controller, a transportation service controller, or a combination thereof.

A good supplier can be perceived or referred to as a service provider. A good supplier can optionally be perceived or referred to as an AV, a representative, a service provider, a fleet manager, an AV owner/controller, a logistics provider, a logistics supplier, a map provider, at least on third party, or a combination thereof.

A good supplier can be a food truck. A good supplier can be an entity that produces or supplies freight. A good supplier can provide or perform a conveyance service relating to a food item. A good supplier can operate in an individual conveyance industry segment. A good supplier can operate for an individual service provider. A good supplier can be a source or a provider of a conveyance service request, a conveyance service offering, a real time or near real time geographical location of a representative, a real time or near real time geographical location of a conveyance client, all or some of conveyance data relating to an AV, a real time or near real time geographical location of an AV, or a combination thereof.

A good supplier can optionally retain and/or contract with a representative, an AV, or a combination thereof. A good supplier can use one or more of a central server, an external server, an application, or a combination thereof, to facilitate a conveyance service.

A good supplier can have or utilize an API that can provide all or some of a conveyance service request, all or some of a conveyance service offering, all or some of a real time or near real time geographical location of a representative, all or some of a real time or near real time geographical location of a conveyance client, all or some of conveyance data relating to an AV, all or some of a real time or near real time geographical location of an AV, or a combination thereof. A good supplier can have or generate all or some of conveyance data.

A good supplier can utilize an external server for or with a conveyance industry segment. A good supplier can lease or sublease an AV. A good supplier can lease or sublease a fleet of an AV. A good supplier can lease or sublease an AV or a fleet of an AVs from a third party.

A good supplier can have a conveyance service request displayed on a visual representation that can be provided by a map provider or a map provider application. A good supplier can have a conveyance service offering displayed on a visual representation that can be provided by a map provider or a map provider application.

Representative: The following are illustrative, non-limiting examples of a "representative" as used in the present disclosure:

A representative can be a person, an entity, a robot, or a machine, that can secure a preferred conveyance service request, a filtered conveyance service request, a conveyance service request, or a combination thereof. A representative can provide or perform a conveyance service of one or more of a person, a good, an article, a thing, an item, a conveyance client, or a combination thereof. A representative can be retained by or contracted with a service provider, a good supplier, an AV owner/controller, a fleet manager, a logistics provider, a logistics supplier, or a combination thereof. A representative can be an entity or a person that can provide or perform a service, a delivery service, or a combination thereof. A representative can own, operate, or control an AV.

A representative can, at any time, sign on and/or sign off of one or more of a service provider network, an AV owner/controller, a fleet manager network, a logistics provider network, a logistics supplier network, an application, a central server, an external server, or a combination thereof. A representative can sign in to one or more of a service provider network, an owner/controller of an AV network, a fleet manager network, a logistics provider network, a logistics supplier network, a central server, an external server, or a combination thereof. Once a beginning service geographical location, an ending service geographical location, pricing information, or a combination thereof, is known, a conveyance service offering relating to a representative can be generated.

A representative can input or provide a representative preference to be used to filter a conveyance service request. A representative can input or provide a representative preference used to identify one or more of a preferred conveyance service request, a filtered conveyance service request, or a combination thereof.

A representative can use an application to access a service provider network, a good supplier network, an owner/controller of an AV network, a fleet manager network, a logistics provider network, a logistics supplier network, or a combination thereof, via including a terminal, a central server, an external server, an application, or a combination thereof, to facilitate a conveyance service. A representative can provide a conveyance service in a conveyance industry segment. A representative can provide a conveyance service for a service provider, a good supplier, an AV owner/controller, a fleet manager, a logistics provider, a logistics supplier, or a combination thereof. A representative can use Information Technology infrastructure relating to one or more of a service provider, a good supplier, an AV owner/controller, a fleet manager, a logistics provider, a logistics supplier, or a combination thereof. A representative can perform a function in real time or near real time being updated or refreshed in the highest level of development or state of the art.

A representative can secure a filtered conveyance service request other than a preferred conveyance service request. A representative can secure a preferred conveyance service request using an application, a central server, an external server, or a combination thereof. A representative can use a visual representation such as a dynamic map, a heat map, or a combination thereof, to evaluate and then secure a preferred conveyance service request.

A representative can be perceived or referred to as a service provider when utilizing an AV. A representative can be perceived or referred to as an AV owner/controller when utilizing an AV. A representative can be perceived or referred to as an AV, an AV owner/controller, a service provider, a good supplier, a fleet manager, a logistics provider, a logistics supplier, a third party, or a combination thereof. A representative can use an AV to perform a conveyance service. A representative can be perceived or referred to as a good supplier when utilizing an AV. A representative can use a scooter or a bicycle.

A representative can be an independent third party. A representative can be an independent contractor. In the ride-hail/ride-share industry segment, a representative can be a driver. In the food delivery industry segment, a representative can be a driver picking up a food item and dropping a food item off to a conveyance client. In the courier industry segment, a representative can be a person picking up and dropping off a good, a thing, an article, or a combination thereof. A representative can provide a conveyance service in an individual conveyance industry segment. A representative can provide a conveyance service for an individual service provider.

A representative can utilize or perform a function of a visual representation the same or similar as a conveyance client. A representative can be managed or operated with an AV or a fleet of AVs to perform a conveyance service. A service provider, a fleet manager, a logistics provider, or a logistics supplier can use a representative and an AV to perform a conveyance service in a conveyance industry segment. A representative can have or generate all or some of conveyance data.

A representative can perform all or some of a conveyance service. A representative can perform all or some of a conveyance service in conjunction with an AV. A representative can perform part of a conveyance service and an AV can perform another part of a conveyance service. A representative can perform part of a conveyance service during a waypoint and an AV can perform another part of a conveyance service.

A representative can pick up food and put the food in an AV to be delivered. A representative can order food and put the food in an AV to be delivered. A representative can put food in an AV, such as a drone, to be delivered. A representative can put food in an AV, such as an autonomous ground vehicle to be delivered. A representative can be perceived as or similar to a scooter, a scooter service, a bicycle, or a bicycle service.

Visual Representation: The following are illustrative, non-limiting examples of a "visual representation" and uses thereof as used in the present disclosure, and augment prior descriptions provided herein:

A visual representation can facilitate an operation or a function to secure a preferred conveyance service request or a preferred conveyance service offering. A visual representation can be utilized or operated by a conveyance client, a representative, a service provider, a good supplier, a fleet manager, an AV owner/controller, a logistics provider, a logistics supplier, a map provider, a third party, or a combination thereof.

A visual representation can be a tool used to assist a representative evaluate a conveyance service request or a conveyance service request metric on a geographical map to secure a preferred conveyance service request. A visual representation can be a tool used to assist a conveyance client evaluate a conveyance service offering or a conveyance service offering metric on a geographical map to secure a preferred conveyance service offering. A visual representation can be viewed from a perspective, a point of reference, a point of interest, or a combination thereof. A visual representation can be one or more dynamic map, real time or near real time heat map, historical heat map, predictive heat map, or a combination thereof.

A visual representation can facilitate securing a preferred conveyance service request or a preferred conveyance service offering. A visual representation can be used to facilitate securing a preferred conveyance service request or a preferred conveyance service offering. A visual representation can facilitate securing a preferred conveyance service request or a preferred conveyance service offering utilizing an application. A visual representation can facilitate securing a preferred conveyance service request or a preferred conveyance service offering, utilizing a service provider application, or a third party application.

A visual representation can be a geographical map that can display one or more preferred conveyance service request, filtered conveyance service request, conveyance service request, preferred conveyance service offering, filtered conveyance service offering, conveyance service offering, metric relating to a respective request or offering, real time or near real time geographical location of a representative, real time or near real time geographical location of an AV, real time or near real time geographical location of a service provider, real time or near real time geographical location of a good supplier, real time or near real time geographical location of a fleet manager, real time or near real time geographical location of a conveyance client, real time or near real time geographical location of a logistics provider, real time or near real time geographical location of a logistics supplier, conveyance client preference, representative preference, or a combination thereof.

A visual representation can be a geographical map that can display one or more preferred conveyance service offering, filtered conveyance service offering, conveyance service offering, metric relating to a respective offering, or a combination thereof.

A visual representation can be displayed in or on an AV. A visual representation can be displayed in or on an AV to show a route or a path for an AV. A visual representation can be utilized by a conveyance client in an AV. A visual representation can have or be associated with a commercial or an advertisement. A visual representation can be an interactive map. A visual representation can be an interactive map that can be used by a conveyance client. A visual representation can be an interactive map that can be used by a representative.

A visual representation can be an interactive map that can be used by a conveyance client to communicate with one or more of a service provider, a good supplier, a fleet manager, an AV owner/controller, a logistics provider, a logistics supplier, an AV, a map provider, a third party, a representative, or a combination thereof. A visual representation can be an interactive map that can be used by a representative to communicate with one or more of a service provider, a good supplier, a fleet manager, an AV owner/controller, a logistics provider, a logistics supplier, an AV, a map provider, a third party, a conveyance client, or a combination thereof.

A visual representation can be utilized and updated in real time or near real time by communicating information or data including all or some of a preferred conveyance service request, all or some of a filtered conveyance service request, all or some of a conveyance service request, all or some of a preferred conveyance service offering, all or some of a filtered conveyance service offering, all or some of a conveyance service offering, all or some of subsequent or additional plurality of filtered conveyance service offerings, all or some of subsequent or additional a preferred conveyance service offering, a beginning service geographical location, an ending service geographical location, all or some of a real time or near real time geographical location of a representative, all or some of a real time or near real time geographical location of a conveyance client, a representative preference, a conveyance client preference, a secured preferred conveyance service request, or a secured preferred conveyance service offering. A visual representation can be utilized and updated in real time or near real time by communicating information or data with a central server, an external server, an application, or a combination thereof.

A visual representation can be compiled on one or more of an application, a central server, or a combination thereof. A visual representation can be displayed on an application, a central server, a remote display, or a combination thereof. A visual representation can be in any form or format, preferably visual. A variation in the form, format, and order of a visual representation component is within the scope of the present invention. A visual representation can be updated or refreshed in real time or near real time and can refer to being updated or refreshed in the highest level of development or state of the art. A visual representation can perform a function in real time or near real time and can refer to being updated or refreshed in the highest level of development or state of the art.

A representative can use a visual representation to apply a representative preference to display one or more of a preferred conveyance service request, a filtered conveyance service request, or a combination thereof, that can relate to a representative preference. Applying or using a representative preference can allow a representative to filter out, hide, or remove a conveyance service request from a visual representation that do not match a representative preference, to better identify a preferred conveyance service request or a geographical area to secure a preferred conveyance service request. A representative can browse or navigate an area of a visual representation to identify and then secure a preferred conveyance service request or a filtered conveyance service request by selecting a preferred conveyance service request or a filtered conveyance service request.

A conveyance client can use a visual representation to apply a conveyance client preference to display one or more of a preferred conveyance service offering, a filtered conveyance service offering, or a combination thereof, that can relate to a conveyance client preference. Applying or using a conveyance client preference can allow a conveyance client to filter out, hide, or remove a conveyance service offering from a visual representation that do not match a conveyance client preference, to better identify a preferred conveyance service offering or a geographical area to secure a preferred conveyance service offering. A conveyance client can browse or navigate an area of a visual representation to identify and then secure a preferred conveyance service offering or a filtered conveyance service offering by selecting a preferred conveyance service offering or a filtered conveyance service offering.

A visual representation can display one or more of a conveyance service request, a conveyance service request metric, a conveyance service offering, a conveyance service offering metric, or a combination thereof, in a conveyance industry segment on a geographical map respectively. A visual representation can be a tool that can display one or more of a conveyance service request, a conveyance service request metric, a conveyance service offering, a conveyance service offering metric, or a combination thereof, relating to a service provider on a geographical map respectively. A visual representation can display a route from a representative to a beginning service geographical location and then to an ending service geographical location.

A service provider, a good supplier, a fleet manager, an AV owner/controller, a logistics provider, a logistics supplier, a map provider, a third party, or a combination thereof, can be displayed on or with a visual representation that can display a level of service preference. An AV owner/controller, a service provider, a good supplier, a fleet manager, a logistics provider, a logistics supplier, a map provider, a third party, or a combination thereof, can be displayed on or with a dynamic map that can display a level of service preference. An AV owner/controller, a service provider, a good supplier, a fleet manager, a logistics provider, a logistics supplier, a map provider, a third party, or a combination thereof, can be displayed on or with a heat map that can display a level of service preference.

A visual representation can comprise a dynamic map and can display a level of service preference relating to a service provider, a good supplier, an AV owner/controller, a fleet manager, a logistics provider, a logistics supplier, a map provider, a third party, or a combination thereof. A visual representation can display a dynamic map with a level of service preference as a tab or an icon relating to a service provider, a good supplier, an AV owner/controller, a fleet manager, a logistics provider, a logistics supplier, a map provider, a third party, or a combination thereof.

A visual representation can display one or more of a dynamic map, a conveyance client preference, a conveyance service offering, a filtered conveyance service offering, a preferred conveyance service offering, real time or near real time geographical location of a conveyance client, or a combination thereof. A visual representation can display a dynamic map, a conveyance client preference, a conveyance service offering, a filtered conveyance service offering, a preferred conveyance service offering, or a combination thereof, relating to a real time or near real time geographical location of a conveyance client. A visual representation can display a dynamic map, a conveyance client preference, a conveyance service offering, a filtered conveyance service offering, a preferred conveyance service offering, all or some of a real time or near real time geographical location of a conveyance client, or a combination thereof, relating to a conveyance client preference.

A visual representation can utilize an application, a terminal, a central server, an external server, a link, or a combination thereof, that can be combined or integrated. A visual representation can utilize an application, a terminal, a central server, an external server, a link, or a combination thereof, that can be combined or integrated on a smartphone. A visual representation can utilize an application, an AV, a terminal, a central server, an external server, a link, or a combination thereof, that can be combined or integrated.

A representative can use a visual representation to evaluate a historical preferred conveyance service request relating to a service provider. A conveyance client can use a visual representation to evaluate a historical preferred conveyance service offering relating to a service provider. A visual representation can be compiled on a third party server such as a map provider server. A representative and/or a conveyance client can use a visual representation to evaluate pricing information or another metric from a service provider respectively. A visual representation can be used to evaluate an area on a geographical map that can show a metric relating to an individual conveyance industry segment. A visual representation can be used to evaluate an area on a geographical map that can show a metric relating to an individual service provider.

A visual representation can be compiled with information or data from a map provider. A level of service preference can be used by a conveyance client to identify a luxury vehicle, an environmentally friendly vehicle, or a driverless vehicle. A visual representation can display a scooter, a bicycle, or a mobility option.

A level of service preference can be displayed on or with a visual representation to identify different levels of service that a service provider, a good supplier, an AV owner/controller, a fleet manager, a logistics provider, a logistics supplier, a map provider, a third party, or a combination thereof, can provide. A level of service preference can be displayed as an icon or a visual with or on a visual representation to allow a selection of different levels of service that a service provider, a good supplier, an AV owner/controller, a fleet manager, a logistics provider, a logistics supplier, a map provider, a third party, or a combination thereof, can provide. A level of service preference can be displayed on a visual representation to identify different levels of service that a service provider, a good supplier, an AV owner/controller, a fleet manager, a logistics provider, a logistics supplier, a map provider, a third party, or a combination thereof, can provide.

A visual representation can facilitate securing a preferred conveyance service request or a preferred conveyance service offering utilizing more than one application. A third party can provide a visual representation on a third party application that can be used to facilitate securing a preferred conveyance service request on a service provider application. A third party can provide a visual representation on a third party application that can be used to facilitate securing a preferred conveyance service offering on a service provider application.

Dynamic Map: The following are illustrative, non-limiting examples of a "dynamic map" as used in the present disclosure:

A dynamic map can be a visual representation that can facilitate an operation or a function to secure a preferred conveyance service request or a preferred conveyance service offering. A dynamic map can be a visual representation that can be utilized or operated by a conveyance client, a representative, a service provider, a good supplier, a fleet manager, an AV owner/controller, a logistics provider, a logistics supplier, a map provider, a third party, or a combination thereof.

A dynamic map can be a geographical map that can display one or more of a conveyance service request, a filtered conveyance service request, a preferred conveyance service request, or a combination thereof. A dynamic map can be a geographical map that can display one or more of a conveyance service offering, a filtered conveyance service offering, a preferred conveyance service offering, or a combination thereof. A dynamic map can be a geographical map that can display one or more of a real time or near real time geographical location of an AV, a real time or near real time geographical location of a representative, a real time or near real time geographical location of a conveyance client, or a combination thereof.

A dynamic map can be used by a representative to evaluate and then secure a preferred conveyance service request. A dynamic map can be used by a representative to find or identify and secure a preferred conveyance service request for a representative relating to a service provider. A dynamic map can be used by a conveyance client to evaluate and then secure a preferred conveyance service offering. A dynamic map can be used by a conveyance client to find or identify and secure a preferred conveyance service offering for a conveyance client relating to a service provider.

A dynamic map can be a geographical map that can display a distinguishable conveyance client, a distinguishable representative, a distinguishable AV, a distinguishable service provider, or a distinguishable good supplier. A preferred conveyance service request, a filtered conveyance service request, a preferred conveyance service offering, a filtered conveyance service offering, a conveyance client, a representative, an AV, a service provider, a good supplier, an AV owner/controller, a fleet manager, a logistics provider, a logistics supplier, a map provider, a third party, or a combination thereof, can be displayed individually as a mobile or transitory icon or a mobile or transitory visual on a dynamic map. A dynamic map can be compiled on one or more of an application, a central server, an external server, or a combination thereof. A dynamic map can be in any form or format, preferably visual. A variation in the form, format, and order of a dynamic map component is within the scope of the present invention.

A dynamic map can be viewed from one or more of a perspective, a point of reference, a point of interest, or a combination thereof. A real time or near real time geographical location of one or more of a conveyance client, a representative, an AV, a service provider, a good supplier, an AV owner/controller, a fleet manager, a logistics provider, a logistics supplier, a map provider, a third party, or a combination thereof, can change and can be updated in real time or near real time and can optionally reflect their availability status. A dynamic map can be updated or refreshed in real time or near real time and can refer to being updated or refreshed in the highest level of development or state of the art. A dynamic map can perform a function in real time or near real time and can refer to being updated or refreshed in the highest level of development or state of the art.

A dynamic map can be used to evaluate an area on a geographical map that can show a different service provider or another conveyance service metric relating to a service provider. A dynamic map can be used to evaluate an area on a geographical map that can show an available service provider or another conveyance service metric relating to a conveyance industry segment. A dynamic map can be used to evaluate a location of one or more of a conveyance client, a representative, an AV, a service provider, a good supplier, an AV owner/controller, a fleet manager, a logistics provider, a logistics supplier, a map provider, a third party, or a combination thereof, from a service provider. A dynamic map can be combined with a heat map.

A preferred conveyance service request can be displayed in a visually identifiable format compared to a filtered conveyance service request. A preferred conveyance service offering can be displayed in a visually identifiable format compared to a filtered conveyance service offering.

A representative can use a dynamic map to evaluate a filtered conveyance service request, a preferred conveyance service request, a conveyance client, a good supplier, a conveyance service metric, or a combination thereof, relating to a service provider across a conveyance industry segment. A conveyance client can use a dynamic map to evaluate one or more of a filtered conveyance service offering, a preferred conveyance service offering, a representative, an AV, a good supplier, a conveyance service metric, or a combination thereof, relating to a service provider across a conveyance industry segment.

A dynamic map can facilitate securing a preferred conveyance service request or a preferred conveyance service offering. A dynamic map can be used to facilitate securing a preferred conveyance service request or a preferred conveyance service offering. A dynamic map can facilitate securing a preferred conveyance service request or a preferred conveyance service offering utilizing an application. A dynamic map can facilitate securing a preferred conveyance service request or a preferred conveyance service offering, utilizing a service provider application, a third party application, or a map provider application.

A service provider, a good supplier, a fleet manager, an AV owner/controller, a logistics provider, a logistics supplier, a representative, a conveyance client, a map provider, a third party, or a combination thereof, can be displayed on or with a dynamic map that can display a level of service preference.

An individual service provider can be displayed as a different icon, symbol, color, shading, or visual. An individual service provider can be displayed as a similar icon, symbol, color, shading, or visual, for a conveyance service, a level of service, or a combination thereof. A service provider can be displayed on a dynamic map using a similar or different icon, symbol, color, shading, or visual, as long as it is identifiably different.

A dynamic map can be used for an individual service provider. A dynamic map can have one car icon represent a service provider as half black/half white. A dynamic map can display an icon to show that a conveyance client has inputted or generated a conveyance service request to a service provider by displaying a conveyance client and/or a conveyance service request as half red and half blue. A dynamic map can display an icon to show that a representative or an AV can work for an additional service provider by displaying a car icon and/or a conveyance service offering as half black and half pink. A dynamic map can display a scooter, a scooter service, a bicycle, or a bicycle service.

A map provider can provide or utilize a dynamic map that can display an individual service provider, or an individual good supplier, with associated conveyance service offerings or associated conveyance service requests.

A conveyance client can visually identify a service provider, or a good supplier, and the corresponding a conveyance service offering associated on a dynamic map. A conveyance client can visually identify three service providers on a dynamic map with the associated conveyance service offerings along with pricing information. A representative can visually identify a service provider, or a good supplier, and the corresponding a conveyance service request associated on a dynamic map. A representative can visually identify four good suppliers on a dynamic map with the associated conveyance service requests along with pricing information.

A level of service preference can be displayed on a dynamic map to identify different levels of service that a service provider can provide. An AV owner/controller, a service provider, a good supplier, a fleet manager, a logistics provider, a logistics supplier, a conveyance client, a representative, a third party, or a combination thereof, can be displayed on or with a dynamic map that can display a level of service preference and can be represented by a mobile or transitory icon.

A dynamic map can facilitate securing a preferred conveyance service offering utilizing more than one application. A third party can provide a dynamic map on a third party application that can be used to facilitate securing a preferred conveyance service offering on a service provider application. A dynamic map can facilitate securing a preferred conveyance service request utilizing more than one application. A third party can provide a dynamic map on a third party application that can be used to facilitate securing a preferred conveyance service request on a service provider application.

Heat Map: The following are illustrative, non-limiting examples of a "heat map" as used in the present disclosure:

A heat map can be a visual representation that can facilitate an operation or a function to secure a preferred conveyance service request or a preferred conveyance service offering. A heat map can be a visual representation that can be utilized or operated by a conveyance client, a representative, a service provider, a good supplier, a fleet manager, an AV owner/controller, a logistics provider, a logistics supplier, a map provider, a third party, or a combination thereof.

A heat map can provide an improved way to visualize how a metric varies across a geographical area or can show a level of variability within a geographical region of a metric. A heat map can be a geographical map in which an area can be shaded or patterned in proportion to a measurement of a statistical variable being displayed on a geographical map. A heat map can be used by a representative to evaluate and then secure a preferred conveyance service request. A heat map can be used by a conveyance client to evaluate and then secure a preferred conveyance service offering.

A statistical variable can be aggregated or not aggregated. A statistical variable can be quantitative, qualitative, or a combination thereof. A statistical variable can be one or more of a measurement of conveyance service availability, pricing, elevated pricing, conveyance service offering density, filtered conveyance service offering density, preferred conveyance service offering density, conveyance service request density, filtered conveyance service request density, preferred conveyance service request density, preferred good supplier density, a preferred conveyance industry segment, conveyance industry segment density, level of service density, a conveyance service distance, an estimated time of arrival, preferred representative density, representative density, conveyance client density, service provider density, good supplier density, or a combination thereof.

A metric can be a basis for comparison or a reference point against which another thing can be evaluated. A metric can be a standard of measurement by which value, efficiency, performance, progress or quality of a process, a product or a variable can be assessed.

A distinguishable pricing metric, a distinguishable conveyance service metric, a distinguishable conveyance client metric, a distinguishable representative metric, a distinguishable AV metric, a distinguishable service provider metric, and/or a distinguishable good supplier metric can optionally be aggregated and/or differentiated on a heat map. A variation in the form, format, and order of a heat map component is within the scope of the present invention. A heat map can be in any form or format, preferably visual. A heat map can be viewed from one or more of a perspective, a point of reference, a point of interest, or a combination thereof. A heat map can be compiled on one or more of an application, a central server, or a combination thereof.

A heat map can be a geographical map that can display a visual depiction of a statistical variable of one or more of a conveyance service request, a filtered conveyance service request, a preferred conveyance service request, or a combination thereof. A heat map can be a geographical map that can display a visual depiction of a statistical variable of one or more of a conveyance service offering, a filtered conveyance service offering, a preferred conveyance service offering, or a combination thereof.

A heat map can be updated or refreshed in real time or near real time and can refer to being updated or refreshed in the highest level of development or state of the art. A heat map can perform a function in real time or near real time and can refer to being updated or refreshed in the highest level of development or state of the art.

A heat map can be used to evaluate an area on a geographical map that can show a pricing metric or another conveyance service metric relating to a service provider or a good supplier. A heat map can be used to evaluate an area on a geographical map that can show a pricing metric or another conveyance service metric relating to a conveyance industry segment. A heat map can be combined with a dynamic map.

A representative can use a heat map to evaluate a measurement of a statistical variable from a service provider or a good supplier across a conveyance industry segment. A conveyance client can use a heat map to evaluate a measurement of a statistical variable from a service provider or a good supplier.

A heat map can be one or more of a real time or near real time heat map, a historical heat map, a predictive heat map, or a combination thereof.

A real time or near real time heat map, a historical heat map, a predictive heat map, or a combination thereof, can be a tool to aid a representative or a conveyance client when analyzing or evaluating a conveyance service metric. A real time or near real time heat map can display a time frame in seconds, minutes, hours, days, or any other increment of time. A historical heat map can display a time frame in seconds, minutes, hours, days, or any other increment of time. A predictive heat map can provide an estimate in seconds, minutes, hours, days, or any other increment of time. A predictive heat map can incorporate a feedback mechanism to improve quality of a future estimate. A predictive heat map can incorporate a feedback mechanism from one or more of a representative, an AV, a conveyance client, a good supplier, a service provider, an AV owner/controller, a fleet manager, a logistics provider, a logistics supplier, a map provider, a third party, or a combination thereof.

A heat map can be viewed from one or more of a perspective, a point of reference, a point of interest, or a combination thereof. A heat map can be a geographical map that can display one or more of a real time or near real time geographical location of an AV, a real time or near real time geographical location of a representative, a real time or near real time geographical location of a conveyance client, a real time or near real time geographical location of a service provider, a real time or near real time geographical location of a good supplier, a real time or near real time geographical location of a fleet manager, a real time or near real time geographical location of a third party, or a combination thereof.

A service provider, a good supplier, a fleet manager, an AV owner/controller, a logistics provider, a logistics supplier, a representative, a conveyance client, a map provider, a third party, or a combination thereof, can be displayed on or with a heat map that can display a level of service preference.

A heat map can facilitate securing a preferred conveyance service request or a preferred conveyance service offering. A heat map can be used to facilitate securing a preferred conveyance service request or a preferred conveyance service offering. A heat map can facilitate securing a preferred conveyance service request or a preferred conveyance service offering utilizing an application. A heat map can facilitate securing a preferred conveyance service request or a preferred conveyance service offering, utilizing a service provider application, a third party application, or a map provider application.

A heat map can be used by a representative to evaluate and then secure a preferred conveyance service request. A heat map can be used by a representative to find or identify and secure a preferred conveyance service request for a representative relating to a service provider. A heat map can be used by a conveyance client to evaluate and then secure a preferred conveyance service offering. A heat map can be used by a conveyance client to find or identify and secure a preferred conveyance service offering for a conveyance client relating to a service provider.

A heat map can be used to evaluate an area on a geographical map that can show a different service provider or another conveyance service metric relating to a service provider or a good supplier. A heat map can be used to evaluate an area on a geographical map that can show another conveyance service metric, an available service provider, or an available good supplier relating to a conveyance industry segment. A heat map can be used to evaluate a location of one or more of a conveyance client, a representative, an AV, a service provider, a good supplier, an AV owner/controller, a fleet manager, a logistics provider, a logistics supplier, a map provider, a third party, or a combination thereof, from a service provider.

A statistical variable can be one or more of conveyance service availability, pricing, elevated pricing, conveyance service request density, conveyance service offering density, filtered conveyance service request density, filtered conveyance service offering density, preferred conveyance service request density, preferred conveyance service offering density, level of service density, a conveyance service distance, an estimated time of arrival, preferred conveyance client density, preferred representative density, preferred good supplier density, a preferred conveyance industry segment, conveyance industry segment density, representative density, conveyance client density, service provider density, good supplier density, or a combination thereof. A statistical variable can be displayed as one or more of a distinguishable hue, shade, saturation, opacity, color, color value, pattern, hatch fill, fill, shape, image, animation, or a combination thereof.

A heat map can optionally be a geographical map that can be separate or can be a layer on a dynamic map. A heat map can be compiled on a central server and then transmitted to and displayed on an application or a remote display. A heat map can be a choropleth map or a thematic map.

A map provider can provide or utilize a heat map that can display a metric or a statistical variable relating to an individual service provider or an individual good supplier. A heat map can depict a pricing metric or another relevant conveyance service metric. A heat map can depict an estimated time of arrival. A heat map can depict an estimated time of arrival relating to a conveyance service request, a filtered conveyance service request, a preferred conveyance service request, a conveyance service offering, a filtered conveyance service offering, a preferred conveyance service offering, a representative, a conveyance client, a service provider, a good supplier, an AV owner/controller, a fleet manager, a logistics provider, a logistics supplier, a map provider, a third party, or a combination thereof.

A central server or an application can generate prediction data based on a conveyance service request and/or a conveyance service offering and can transmit to an application to create a predictive heat map. A heat map can be used for an individual conveyance industry segment. A heat map can be used for an individual service provider or an individual good supplier.

A preferred conveyance service request is not identified prior to compiling a heat map, a real time or near real time heat map, a historical heat map, a predictive heat map, or a combination thereof. A preferred conveyance service offering is not identified prior to compiling a heat map, a real time or near real time heat map, a historical heat map, a predictive heat map, or a combination thereof.

A real time or near real time heat map can be compiled from a statistical variable of a conveyance service request, a filtered conveyance service request, a preferred conveyance service request, or a combination thereof. A real time or near real time heat map can be compiled from a statistical variable of a conveyance service offering, a filtered conveyance service offering, a preferred conveyance service offering, or a combination thereof. A real time or near real time heat map can display one or more of current conveyance client density, current representative density, current AV density, current service provider density, current good supplier density, or a combination thereof, based on a current or historical estimated time of arrival.

A historical heat map can be compiled from a statistical variable of a past conveyance service request, a past filtered conveyance service request, a past preferred conveyance service request, or a combination thereof. A historical heat map can be compiled from a statistical variable of a past conveyance service offering, a past filtered conveyance service offering, a past preferred conveyance service offering, or a combination thereof. A historical heat map can be used to evaluate a historical trend relating to a conveyance industry segment. A historical heat map can display one or more of historical conveyance client density, historical representative density, historical AV density, historical service provider density, historical good supplier density, or a combination thereof, based on a historical estimated time of arrival.

A predictive heat map can be compiled from a statistical variable of a real time or near real time conveyance service request, a past conveyance service request, a real time or near real time filtered conveyance service request, a past filtered conveyance service request, real time or near real time preferred conveyance service request, a past preferred conveyance service request, or a combination thereof.

A predictive heat map can be compiled from a statistical variable of a real time or near real time conveyance service offering, a past conveyance service offering, a real time or near real time filtered conveyance service offering, a past filtered conveyance service offering, a real time or near real time preferred conveyance service offering, a past preferred conveyance service offering, or a combination thereof. A predictive heat map can display one or more of future conveyance client density, future representative density, future AV density, future service provider density, future good supplier density, or a combination thereof, based on a current and historical estimated time of arrival.

A predictive heat map can utilize a neural network, other machine learning technology, or quantum computing. A predictive heat map can be used by a representative or a conveyance client to find a potential upcoming area with elevated pricing.

A predictive heat map can identify or estimate future conveyance service availability, future pricing, future elevated pricing, future conveyance service request density, future conveyance service offering density, future filtered conveyance service request density, future filtered conveyance service offering density, future preferred conveyance service request density, future preferred conveyance service offering density, future level of service density, future conveyance industry segment density, future representative density, future conveyance client density, future service provider density, future good supplier density, future level of service demand, future conveyance industry segment demand, future conveyance service demand, future service provider demand, future good supplier demand, future conveyance service supply, future representative supply, or a combination thereof.

A predictive heat map can generate a visual notification or an audio notification to notify a representative or a conveyance client of a future change or update of a statistical variable, a measurement of a statistical variable, or a combination thereof.

A heat map can utilize an application, a terminal, a central server, an external server, a link, or a combination thereof, that can be combined or integrated. A heat map can utilize an application, a terminal, a central server, an external server, a link, or a combination thereof, that can be combined or integrated on a smartphone. A real time or near real time heat map can utilize an application, a terminal, a central server, an external server, a link, or a combination thereof, that can be combined or integrated. A historical heat map can utilize an application, a terminal, a central server, an external server, a link, or a combination thereof, that can be combined or integrated. A predictive heat map can utilize an application, a terminal, a central server, an external server, a link, or a combination thereof, that can be combined or integrated.

An AV owner/controller, a service provider, a good supplier, a fleet manager, a logistics provider, a logistics supplier, or a combination thereof, can be displayed on or with a heat map that can display a level of service preference.

A conveyance client can visually identify a metric or a statistical variable relating to a service provider, a good supplier, or a map provider associated with a heat map. A conveyance client can visually identify two service providers on a heat map with the different pricing information. A representative can visually identify a metric or a statistical variable relating to a service provider, a good supplier, or a map provider associated with a heat map. A representative can visually identify three good suppliers on a heat map with different elevated pricing information.

A level of service preference can be displayed on a heat map to identify a metric or a statistical variable relating to a service provider, a good supplier, or a map provider. A service provider, a good supplier, a fleet manager, an AV owner/controller, a logistics provider, a logistics supplier, a conveyance client, a representative, a third party, or a combination thereof, can be displayed on or with a heat map that can display a level of service preference. A heat map can display a scooter, a scooter service, a bicycle, or a bicycle service.

A heat map can facilitate securing a preferred conveyance service offering utilizing more than one application. A third party can provide a heat map on a third party application that can be used to facilitate securing a preferred conveyance service offering on a service provider application. A heat map can facilitate securing a preferred conveyance service request utilizing more than one application. A third party can provide a heat map on a third party application that can be used to facilitate securing a preferred conveyance service request on a service provider application.

Application: The following are illustrative, non-limiting examples of an "application":

An application can be a software that can facilitate an operation or a function to secure a preferred conveyance service request or a preferred conveyance service offering. An application can be a software that can be utilized or operated by a conveyance client, a representative, an AV owner/controller, a service provider, a good supplier, a fleet manager, a logistics provider, a logistics supplier, a map provider, a third party, or a combination thereof. An application can be a software such as a smartphone application, a computer application, a computer program, an API, a website, a web application, a smartphone application, a cloud application, or a service.

An application can be software that can facilitate analyzing, evaluating, securing, obtaining, accepting, declining, canceling, displaying, communicating, or a combination thereof, a preferred conveyance service request, a preferred conveyance service offering, a real time or near real time geographical location of a conveyance client, a real time or near real time geographical location of a representative, or a combination thereof. An application can be provided in any form or format, such as any appropriate tangible or intangible medium of expression but can be provided in an electronic form. An application can be associated with one or more of a central server, a link, an external server, an application, a good supplier, a service provider, an AV owner/controller, a good supplier, a fleet manager, a logistics provider, a logistics supplier, a map provider, a third party, a conveyance client, a representative, or a combination thereof.

An application can be software appropriate for communicating to or with one or more of a central server, an external server, an application, a good supplier, an AV, a terminal, a service provider, a good supplier, a fleet manager, a logistics provider, a logistics supplier, a representative, a conveyance client, a map provider, a third party, or a combination thereof. An application can operate on one or more of a terminal, a central server, an external server, or a combination thereof. An application can standardize or convert a conveyance service request or a conveyance service offering, a real time or near real time geographical location of a conveyance client, a real time or near real time geographical location of a representative, or a combination thereof structured in a different format, into a uniform format. A representative can input or provide a representative preference into an application. A conveyance client can input or provide a conveyance client preference into an application.

An application can provide one or more of a real time or near real time geographical location of a representative, a real time or near real time geographical location of a conveyance client, a real time or near real time geographical location of a service provider, a real time or near real time geographical location of a good supplier, a real time or near real time geographical location of a fleet manager, a real time or near real time geographical location of a logistics provider, a real time or near real time geographical location of a logistics supplier, a real time or near real time geographical location of a map provider, a real time or near real time geographical location of a third party, or a combination thereof, using a geographical location module of a terminal. Information and/or data inputted or discovered by an application can be cached. An application can be updated or refreshed in real time or near real time and can refer to being updated or refreshed in the highest level of development or state of the art. An application can perform a function in real time or near real time and can refer to being updated or refreshed in the highest level of development or state of the art.

An application can communicate information or data relating to all or some of a preferred conveyance service request, all or some of a filtered conveyance service request, all or some of a conveyance service request, all or some of a preferred conveyance service offering, all or some of a filtered conveyance service offering, all or some of a conveyance service offering, all or some of subsequent or additional plurality of filtered conveyance service offerings, all or some of subsequent or additional a preferred conveyance service offering, a beginning service geographical location, an ending service geographical location, all or some of a real time or near real time geographical location of a representative, all or some of a real time or near real time geographical location of a conveyance client, a representative preference, a conveyance client preference, a secured preferred conveyance service request, or a secured preferred conveyance service offering. An application can communicate all or some of information or data with a central server, an external server, an application, or a combination thereof.

An application can filter and identify all or some of a preferred conveyance service request, all or some of a filtered conveyance service request, all or some of a conveyance service request, all or some of a preferred conveyance service offering, all or some of a filtered conveyance service offering, all or some of a conveyance service offering, all or some of subsequent or additional plurality of filtered conveyance service offerings, all or some of subsequent or additional a preferred conveyance service offering, a beginning service geographical location, an ending service geographical location, all or some of a real time or near real time geographical location of a representative, all or some of a real time or near real time geographical location of a conveyance client, a representative preference, a conveyance client preference, a secured preferred conveyance service request, a secured preferred conveyance service offering, or a combination thereof, together or separately.

An application can be a software that can facilitate an operation or a function to secure a conveyance service request, a filtered conveyance service request, a preferred conveyance service request, a conveyance service offering, a filtered conveyance service offering, a preferred conveyance service offering, or a combination thereof. A conveyance service offering or a conveyance service request can be pre-filtered or pre-categorized on a central server, an external server, an application, or a combination thereof.

An application can be used to analyze, evaluate, secure, or obtain, accept, decline, cancel, or communicate a preferred conveyance service request or a preferred conveyance service offering. An application can be used by one or more of a representative, a conveyance client, a service provider, a good supplier, a fleet manager, a logistics provider, a logistics supplier, a map provider, a third party, or a combination thereof. An application can be used, accessed, controlled, or operated by one or more of a representative, a conveyance client, a service provider, a good supplier, a fleet manager, a logistics provider, a logistics supplier, a map provider, a third party, or a combination thereof, to optionally evaluate and then secure a preferred conveyance service request, a preferred conveyance service offering, or a combination thereof.

An application can display a visual representation of one or more of a dynamic map, a heat map, or a combination thereof. An application can display a secured preferred conveyance service request. An application can display a secured preferred conveyance service offering. An application can display conveyance data relating to one or more of a conveyance service request, a filtered conveyance service request, a preferred conveyance service request, a conveyance service offering, a filtered conveyance service offering, a preferred conveyance service offering, or a combination thereof.

An application, a terminal, a central server, an external server, a link, or a combination thereof, can be combined or integrated. There can be a different variation of the application used by one or more of a representative, a conveyance client, a service provider, a good supplier, a fleet manager, a logistics provider, a logistics supplier, a map provider, a third party, or a combination thereof. An application can transmit an inertial Measurement Unit (IMU) reading of a terminal to a central server to determine an orientation or a direction of a representative, a conveyance client, a service provider, a good supplier, a fleet manager, a logistics provider, a logistics supplier, a map provider, a third party, or a combination thereof. An application can be in a form of a mobile application, a non-mobile application, a website, a plugin, or a combination thereof.

An application can operate on a central server, an external server, or a combination thereof. An application can perform a central server function or an external server function. An application can perform a similar function as a central server or an external server function to identify a preferred conveyance service request or a preferred conveyance service offering. A different application can be used by a representative, a conveyance client, a service provider, a good supplier, a fleet manager, a logistics provider, a logistics supplier, a map provider, a third party, or a combination thereof.

A preferred conveyance service request or a preferred conveyance service offering can be transmitted to an application and can be displayed as a pop-up, an icon, a visual, a symbol, a pattern, a marker, a notification, an alert, a message, a short message service, a multimedia messaging service, a smart messaging service, an extended message service, or a combination thereof.

An application can secure a preferred conveyance service request, a filtered conveyance service request, a conveyance service request, a preferred conveyance service offering, a filtered conveyance service offering, a conveyance service offering, or a combination thereof, and can communicate directly or indirectly with a central server, an external server, an application, a service provider, a good supplier, a fleet manager, a logistics provider, a logistics supplier, a map provider, a third party, a representative, a conveyance client, or a combination thereof.

An application can secure a preferred conveyance service request, a filtered conveyance service request, a preferred conveyance service offering, a filtered conveyance service offering, or a combination thereof, and can communicate indirectly with an external server or a service provider via a central server. An application can secure a preferred conveyance service request, a filtered conveyance service request, a preferred conveyance service offering, a filtered conveyance service offering, or a combination thereof, and can communicate directly with an external server, or a service provider.

An application can be a service provider application, a good supplier application, an AV owner/controller application, a fleet manager application, a logistics provider application, a logistics supplier application, a representative application, a conveyance client application, a map provider application, a third party application, or a combination thereof. A map provider can provide an application that can be utilized by a conveyance client or a representative. A map provider can provide a visual representation on an application that can be utilized by a conveyance client or a representative.

An application can be accessed, controlled, or operated remotely by a service provider, a good supplier, a fleet manager, a logistics provider, a logistics supplier, a representative, a conveyance client, a map provider, a third party, or a combination thereof, to optionally evaluate and then secure a preferred conveyance service request or a preferred conveyance service offering.

An application can manage or process a conveyance service offering the same as a conveyance service request. An application can manage or process a conveyance service request the same as a conveyance service offering. A conveyance service request or a conveyance service offering can be filtered in real time or near real time on an application. A preferred conveyance service request can be identified in real time, from a filtered conveyance service request on an application. A preferred conveyance service offering can be identified in real time or near real time, from a filtered conveyance service offering on an application.

A different geographical location can be used other than a real time or near real time geographical location of a representative when filtering a conveyance service request. A different geographical location can be used other than a real time or near real time geographical location of a conveyance client when filtering a conveyance service offering. An application can expose or be accessed through an API relating to a service provider, a good supplier, a fleet manager, a logistics provider, a logistics supplier, a map provider, or a third party.

There can be one or more applications on or associated with an AV. There can be one or more applications with different function that can reside on or be associated with one AV. For example, there can be two different applications on or associated with one AV, the first being a dealership application allowing for vehicle maintenance and the second being an application integrated with a central server that facilitates conveyance services. An application can be associated with a single AV or a fleet of AVs.

The following provides different examples of an application that might be used by various parties:

A conveyance client can access an application via a terminal. A conveyance client can evaluate and then secure a preferred conveyance service offering.

A representative can access an application via a terminal. A representative can evaluate and then secure a preferred conveyance service request.

A map provider can provide a visual representation via an application. A representative can evaluate and then secure a preferred conveyance service request. A conveyance client can evaluate and then secure a preferred conveyance service offering.

Terminal: The following are illustrative, non-limiting examples of a "terminal" as used in the present disclosure:

A terminal can be a hardware that can facilitate an operation or a function to secure a preferred conveyance service request or a preferred conveyance service offering. A terminal can be a hardware that can be utilized or operated by a conveyance client, a representative, a map provider, a third party, an AV owner/controller, a service provider, a good supplier, a fleet manager, a logistics provider, a logistics supplier, or a combination thereof.

A terminal can be a device that can facilitate operating an application. A terminal can be capable of communicating with a central server, an external server, an application, or a combination thereof, by way of a link. A terminal can be an electronic computing device that can include a computer processor, a computer readable memory, an input source, a geographical location module, a display, a network interface, or a combination thereof. A terminal can encompass hardware and/or software alone or in a combination.

A terminal can be a smartphone or smart device that can be utilized to combine or integrate an application, a central server, an external server, a terminal, a link, or a combination thereof. A terminal can be used to access one or more of an application. An application can operate on a terminal. An operating system can run on a terminal. A terminal can facilitate one or more of a display function, an input function, an operation, or a combination thereof, of an application. An application can provide a real time or near real time geographical location of one or more of a representative, a conveyance client, a service provider, a good supplier, a fleet manager, a logistics provider, a logistics supplier, a map provider, a third party, an AV owner/controller, or a combination thereof, using a geographical location module of a terminal. A terminal can be associated with a display or a remote display.

A terminal can be a computer, a smartphone device, a plug-in device, a mobile computing device, a handheld computing device, a tablet computing device, a laptop computing device, a wearable computing device, a portable computing device, a fixed computing device, a non-fixed computing device, a physiologically embedded computing device, a biologically integrated computing device, an in-Vehicle infotainment device, an internet of Things (IoT) device, a projecting device, a computing device embedded in a vehicle, a head-up display, a voice recognition, a voice control, or a combination thereof.

An Inertial Measurement Unit (IMU) reading of a terminal can be used to determine an orientation or a direction least one representative, a conveyance client, a service provider, a good supplier, a fleet manager, a logistics provider, a logistics supplier, a map provider, a third party, an AV owner/controller, or a combination thereof. A geographical location module of a terminal can include a Global Positioning System (GPS), a satellite tracking, a RFID tracking, a radiolocation, a WiFi positioning system, geofencing, a global system for mobile communications, a cell phone triangulation, an internet tracking, or a combination thereof.

An application, a central server, an external server, a link, or a combination thereof, can be combined or integrated on a terminal, such as a smartphone. A terminal does not need a physical connection to be associated or communicate with an application, a link, a terminal, a central server, an external server, an AV, or a combination thereof.

A central server can optionally be located on a terminal. An input source of a terminal can be a touchscreen, a keypad, a keyboard, a voice controlled input, or a combination thereof. A visual representation can be displayed on an application using a display of a terminal. A terminal can be a smartphone that can be used by a representative, a conveyance client, an AV owner/controller, a service provider, a good supplier, a fleet manager, a logistics provider, a logistics supplier, a map provider, a third party, or a combination thereof.

Link: The following are illustrative, non-limiting examples of a "link" as used in the present disclosure:

A link can be a software and/or a hardware that include an electronic communication network channel to allow an efficient, rapid, and/or accurate transmission of information or data. A link can be provided via the Internet and can be encrypted. The definition of a link can encompass hardware and/or software alone or in a combination.

A link can be in a form of a software interface or API. A link can be an inter-process communication. A link can be any appropriate connection, such as one or more of type of connection selected from WiFi, a wireless, an ethernet, LTE, 3G, 4G, 5G, 6G or 7G, RFID, Bluetooth, BLE, PAN, LAN, MAN, WAN, WLAN, GSM, GPRS, UMTS, dial-up, broadband, mobile, DSL, cable, wired, satellite, ISDN, fiber-optic, infrared, client-server network such as a cloud computing network, another appropriate method, means, hardware and/or software capable of conveying information, or a combination thereof.

Central Server: The following are illustrative, non-limiting examples of a "central server":

A central server can be software and/or hardware that facilitates an operation to secure a preferred conveyance service request or a preferred conveyance service offering. A central server can be a software and/or a hardware that can be utilized or operated by a conveyance client, a representative, a service provider, a good supplier, a fleet manager, a logistics provider, a logistics supplier, a map provider, a third party, or a combination thereof. A central server can be a software and/or a hardware, a smartphone application, a computer application, a computer program, a website, a web application, a cloud application, or a service.

A central server can facilitate an operation or a function to secure a preferred conveyance service request or a preferred conveyance service offering. A central server can include a computer processor, a computer readable memory, a network interface, or a combination thereof. A central server can be a computer network system. A central server can encompass hardware and/or software alone or in a combination.

A central server can be associated with one or more of an external server, a link, a good supplier, an AV, an application, a central server, a service provider, a representative, a conveyance client, or a combination thereof. A central server can encompass different hardware and/or software alone or in a combination. A central server can include or connect to a database. A computer readable memory of a central server can be or include a database that a central server can use or connect to. A central server can store, retrieve, or utilize any information or data from a database, a real time database, a near real time database, a database trigger, a database table, a database row, a database column, a database result set, a database node, a database edge, a database property, a blockchain, a blockchain technology, or a combination thereof. A central server can store or retrieve any information or data in a database, a schemaless database, a graph database, a relational database, a non-relational database, a distributed database, or a parallel database.

A central server can connect to or communicate with one or more of an application, an external server, a central server, a terminal, or a combination thereof, by way of a link. A central server can control at least one flow of information or data between one or more of an application, an external server, a central server, or a combination thereof, in either direction. A central server can be a server in an individual geographical location or an additional geographical location. A central server can be, but it not limited to a single Internet location.

A central server can communicate information or data relating to all or some of a preferred conveyance service request, all or some of a filtered conveyance service request, all or some of a conveyance service request, all or some of a preferred conveyance service offering, all or some of a filtered conveyance service offering, all or some of a conveyance service offering, all or some of subsequent or additional plurality of filtered conveyance service offerings, all or some of subsequent or additional a preferred conveyance service offering, a beginning service geographical location, an ending service geographical location, all or some of a real time or near real time geographical location of a representative, all or some of a real time or near real time geographical location of a conveyance client, a representative preference, a conveyance client preference, a secured preferred conveyance service request, or a secured preferred conveyance service offering. A central server can communicate all or some of information or data with a central server, an external server, an application, or a combination thereof.

A central server can filter and identify all or some of a preferred conveyance service request, all or some of a filtered conveyance service request, all or some of a conveyance service request, all or some of a preferred conveyance service offering, all or some of a filtered conveyance service offering, all or some of a conveyance service offering, all or some of subsequent or additional plurality of filtered conveyance service offerings, all or some of subsequent or additional a preferred conveyance service offering, a beginning service geographical location, an ending service geographical location, all or some of a real time or near real time geographical location of a representative, all or some of a real time or near real time geographical location of a conveyance client, a representative preference, a conveyance client preference, a secured preferred conveyance service request, a secured preferred conveyance service offering, or a combination thereof, together or separately.

A central server can be software and/or hardware that can facilitate an operation to secure a conveyance service request, a filtered conveyance service request, a preferred conveyance service request, a conveyance service offering, a filtered conveyance service offering, a preferred conveyance service offering, or a combination thereof.

A central server can secure a preferred conveyance service request, a filtered conveyance service request, a conveyance service request, a preferred conveyance service offering, a filtered conveyance service offering, a conveyance service offering, or a combination thereof, and can communicate directly or indirectly with a central server, an external server, an application, a terminal, an AV, an AV owner/controller, a service provider, a good supplier, a fleet manager, a logistics provider, a logistics supplier, a third party, a map provider, a conveyance client, a representative, or a combination thereof.

A central server can standardize or convert a conveyance service request, structured in a different format, into a uniform format. A central server can standardize or convert a conveyance service offering, structured in a different format, into a uniform format. A central server can be a secure server. A central server can be made secure using hardware and/or software commercially available. Additionally, a central server can include encryption software such that communications entering or exiting a server are encrypted. Encryption hardware and/or software are commercially available. A central server can be updated or refreshed in real time or near real time and can refer to being updated or refreshed in the highest level of development or state of the art. A central server can perform a function in real time or near real time and can refer to being updated or refreshed in the highest level of development or state of the art. A central server can use machine learning technology to identify a pattern that can improve a visual representation.

A central server can use a database, a database table, or a result set to filter a conveyance service request or a conveyance service offering. A central server can use a database, a database table, or a result set to identify a preferred conveyance service request or a preferred conveyance service offering.

A central server can filter a conveyance service request relating to a representative preference and a real time or near real time geographical location of a representative, to identify a filtered conveyance service request by a process of one or more of categorizing, filtering, characterizing, screening, selecting, separating, identifying, specifying, distinguishing, naming, numbering, ordering, systematizing, tagging, labeling, recognizing, arranging, bracketing, ranking, organizing, classifying, segregating, isolating, grouping, comparing, or a combination thereof.

A central server can filter a conveyance service offering relating to a conveyance client preference and a real time or near real time geographical location of a conveyance client, to identify a filtered conveyance service offering by a process of one or more of categorizing, filtering, characterizing, screening, selecting, separating, identifying, specifying, distinguishing, naming, numbering, ordering, systematizing, tagging, labeling, recognizing, arranging, bracketing, ranking, organizing, classifying, segregating, isolating, grouping, comparing, or a combination thereof.

A central server can filter or categorize a conveyance service request upon being received. A central server can filter or categorize a conveyance service offering upon being received. A central server can filter a conveyance service request or a conveyance service offering more than once. A central server can receive, transmit, store, standardize, aggregate, or a combination thereof, a conveyance service request in any order prior to filtering a conveyance service request. A central server can receive, transmit, store, standardize, aggregate, or a combination thereof, a conveyance service offering in any order prior to filtering a conveyance service offering.

A central server can identify a preferred conveyance service request from a filtered conveyance service request or a pre-filtered conveyance service request. A central server can identify a preferred conveyance service offering from a filtered conveyance service offering or a pre-filtered conveyance service offering.

A preferred conveyance service request relating to a representative preference can be identified from a filtered conveyance service request by using one or more of a sorting algorithm, a selection algorithm, a search algorithm, a merge algorithm, a maximum function, a minimum function, a graph algorithm, a graph search algorithm, a tree algorithm, a tree search algorithm, a matrix calculation, a matrix algorithm, a comparison, or a combination thereof.

A preferred conveyance service offering relating to a conveyance client preference can be identified from a filtered conveyance service offering by using one or more of a sorting algorithm, a selection algorithm, a search algorithm, a merge algorithm, a maximum function, a minimum function, a graph algorithm, a graph search algorithm, a tree algorithm, a tree search algorithm, a matrix calculation, a matrix algorithm, a comparison, or a combination thereof.

A central server can sort a filtered conveyance service request using a representative preference to identify a preferred conveyance service request. A filtered conveyance service request can be sorted relating to a weighted average of a representative preference however, sorting is not required to identify a preferred conveyance service request. A central server can sort a filtered conveyance service offering using a conveyance client preference to identify a preferred conveyance service offering. A filtered conveyance service offering can be sorted relating to a weighted average of a conveyance client preference however, sorting is not required to identify a preferred conveyance service offering. A central server can sort a filtered conveyance service request or a filtered conveyance service offering more than once to identify a preferred conveyance service request or a preferred conveyance service offering respectively.

A central server can sort a filtered conveyance service request in an order relating to a weighted average of a representative preference to identify a preferred conveyance service request. A central server can sort a filtered conveyance service offering in an order relating to a weighted average of a conveyance client preference to identify a preferred conveyance service offering.

A central server can process or facilitate one or more of a conveyance service request, a filtered conveyance service request, a preferred conveyance service request, or a combination thereof, relating to a service provider. A central server can process or facilitate one or more of a conveyance service offering, a filtered conveyance service offering, a preferred conveyance service offering, or a combination thereof, relating a service provider. A central server can use or have a default representative preference, a default conveyance client preference, or a combination thereof.

If a conveyance service request is pre-filtered or pre-categorized, then a conveyance service request can be perceived or referred to as a filtered conveyance service request and a central server can identify a preferred conveyance service request. If a conveyance service offering is pre-filtered or pre-categorized, then a conveyance service offering can be perceived or referred to as a filtered conveyance service offering and a central server can identify a preferred conveyance service offering.

A computer readable memory of a central server can be a database, a database table, a database result set, a cloud storage, a hard disk drive, a solid state drive, an optical disk drive, a flash memory, a random Access Memory (RAM), a tape, or a combination thereof.

A central server can include a distinct server operably linked in the same or a different geographical location. A central server can optionally be part of a terminal. A central server can optionally be part of an application. A central server can optionally be located on a terminal. An application can optionally operate on a central server. A function of a central server or an external server can be performed by an application. A function of an application can be performed by a central server or an external server. A function of a central server can be performed by an external server. A central server can include or utilize quantum computing. A central server can include or utilize a neural network. A central server can include or utilize machine learning technology. A central server can be dispersed across a geographical location such as Los Angeles and New York.

A central server can aggregate a conveyance service request, a conveyance service offering, or a combination thereof, within a service provider, an AV owner/controller, a good supplier, a fleet manager, a logistics provider, a logistics supplier, a map provider, or a combination thereof. A central server can process or facilitate a conveyance service request, a filtered conveyance service request, a preferred conveyance service request, a conveyance service offering, a filtered conveyance service offering, a preferred conveyance service offering, or a combination thereof, from an individual service provider relating to an individual conveyance industry segment. A central server can compile a visual representation to be transmitted to an application.

A conveyance service request, a conveyance service offering, all or some of a real time or near real time geographical location of a representative, all or some of a real time or near real time geographical location of a conveyance client, or a combination thereof, can be transmitted from an external server to a central server by way of a link. A conveyance service request, a conveyance service offering, all or some of a real time or near real time geographical location of a conveyance client, all or some of a real time or near real time geographical location of a representative or a combination thereof, can be transmitted from a service provider, an AV owner/controller, a good supplier, a fleet manager, a logistics provider, a logistics supplier, a map provider, or a combination thereof, to a central server by way of a link.

A conveyance service request can be structured in a uniform format prior to being transmitted from an external server and is not needed to be standardized. A conveyance service offering can be structured in a uniform format prior to being transmitted from an external server and is not needed to be standardized.

A central server can execute a function of the present invention for a conveyance client for one or more of receiving, standardizing, aggregating, filtering, and sorting a conveyance service offering, and securing a preferred conveyance service offering.

A central server can execute a function of the present invention for a representative and/or an AV for one or more of receiving, standardizing, aggregating, filtering and sorting, a conveyance service request, and securing a preferred conveyance service request.

A different geographical location can be used other than a real time or near real time geographical location of a representative when filtering a conveyance service request. A different geographical location can be used other than a real time or near real time geographical location of a conveyance client when filtering a conveyance service offering.

A conveyance client preference, a real time or near real time geographical location of a conveyance client, or a combination thereof, can be transmitted to a central server at any time prior to filtering a conveyance service offering. A representative preference, a real time or near real time geographical location of a representative, or a combination thereof, can be transmitted to a central server at any time prior to filtering a conveyance service request.

A central server can use an equal weight or an unequal weight for a representative preference when calculating a weighted average to identify a preferred conveyance service request. A central server can use an equal weight or an unequal weight for a conveyance client preference when calculating a weighted average to identify a preferred conveyance service offering.

When a central server receives a conveyance service request or a conveyance service offering, a central server can categorize or pre-filter a conveyance service request or a conveyance service offering. A central server can obtain or receive a pre-filtered or a pre-categorized conveyance service request relating to a geographical area. A central server can obtain or receive a pre-filtered or a pre-categorized conveyance service request relating to a level of service. A central server can obtain or receive a pre-filtered or a pre-categorized a conveyance service offering relating to a geographical area. A central server can obtain or receive a pre-filtered or a pre-categorized a conveyance service offering relating to a level of service. A conveyance service request or a conveyance service offering can be pre-filtered or pre-categorized on a central server based on a geographical area. A conveyance service request or a conveyance service offering can be pre-filtered or pre-categorized on a central server based on a level of service.

When a central server receives all or some of conveyance service offerings or all or some of conveyance service requests, a central server can categorize or pre-filter all or some of conveyance service offerings or all or some of conveyance service requests. A central server can obtain or receive all or some of pre-filtered conveyance service offerings, or all or some of a pre-categorized conveyance service requests, relating to a geographical area. A central server can obtain or receive all or some of a pre-filtered conveyance service requests or all or some of pre-categorized conveyance service offerings, relating to a level of service. All or some of conveyance service requests or all or some of conveyance service offerings can be pre-filtered or pre-categorized on a central server based on a geographical area. All or some of conveyance service requests or all or some of conveyance service offerings can be pre-filtered or pre-categorized on a central server based on a level of service.

A conveyance service request can be pre-filtered or pre-categorized on an external server or a central server, a conveyance service request can become a filtered conveyance service request and filtering is not required on a central server. If a conveyance service request is pre-filtered or pre-categorized, a central server does not need to filter a conveyance service request and can identify a preferred conveyance service request.

A conveyance service offering can be pre-filtered or pre-categorized on an external server or a central server, a conveyance service offering can become a filtered conveyance service offering and filtering is not required on a central server. If a conveyance service offering is pre-filtered or pre-categorized, a central server does not need to filter a conveyance service offering and can identify a preferred conveyance service offering.

A conveyance service request can be filtered based on a representative preference on a central server after being pre-filtered or pre-categorized. A conveyance service request can be filtered based on a representative preference on a central server after being pre-filtered or pre-categorized on an external server. A conveyance service offering can be filtered based on a conveyance client preference on a central server after being pre-filtered or pre-categorized. A conveyance service offering can be filtered based on a conveyance client preference on a central server after being pre-filtered or pre-categorized on an external server.

When a central server obtains a pre-filtered conveyance service request, a central server can compare a pre-filtered conveyance service request to a representative preference to identify a filtered conveyance service request. When a central server obtains a pre-filtered conveyance service offering, a central server can compare a pre-filtered conveyance service offering to a conveyance client preference to identify a filtered conveyance service offering.

If a conveyance service request or a conveyance service offering is pre-filtered, then a conveyance service request or a conveyance service offering is not filtered. A pre-filtered conveyance service request or a pre-filtered conveyance service offering can be perceived or referred to as a filtered conveyance service request or a filtered conveyance service offering respectively. A central server can filter a conveyance service request or a conveyance service offering at least once. A central server can sort a conveyance service request or a conveyance service offering at least once to identify a preferred conveyance service request or a preferred conveyance service offering. A central server can filter a conveyance service request or a conveyance service offering more than once based on a pricing preference and then a service provider preference. A conveyance service request or a conveyance service offering can be categorized by a geographical location after being received on a central server.

A filtered conveyance service request can be sorted in an ascending or descending order relating to a weighted average of a representative preference to identify a preferred conveyance service request. A filtered conveyance service offering can be sorted in an ascending or descending order relating to a weighted average of a conveyance client preference to identify a preferred conveyance service offering.

A preferred conveyance service request, a filtered conveyance service request, or a combination thereof, can be identified or updated in real time or near real time as a real time or near real time geographical location of a representative updates or changes. A preferred conveyance service offering, a filtered conveyance service offering, or a combination thereof, can be identified or updated in real time or near real time as a real time or near real time geographical location of a conveyance client updates or changes.

A preferred conveyance service request, a preferred conveyance service offering, a filtered conveyance service request, a filtered conveyance service offering, a conveyance client preference, a representative preference, a secured preferred conveyance service request, a secured preferred conveyance service offering, or a combination thereof, can be identified or updated in real time or near real time as traffic information updates or changes.

A central server can secure a preferred conveyance service request, a filtered conveyance service request, or a combination thereof, and can communicate directly with an external server or a service provider. A central server can secure a preferred conveyance service offering, a filtered conveyance service offering, or a combination thereof, and can communicate directly with an external server or a service provider.

A secured preferred conveyance service request or a secured preferred conveyance service offering can be sent to one or more of a service provider, an external server, a good supplier, a fleet manager, a logistics provider, a logistics supplier, a representative, a conveyance client, a map provider, or a combination thereof.

A central server, an external server, an application, a terminal, a link, or a combination thereof, can be combined or integrated. A central server can manage or process a conveyance service offering the same as a conveyance service request. A central server can manage or process a conveyance service request the same as a conveyance service offering. A conveyance service offering or a conveyance service request can be pre-filtered or pre-categorized on a central server, an external server, an application, or a combination thereof.

A central server can use a graph database to identify a preferred conveyance service request, a preferred conveyance service offering, or a combination thereof, that can be in the closest proximity. A central server can utilize a directed graph or an undirected graph with a node and/or an edge to identify an AV within the shortest travel time to a conveyance client, a preferred conveyance service request, a preferred conveyance service offering, or a combination thereof.

System: The following are illustrative, non-limiting examples of a "system":

A system can be a collection of elements of the present invention that can secure a preferred conveyance service request or a preferred conveyance service offering. A system can be a collection of elements of the present invention, where an element can be associated or integrated with another element. The collection of elements or individual elements can be in the same or different locations. A system can be a computer program product.

In embodiments of the present invention, conveyance client, an application, a representative, a terminal, a link, a central server, an external server, a service provider, a good supplier, a map provider, an AV, a visual representation, a dynamic map, a heat map, a real time or near real time heat map, a historical heat map, a predictive heat map, a representative preference, a conveyance client preference, conveyance data, a conveyance service request, a filtered conveyance service request, a preferred conveyance service request, a conveyance service offering, a filtered conveyance service offering, and a preferred conveyance service offering can all be in a similar geographical location, or spread out in a distant location, including a cross-border location.

A system can be used to evaluate and secure a preferred conveyance service request or a preferred conveyance service offering relating to a service provider. A system can be updated or refreshed in real time or near real time and can refer to being updated or refreshed in the highest level of development or state of the art. A system can perform a function in real time or near real time and can refer to being updated or refreshed in the highest level of development or state of the art.

Method: The following are illustrative, non-limiting examples of a "method" as used in the present disclosure:

A method can be a collection of elements of the present invention that can secure a preferred conveyance service request or a preferred conveyance service offering. A method can be a collection of elements of the present invention in which an element can be associated or integrated with another element. The collection of elements or individual elements can be in the same or different locations. A method can be a computer program product.

In some embodiments, a conveyance client, an application, a representative, a terminal, a link, a central server, an external server, a service provider, a good supplier, a map provider, an AV, a visual representation, a dynamic map, a heat map, a real time or near real time heat map, a historical heat map, a predictive heat map, a representative preference, a conveyance client preference, conveyance data, a conveyance service request, a filtered conveyance service request, a preferred conveyance service request, a conveyance service offering, a filtered conveyance service offering, and a preferred conveyance service offering can all be in a similar geographical location, or spread out in a distant location, including a cross-border location.

A method can be used to evaluate and secure a preferred conveyance service request or a preferred conveyance service offering relating to a service provider. A method can be updated or refreshed in real time or near real time and can refer to being updated or refreshed in the highest level of development or state of the art. A method can perform a function in real time or near real time and can refer to being updated or refreshed in the highest level of development or state of the art.

External Server: The following are illustrative, non-limiting examples of an "external server" as used in the present disclosure. As previously noted, "external server" may be one or more than one external server.

An external server can be a software and/or a hardware that can facilitate an operation or a function to secure a preferred conveyance service request or a preferred conveyance service offering. An external server can be a software and/or a hardware that can be utilized or operated by a conveyance client, a representative, a service provider, a good supplier, a fleet manager, an AV owner/controller, a logistics provider, a logistics supplier, a map provider, a third party, or a combination thereof. An external server can be a software and/or a hardware, a computer application, a computer program, an API, a smartphone application, a website, a web application, a smartphone application, a cloud application, or a service.

An external server can communicate information or data relating to all or some of a preferred conveyance service request, all or some of a filtered conveyance service request, all or some of a conveyance service request, all or some of a preferred conveyance service offering, all or some of a filtered conveyance service offering, all or some of a conveyance service offering, all or some of subsequent or additional plurality of filtered conveyance service offerings, all or some of subsequent or additional a preferred conveyance service offering, a beginning service geographical location, an ending service geographical location, all or some of a real time or near real time geographical location of a representative, all or some of a real time or near real time geographical location of a conveyance client, a representative preference, a conveyance client preference, a secured preferred conveyance service request, or a secured preferred conveyance service offering. An external server can communicate all or some of information or data with a central server, another external server, an application, or a combination thereof.

An external server can be a software and/or a hardware that can facilitate an operation or a function to secure a conveyance service request, a filtered conveyance service request, a preferred conveyance service request, a conveyance service offering, a filtered conveyance service offering, a preferred conveyance service offering, or a combination thereof.

An external server can expose or be accessed through an API relating to a service provider, a good supplier, an AV owner/controller, a fleet manager, a logistics provider, a logistics supplier, a map provider, or a third party.

All or some of conveyance data relating to a conveyance service request or a conveyance service offering can be sourced or provided by an external server that can be associated with a service provider, a good supplier, a fleet manager, a logistics provider, a logistics supplier, an AV owner/controller, a map provider, a third party, or a combination thereof. All or some of conveyance data relating to an AV can be sourced or provided by an external server that can also have or provide a conveyance service request, a conveyance service offering, or a combination thereof. All or some of conveyance data relating to an AV can be sourced or provided by an external server that does not have or does not provide a conveyance service request, a conveyance service offering, or a combination thereof. An AV, all or some of conveyance data relating to an AV, or a combination thereof, can be sourced or provided by a third party.

An external server can include a source of a conveyance service request, a conveyance service offering, or a combination thereof. An external server can be a source of a real time or near real time conveyance service request. An external server can be a source of a real time or near real time conveyance service offering. An external server can be a computer network system. An external server can include a computer processor, a computer readable memory, and a network interface. An external server can encompass hardware and/or software alone or in a combination.

All or some of conveyance data relating to a conveyance service request or a conveyance service offering can be transmitted to or communicated with a central server, an external server, an application, an application that can be associated with an AV, a terminal, an AV owner/controller, a service provider, a good supplier, a fleet manager, a logistics provider, a logistics supplier, a map provider, a third party, a conveyance client, a representative, or a combination thereof.

A preferred conveyance service request or a preferred conveyance service offering can be secured through or by a central server, an application, an external server, a terminal, a link, or a combination thereof. An external server can have or be associated with a database based on a data point. An external server can have or be associated with a database for a conveyance service request, a conveyance service offering, or a combination thereof. An external server can have or be associated with a database based on a conveyance client preference, a representative preference, or a combination thereof. An external server can have or be associated with a database for a conveyance industry segment. An external server can have or be associated with a conveyance industry segment.

An external server can be a server that can connect to or communicate with a central server, an application, or a combination thereof, by way of a link. An external server can transmit in real time or near real time one or more of a conveyance service request in conjunction with conveyance data, a conveyance service offering in conjunction with conveyance data, or a combination thereof, to a central server or an application by way of a link. An external server can encompass different hardware and/or software alone or in a combination. An external server can include or connect to a database. A computer readable memory of an external server can be a database that an external server can connect to.

An external server can have or be associated with one or more of a central server, an external server, a link, a terminal, a good supplier, an AV, an application, a service provider, a good supplier server, a fleet manager server, an AV owner/controller server, a logistics provider, a logistics supplier, a map provider, a third party, a conveyance client, a representative, or a combination thereof. An external server can optionally be perceived or referred to as a service provider server, a good supplier server, a fleet manager server, an AV owner/controller server, a logistics provider server, a logistics supplier server, a map provider server, or a third party server.

An external server can be a server in an individual geographical location or an additional geographical location. An external server can, but need not, relate to a single Internet location. Preferably, an external server will be secured using hardware and/or software that is commercially available. Additionally, an external server can include encryption software such that communications entering or exiting an external server are encrypted. Encryption hardware and/or software are commercially available.

An external server can be associated with an Application Program Interface (API). An external server Application Program Interface (API) can be used to facilitate communication between one or more of a central server, an external server, an application, a terminal, a conveyance client, a representative, a map provider, a third party, a service provider, a good supplier, an AV owner/controller, a fleet manager, a logistics provider, a logistics supplier, or a combination thereof. An external server can provide a conveyance service request in conjunction with conveyance data, a conveyance service offering in conjunction with conveyance data, or a combination thereof, relating to a service provider. An external server can be updated or refreshed in real time or near real time and can refer to being updated or refreshed in the highest level of development or state of the art. An external server can perform a function in real time or near real time and can refer to being updated or refreshed in the highest level of development or state of the art.

An external server being a source of a conveyance service request, a conveyance service offering, or a combination thereof, can be associated with an individual service provider, an individual good supplier, an individual fleet manager, an individual owner or an individual controller of an AV, an individual logistics provider, an individual logistics supplier, an individual map provider, an individual third party, an individual representative, or an individual conveyance client.

An individual service provider or an individual map provider can be associated with an external server that can use a database based on a data point. An individual service provider or an individual map provider can be associated with an external server that can use a database for a conveyance service request, a conveyance service offering, or a combination thereof. An individual service provider or an individual map provider can be associated with an external server that can use or have a database based on a conveyance client preference or a representative preference. An individual service provider or an individual map provider can be associated with an external server that uses a database for a conveyance industry segment. An individual service provider or an individual map provider can have, for example, one or more external server relating to a ride-hail industry segment and another external server relating to a freight industry segment. An individual service provider or an individual map provider can use an external server for conveyance service requests, conveyance service offerings, or a combination thereof.

An external server can operate on a central server. An external server can include a distinct server operably linked in the same or a different geographical location. An external server can optionally be perceived or referred to as a peer-to-peer network. An external server can transmit a conveyance service request, a conveyance service offering, or a combination thereof, that can be pre-standardized to or with a central server or an application. An external server can be a server that can connect to or communicate with an application, a central server, or a combination thereof, by way of a link. A function of an external server can be performed by a central server.

A conveyance service request can be filtered based on a representative preference on a central server, an external server, an application, or a combination thereof, after being pre-filtered or pre-categorized on a central server, an external server, or an application, or a combination thereof. A conveyance service offering can be filtered based on a conveyance client preference on a central server, an external server, an application, or a combination thereof, after being pre-filtered or pre-categorized on a central server, an external server, or an application, or a combination thereof.

An external server can pre-filter or pre-categorize a conveyance service request, a filtered conveyance service request, a preferred conveyance service request, a conveyance service offering, a filtered conveyance service offering, a preferred conveyance service offering, or a combination thereof. An external server can pre-filter or pre-categorize a conveyance service request, a filtered conveyance service request, a preferred conveyance service request, a conveyance service offering, a filtered conveyance service offering, a preferred conveyance service offering, or a combination thereof, and a central server or an application does not need to filter or identify as preferred. An external server can pre-filter or pre-categorize a conveyance service request, a filtered conveyance service request, a preferred conveyance service request, a conveyance service offering, a filtered conveyance service offering, a preferred conveyance service offering, or a combination thereof, relating to a geographical area. An external server can pre-filter or pre-categorize a conveyance service request, a filtered conveyance service request, a preferred conveyance service request, a conveyance service offering, a filtered conveyance service offering, a preferred conveyance service offering, or a combination thereof, relating to a level of service preference.

An external server can filter and identify one or more of all or some of a preferred conveyance service request, all or some of a filtered conveyance service request, all or some of a conveyance service request, all or some of a preferred conveyance service offering, all or some of a filtered conveyance service offering, all or some of a conveyance service offering, all or some of subsequent or additional plurality of filtered conveyance service offerings, all or some of subsequent or additional a preferred conveyance service offering, a beginning service geographical location, an ending service geographical location, all or some of a real time or near real time geographical location of a representative, all or some of a real time or near real time geographical location of a conveyance client, a representative preference, a conveyance client preference, a secured preferred conveyance service request, a secured preferred conveyance service offering, or a combination thereof, together or separately.

An external server, a central server, an application, a terminal, a link, or a combination thereof, can be combined or integrated. An external server, a central server, an application, a terminal, a link, or a combination thereof, can be combined or integrated on a smartphone. An external server can manage or process a conveyance service offering the same or similar as a conveyance service request. An external server can manage or process a conveyance service request the same or similar as a conveyance service offering.

An external server can secure a preferred conveyance service request, a filtered conveyance service request, a conveyance service request, a preferred conveyance service offering, a filtered conveyance service offering, a conveyance service offering, or a combination thereof, and can communicate directly or indirectly with a central server, an external server, an application, an AV, an AV owner/controller, a service provider, a good supplier, a fleet manager, a logistics provider, a logistics supplier, a map provider, a third party, a representative, a conveyance client, or a combination thereof.

A preferred conveyance service request or a preferred conveyance service offering can be secured by a central server or an external server through an application. A preferred conveyance service request or a preferred conveyance service offering can be secured and transmitted between an application and a central server by way of a link. A preferred conveyance service request or a preferred conveyance service offering can be secured and transmitted between an application and an external server by way of a link. A preferred conveyance service request or a preferred conveyance service offering can be secured and transmitted between an application and an external server through a central server by way of a link. An external server can connect to or communicate with two central servers belonging to two different entities. A secured preferred conveyance service request, a secured preferred conveyance service offering, or a combination thereof, can be transmitted from an application to an external server or a central server through a link.

Conveyance Data: The following are illustrative, non-limiting examples of "conveyance data" as used in the present disclosure:

Conveyance data can be in real time or near real time and may include one or more of a beginning service geographical location, a ending service geographical location, pricing information, elevated pricing information, a representative preference, a conveyance client preference, a distance parameter, an estimated time of arrival, a time to destination, a conveyance client geographical location, a conveyance client review, a conveyance client rating, a conveyance client detail, a conveyance service detail, a conveyance service route, a preferred conveyance client, a sensor data, a representative geographical location, a representative review, a representative rating, a representative detail, an AV geographical location, an AV review, an AV rating, an AV detail, a preferred AV, a route planning preference, a fuel economy preference, a battery longevity preference, a vehicle capacity preference, a vehicle diagnostic preference, a conveyance data preference, a service provider geographical location, a service provider review, a service provider rating, a service provider detail, a preferred service provider, a good supplier geographical location, a good supplier review, a good supplier rating, a good supplier detail, a preferred good supplier, an AV owner/controller geographical location, an AV owner/controller review, an AV owner/controller rating, an AV owner/controller detail, a preferred AV owner/controller, a fleet manager geographical location, a fleet manager review, a fleet manager rating, a fleet manager detail, a preferred fleet manager, a logistics provider geographical location, a logistics provider review, a logistics provider rating, a logistics provider detail, a preferred logistics provider, a logistics supplier geographical location, a logistics supplier review, a logistics supplier rating, a logistics supplier detail, a preferred logistics supplier, a conveyance industry segment detail, a preferred conveyance industry segment, a good detail, an item detail, a type of vehicle detail, a vehicle detail, a measurement of one or more statistical variable, a level of service detail, fuel consumption, battery level, vehicle diagnostic, vehicle capacity, or a combination thereof.

Conveyance data can be information or data that can be used to facilitate an operation or a function to secure a preferred conveyance service request or a preferred conveyance service offering. Conveyance data can be information or data that can be utilized or managed by a representative, a conveyance client, a service provider, a good supplier, an AV owner/controller, a fleet manager, a logistics provider, a logistics supplier, a map provider, a third party, or a combination thereof.

Conveyance data can be data or information corresponding to a past metric, a current metric, a future metric, or a combination thereof, relating to a request or offering for transporting a person, a good, an article, a thing, or a combination thereof from a geographical location to another geographical location.

Conveyance data relating to a representative, a conveyance service request, a real time or near real time geographical location of a representative, or a combination thereof, can be sourced from an external server, a central server, or an application. Conveyance data relating to a representative, a conveyance service request, a real time or near real time geographical location of a representative, or a combination thereof, can be sourced or provided by a service provider, a good supplier, an AV owner/controller, a fleet manager, a logistics provider, a logistics supplier, a map provider, a third party, or a representative.

Conveyance data relating to a conveyance client, a conveyance service offering, a real time or near real time geographical location of a conveyance client, or a combination thereof, can be sourced or provided from an external server, a central server, or an application. Conveyance data relating to a conveyance client, a conveyance service offering, a real time or near real time geographical location of a conveyance client, or a combination thereof, can be sourced or provided by a service provider, a good supplier, an AV owner/controller, a fleet manager, a logistics provider, a logistics supplier, a map provider, a third party, or a conveyance client.

Conveyance data relating to a representative, a conveyance service request, a real time or near real time geographical location of a representative, or a combination thereof, can be generated by an external server, a central server, or an application. Conveyance data relating to a representative, a conveyance service request, a real time or near real time geographical location of a representative, or a combination thereof, can be generated by a service provider, a good supplier, an AV owner/controller, a fleet manager, a logistics provider, a logistics supplier, a map provider, a third party, or a representative.

Conveyance data relating to a conveyance client, a conveyance service offering, a real time or near real time geographical location of a conveyance client, or a combination thereof, can be generated by an external server, a central server, or an application. Conveyance data relating to a conveyance client, a conveyance service offering, a real time or near real time geographical location of a conveyance client, or a combination thereof, can be generated by a service provider, a good supplier, an AV owner/controller, a fleet manager, a logistics provider, a logistics supplier, a map provider, a third party, or a conveyance client.

Conveyance data can be sourced, provided, or generated by a technology, a software, a hardware, or a combination thereof, relating to a representative or a conveyance client. All or some of conveyance data relating to a conveyance service request or a conveyance service offering can be used by a service provider, a good supplier, a fleet manager, an AV owner/controller, a logistics provider, a logistics supplier, a map provider, a third party, a conveyance client, a representative, or a combination thereof, to evaluate and then secure a preferred conveyance service request or a preferred conveyance service offering.

Conveyance data can be any data or information corresponding to a conveyance service request, a filtered conveyance service request, a preferred conveyance service request, or a combination thereof, that can be transmitted between an external server, a central server, an application, a terminal, or a combination thereof, by way of a link. Conveyance data can be any data or information corresponding to a conveyance service offering, a filtered conveyance service offering, a preferred conveyance service offering, or a combination thereof, that can be transmitted between an external server, a central server, an application, a terminal, or a combination thereof, by way of a link. Conveyance data can be, used by a representative, a conveyance client, or a combination thereof, to evaluate and then secure a conveyance service.

Conveyance data can be transmitted from an external server to a central server, an application, an external server, or a combination thereof. Conveyance data retrieved from an external server can be cached on a central server, an application, an external server, or a combination thereof, to provide enhanced performance and better avoid a relevant limitation one or more of a central server limitation, an external server limitation, a service provider limitation, a link limitation, and any involved service provider limitation.

Conveyance data can be stored or cached in a database. Conveyance data can be stored or cached in a database table. Conveyance data can be updated or refreshed in real time or near real time and can refer to being updated or refreshed in the highest level of development or state of the art. Conveyance data can correspond to a preferred conveyance service request, a filtered conveyance service request, a conveyance service request, or a combination thereof, relating to a service provider, a good supplier, an AV owner/controller, a fleet manager, a logistics provider, a logistics supplier, a map provider, a third party, a conveyance client, a representative, or a combination thereof. Conveyance data can correspond to a preferred conveyance service offering, a filtered conveyance service offering, a conveyance service offering, or a combination thereof, relating to a service provider, a good supplier, an AV owner/controller, a fleet manager, a logistics provider, a logistics supplier, a map provider, a third party, a conveyance client, a representative, or a combination thereof.

All or some of conveyance data can be any data or information relating to a conveyance service request, a filtered conveyance service request, a preferred conveyance service request, or a combination thereof, that can be used to filter a conveyance service request into a filtered conveyance service request. All or some of conveyance data can be any data or information relating to a conveyance service offering, a filtered conveyance service offering, a preferred conveyance service offering, or a combination thereof, that can be used to filter a conveyance service offering into a filtered conveyance service offering.

All or some of conveyance data can be any data or information relating to a conveyance service request, a filtered conveyance service request, a preferred conveyance service request, or a combination thereof, that can be used to identify a preferred conveyance service request from a filtered conveyance service request. All or some of conveyance data can be any data or information relating to a conveyance service offering, a filtered conveyance service offering, a preferred conveyance service offering, or a combination thereof, that can be used to identify a preferred conveyance service offering from a filtered conveyance service offering.

All or some of conveyance data can be any data or information relating to a conveyance service request, a filtered conveyance service request, a preferred conveyance service request, a conveyance service offering, a filtered conveyance service offering, a preferred conveyance service offering, or a combination thereof, can be stored, aggregated, standardized, filtered, or identified as preferred.

All or some of conveyance data can be any data or information relating to a conveyance service request, a filtered conveyance service request, a preferred conveyance service request, a conveyance service offering, a filtered conveyance service offering, a preferred conveyance service offering, or a combination thereof, can be pre-filtered or pre-categorized. All or some of conveyance data relating to a conveyance service request, a filtered conveyance service request, a preferred conveyance service request, a conveyance service offering, a filtered conveyance service offering, a preferred conveyance service offering, or a combination thereof, can be pre-filtered or pre-categorized based on all or some of a real time or near real time geographical location of a representative or a conveyance client, respectively.

Conveyance data can be used by a central server, an external server, an application, a representative, a conveyance client, or a combination thereof, to evaluate and then secure a preferred conveyance service request or a preferred conveyance service offering.

Conveyance data can be optimized to identify a preferred conveyance service request or a preferred conveyance service offering. Conveyance data can include optimization data that can come from an AV, an AV sensor, a sensor data, a third party provider, a mapping provider, a remote server, an external server, a service provider, a conveyance client, or a representative. Conveyance data can include demographic data relating to a geographical area, a conveyance service request, a conveyance service offering, all or some of conveyance data, all or some of conveyance data relating to an AV, a conveyance client, a representative, an AV owner/controller, a service provider, a good supplier, a fleet manager, a logistics provider, a logistics supplier, a map provider, or a third party.

Conveyance data can include a statistical variable of a filtered conveyance service request or a filtered conveyance service offering. Conveyance data can include a statistical variable of a preferred conveyance service request or a preferred conveyance service offering.

All or some of conveyance data can be communicated with an application, a terminal, a central server, an external server, a link, or a combination thereof, that can be combined or integrated. Conveyance data can include a vehicle detail or an AV detail, which can be used to identify a preferred vehicle type, a preferred vehicle service, or a combination thereof. Conveyance data relating to a conveyance service offering or a conveyance service request can be sourced or provided by an external server relating to an AV owner/controller, a service provider, a good supplier, a fleet manager, a logistics provider, a logistics supplier, a map provider, or a third party. All or some of conveyance data can be related to a scooter, a scooter service, a bicycle, or a bicycle service.

Conveyance data can be generated or provided from a central server, an application, an external server, a terminal, or a combination thereof. Conveyance data relating to a statistical variable can be used to compile a heat map. Conveyance data relating to a statistical variable can comprise a measurement of an of conveyance service availability, pricing, elevated pricing, conveyance service request density, filtered conveyance service request density, preferred conveyance service request density, conveyance service offering density, filtered conveyance service offering density, preferred conveyance service offering density, level of service density, a conveyance service distance, an estimated time of arrival, preferred conveyance client density, preferred good supplier density, a preferred conveyance industry segment, conveyance industry segment density, representative density, conveyance client density, service provider density, good supplier density, or a combination thereof.

All or some of conveyance data relating to a conveyance service offering or a conveyance service request, can include optimization data that can be provided by a third party map provider to be utilized with route planning and identifying a preferred conveyance service offering or a preferred conveyance service request. Conveyance data can relate to a battery level of a device or a terminal belonging to a conveyance client. Conveyance data can include milestones, awards, incentives, number of rides completed, monetary earnings, financial information, or scheduling information.

A sensor data relating to an AV can be communicated to another AV, a service provider, a good supplier, an AV owner/controller, a fleet manager, a logistics provider, a logistics supplier, a map provider, a third party, a conveyance client, a representative, or a combination thereof. A sensor data can be used to communicate a status of an AV. A real time or near real time geographical location of an AV can be based on or related to a sensor data. Conveyance data relating to an AV such as a real time or near real time geographical location of an AV can be provided by an external server. All or some of conveyance data provided by an AV can be sourced from a various type of input such as a sensor, a transceiver, a receiver, an interface, an application, or a terminal.

Conveyance Service Request: The following are illustrative, non-limiting examples of a "conveyance service request" as used in the present disclosure A conveyance service request can be a request from a conveyance client or an entity for the transportation of one or more of a person, a good, an article, a thing, or a combination thereof from a geographical location to another geographical location. Once a beginning service geographical location, an ending service geographical location, or a combination thereof, is inputted or provided into an application, a central server or an external server, a conveyance service request relating to a conveyance client can be generated. When a conveyance service request is considered, a conveyance service request can also be considered.

A conveyance service request can be sourced or provided from one or more of an external server, a service provider, a good supplier, a fleet manager, a map provider, or a third party. A conveyance service request can be stored or cached in a computer readable memory and/or a database of a central server. A conveyance service request can relate to a conveyance industry segment. A conveyance service request can relate to a service provider, a good supplier, a fleet manager, an AV owner/controller, a logistics provider, a logistics supplier, a map provider, a third party, a representative, a conveyance client, or a combination thereof.

All or some of a conveyance service request can have or be associated with corresponding conveyance data. All or some of a conveyance service request can have or be associated with intrinsic conveyance data that can be stored in a database. All or some of a conveyance service request can be associated with or inherently have associated conveyance data that can be used to filter and identify a preferred conveyance service request to be secured.

A conveyance service request can be updated or refreshed in real time or near real time and can refer to being updated or refreshed in the highest level of development or state of the art. A conveyance service request can be pre-filtered or pre-categorized on a central server, an external server, an application, or a combination thereof. A conveyance service request can be a filtered conveyance service request, a preferred conveyance service request, or a combination thereof, relating to a representative preference. A conveyance service request can become a filtered conveyance service request, a preferred conveyance service request, or a combination thereof, based on a representative preference inputted or provided by a representative, a service provider, a good supplier, a fleet manager, a logistics provider, a logistics supplier, a map provider, or a third party. A conveyance service request can be filtered once or more than once.

A conveyance service request can be a ride-hail service request, a ride-share service request, a car-share service request, a peer-to-peer conveyance service request, a transportation service request, a scooter service request, a bicycle service request, a person delivery service request, a taxi service request, a shuttle service request, a good delivery service request, an item delivery service request, a medical service and delivery request, a food delivery service request, a courier delivery service request, a freight delivery service request, an animal delivery service request, a delivery service request, or a combination thereof.

A conveyance service request can be perceived or referred to as a filtered conveyance service request or a preferred conveyance service request. A conveyance service request can be identified or referred to as a filtered conveyance service request or a preferred conveyance service request for or with a representative, a service provider, a good supplier, a fleet manager, a logistics provider, a logistics supplier, a map provider, a third party, or a combination thereof. A conveyance service request can include a waypoint. A conveyance service request can include a waypoint where a conveyance client can walk to a designated area to be picked up for a conveyance service. If a conveyance service request is secured, that same secured conveyance service request can be referred to or identified as a preferred conveyance service request.

A conveyance service request can be pre-scheduled. A thing to be conveyed can include a personal item such as keys or documents. A conveyance service request can include special request information. A conveyance service request can be stored or cached in a computer readable memory and/or a database of an application. A conveyance service request can relate to an individual conveyance industry segment. A conveyance service request can relate to an individual service provider, an individual map provider, an individual third party, an individual good supplier, or an individual fleet manager. A conveyance service request can be a pre-filtered conveyance service request. A plurality of conveyance service requests can be a single conveyance service request. A conveyance service request can be pre-filtered or pre-categorized on a central server based on a geographical location.

Filtered Conveyance Service Request: The following are illustrative, non-limiting examples of a "filtered conveyance service request" as used in the present disclosure.

A filtered conveyance service request can be a conveyance service request that can be filtered with including a representative preference, a real time or near real time geographical location of a representative, or a combination thereof. When a filtered conveyance service request is considered, a filtered conveyance service request can also be considered.

A filtered conveyance service request can be stored or cached in a computer readable memory and/or a database of a central server. When a representative preference is updated, modified, added, removed, and/or refreshed, a new set of a filtered conveyance service request can be generated. A filtered conveyance service request can relate to a conveyance industry segment. A filtered conveyance service request can relate to a service provider, a good supplier, a fleet manager, an AV owner/controller, a logistics provider, a logistics supplier, a map provider, a third party, a representative, a conveyance client, or a combination thereof.

All or some of a filtered conveyance service request can have or be associated with corresponding conveyance data. All or some of a filtered conveyance service request can have or be associated with intrinsic conveyance data that can be stored in a database. All or some of a filtered conveyance service request can be associated with or inherently have associated conveyance data that can be used to identify a preferred conveyance service request to be secured.

A filtered conveyance service request can be updated or refreshed in real time or near real time and can refer to being updated or refreshed in the highest level of development or state of the art. A filtered conveyance service request can be pre-filtered or pre-categorized on a central server, an external server, an application, or a combination thereof. A filtered conveyance service request can be filtered more than once. A filtered conveyance service request can be a conveyance service request that matches or satisfies a representative preference. A filtered conveyance service request can become a preferred conveyance service request based on a representative preference inputted or provided by a representative, a service provider, a good supplier, a fleet manager, a logistics provider, a logistics supplier, a map provider, or a third party.

A filtered conveyance service request can be displayed on an application. A filtered conveyance service request can be displayed on a geographical map of a visual representation. A filtered conveyance service request can relate to an individual conveyance industry segment. A filtered conveyance service request can relate to an individual service provider, an individual map provider, an individual third party, an individual good supplier, or an individual fleet manager. If a representative secures a filtered conveyance service request, that same a secured filtered conveyance service request can be referred to or identified as a preferred conveyance service request. A filtered conveyance service request can be a pre-filtered conveyance service request. A filtered conveyance service request can be perceived or referred to as a conveyance service request. A plurality of filtered conveyance service requests can be a single filtered conveyance service request. A filtered conveyance service request can be related to a scooter, a scooter service, a bicycle, or a bicycle service.

Preferred Conveyance Service Request: The following are illustrative, non-limiting examples of a "preferred conveyance service request" as used in the present disclosure.

A preferred conveyance service request can be a request for transporting one or more of a person, a good, a thing, an article, or a combination thereof, from a geographical location to another geographical location that can be identified from a filtered conveyance service request. A preferred conveyance service request can be request that a central server, a representative, an application, a good supplier, a fleet manager, a logistics provider, a logistics supplier, a map provider, a third party, or a combination thereof, identifies as preferred. When a preferred conveyance service request is considered, a preferred conveyance service request can also be considered.

A preferred conveyance service request can be stored or cached in a computer readable memory and/or a database of a central server. A preferred conveyance service request can be originally sourced or provided by an external server, a service provider, a good supplier, a fleet manager, a map provider, or a third party. A preferred conveyance service request can be a conveyance service request or a filtered conveyance service request that matches or satisfies a representative preference. A filtered conveyance service request can be identified as preferred by a representative, an application, an AV owner/controller, an AV, a service provider, a good supplier, a fleet manager, a logistics provider, a logistics supplier, a map provider, a third party, or a combination thereof, and then a filtered conveyance service request can become a preferred conveyance service request.

A preferred conveyance service request can be updated or changed in real time or near real time as a real time or near real time geographical location of a representative changes or updates. A preferred conveyance service request can relate to a conveyance industry segment. A preferred conveyance service request can relate to a service provider, a good supplier, a fleet manager, a logistics provider, a logistics supplier, a map provider, a third party, or a combination thereof. A preferred conveyance service request can be updated or refreshed in real time or near real time and can refer to being updated or refreshed in the highest level of development or state of the art. A preferred conveyance service request can be identified as preferred with the highest weighted average of a representative preference. When a representative preference is updated, modified, added, removed, and/or refreshed, a new set of a preferred conveyance service request can be generated or identified.

A conveyance service request can be filtered in real time or near real time by using a representative preference to create a set of a filtered conveyance service request. A filtered conveyance service request can be sorted in real time or near real time relating to a weighted average of a representative preference to identify a preferred conveyance service request.

A preferred conveyance service request can be updated in real time or near real time as traffic information changes or updates. A different geographical location can be used other than a real time or near real time geographical location of a representative, when filtering a conveyance service request, to identify a preferred conveyance service request. An application can secure a preferred conveyance service request. A preferred conveyance service request can relate to an individual service provider, an individual map provider, an individual third party, an individual good supplier, or an individual fleet manager.

A preferred conveyance service request can be visually identifiable from a filtered conveyance service request displayed on a visual representation. A preferred conveyance service request can be displayed on a geographical map of a visual representation. A preferred conveyance service request can be displayed on an application. A preferred conveyance service request can relate to an individual conveyance industry segment. A central server, an application, a representative, or a combination thereof, can secure a preferred conveyance service request for or with a representative. A preferred conveyance service request can be pre-filtered or pre-categorized on a central server, an external server, an application, or a combination thereof.

A preferred conveyance service request can be identified from a filtered conveyance service request that has the highest weighted average of a representative preference. A representative preference can have an equal weight or an unequal weight when using a weighted average to identify a preferred conveyance service request. A preferred conveyance service request can be perceived or referred to as a conveyance service request or a filtered conveyance service request. More than one preferred conveyance service request can be secured concurrently. A preferred conveyance service request can be related to a scooter, a scooter service, a bicycle, or a bicycle service.

Conveyance Service Offering: The following are illustrative, non-limiting examples of a "conveyance service offering" as used in the present disclosure.

A conveyance service offering can be an offering from a representative, an AV, a service provider for the transportation of one or more of a person, a good, an article, a thing, or a combination thereof, from a geographical location to another geographical location. Once a beginning service geographical location, an ending service geographical location, pricing information, or a combination thereof, is known, a conveyance service offering relating to a representative or an AV can be generated. When a conveyance service offering is considered, a conveyance service offering can also be considered.

A conveyance service offering can be sourced or provided from one or more of an external server, a service provider, a good supplier, a fleet manager, a map provider, or a third party. A conveyance service offering can be stored or cached in a computer readable memory and/or a database of a central server. A conveyance service offering can relate to a conveyance industry segment. A conveyance service offering can relate to a service provider, a good supplier, a fleet manager, an AV owner/controller, a logistics provider, a logistics supplier, a map provider, a third party, a representative, a conveyance client, or a combination thereof.

All or some of a conveyance service offering can have or be associated with corresponding conveyance data. All or some of a conveyance service offering can have or be associated with intrinsic conveyance data that can be stored in a database. All or some of a conveyance service offering can be associated with or inherently have associated conveyance data that can be used to filter and identify a preferred conveyance service offering to be secured.

A conveyance service offering can be updated or refreshed in real time or near real time and can refer to being updated or refreshed in the highest level of development or state of the art. A conveyance service offering can be pre-filtered or pre-categorized on a central server, an external server, an application, or a combination thereof. A conveyance service offering can be a filtered conveyance service offering, a preferred conveyance service offering, or a combination thereof, relating to a conveyance client preference. A conveyance service offering can become a filtered conveyance service offering, a preferred conveyance service offering, or a combination thereof, based on a conveyance client preference inputted or provided by a conveyance client. A conveyance service offering can be filtered once or more than once.

A conveyance service offering can be a ride-hail service offering, a ride-share service offering, a car-share service offering, a peer-to-peer conveyance service offering, a transportation service offering, a scooter service offering, a bicycle offering, a person delivery service offering, a taxi service offering, a shuttle service offering, a good delivery service offering, an item delivery service offering, a medical service and delivery offering, a food delivery service offering, a courier delivery service offering, a freight delivery service offering, an animal delivery service offering, a delivery service offering, or a combination thereof.

A conveyance service offering can be perceived or referred to as a filtered conveyance service offering or a preferred conveyance service offering. A conveyance service offering can be identified or referred to as a filtered conveyance service offering or a preferred conveyance service offering for or with a conveyance client. A conveyance service offering can include a waypoint. A conveyance service offering can include a waypoint where a conveyance client can walk to a designated area to be picked up for a conveyance service. If a conveyance service offering is secured, that same a secured conveyance service offering can be referred to or identified as a preferred conveyance service offering.

A conveyance service offering can be pre-scheduled. A thing to be conveyed can include a personal item such as a clothing item or a purse. A conveyance service offering can include special offering information. A conveyance service offering can relate to an individual conveyance industry segment. A conveyance service offering can relate to an individual service provider, an individual map provider, an individual third party, an individual good supplier, or an individual fleet manager. A conveyance service offering can be a pre-filtered conveyance service offering. A plurality of conveyance service offerings can be a single conveyance service offering. A conveyance service offering can be pre-filtered or pre-categorized on a central server based on a geographical location.

Filtered Conveyance Service Offering: The following are illustrative, non-limiting examples of a "filtered conveyance service offering" as used in the present disclosure.

A filtered conveyance service offering can be a conveyance service offering that can be filtered with including a conveyance client preference, a real time or near real time geographical location of a conveyance client, or a combination thereof. When a filtered conveyance service offering is considered, a filtered conveyance service offering can also be considered.

A filtered conveyance service offering can be stored or cached in a computer readable memory and/or a database of a central server. When a conveyance client preference is updated, modified, added, removed, and/or refreshed, a new set of a filtered conveyance service offering can be generated. A filtered conveyance service offering can relate to a conveyance industry segment. A filtered conveyance service offering can relate to a service provider, a good supplier, a fleet manager, an AV owner/controller, a logistics provider, a logistics supplier, a map provider, a third party, a representative, a conveyance client, or a combination thereof.

All or some of a filtered conveyance service offering can have or be associated with corresponding conveyance data. All or some of a filtered conveyance service offering can have or be associated with intrinsic conveyance data that can be stored in a database. All or some of a filtered conveyance service offering can be associated with or inherently have associated conveyance data that can be used to identify a preferred conveyance service offering to be secured.

A filtered conveyance service offering can be updated or refreshed in real time or near real time and can refer to being updated or refreshed in the highest level of development or state of the art. A filtered conveyance service offering can be pre-filtered or pre-categorized on a central server, an external server, an application, or a combination thereof. A filtered conveyance service offering can be filtered more than once. A filtered conveyance service offering can be a conveyance service offering that matches or satisfies a conveyance client preference. A filtered conveyance service offering can become a preferred conveyance service offering based on a conveyance client preference inputted or provided by a conveyance client.

A filtered conveyance service offering can be displayed on an application. A filtered conveyance service offering can be displayed on a geographical map of a visual representation. A filtered conveyance service offering can relate to an individual conveyance industry segment. A filtered conveyance service offering can relate to an individual service provider, an individual map provider, an individual third party, an individual good supplier, or an individual fleet manager. If a conveyance client secures a filtered conveyance service offering, that same a secured filtered conveyance service offering can be referred to or identified as a preferred conveyance service offering. A filtered conveyance service offering can be a pre-filtered conveyance service offering. A filtered conveyance service offering can be perceived or referred to as a conveyance service offering. A plurality of filtered conveyance service offerings can be a single filtered conveyance service offering. A filtered conveyance service offering can be related to a scooter, a scooter service, a bicycle, or a bicycle service.

Preferred Conveyance Service Offering: The following are illustrative, non-limiting examples of a "preferred conveyance service offering" as used in the present disclosure.

A preferred conveyance service offering can be an offering for transporting one or more of a person, a good, a thing, an article, or a combination thereof, from a geographical location to another geographical location that can be identified from a filtered conveyance service offering. A preferred conveyance service offering can be an offering that including a conveyance client, a central server, an application, a good supplier, a fleet manager, a logistics provider, a logistics supplier, a map provider, a third party, or a combination thereof, identifies as preferred. When a preferred conveyance service offering is considered, a preferred conveyance service offering can also be considered.

A preferred conveyance service offering can be stored or cached in a computer readable memory and/or a database of a central server. A preferred conveyance service offering can be originally sourced or provided by an external server, a service provider, a good supplier, a fleet manager, a map provider, or a third party. A preferred conveyance service offering can be a conveyance service offering or a filtered conveyance service offering that can match or satisfy a conveyance client preference. A filtered conveyance service offering can be identified as preferred by a conveyance client, a service provider, a good supplier, a fleet manager, a logistics provider, a logistics supplier, a map provider, a third party, or a combination thereof, and then a filtered conveyance service offering can become a preferred conveyance service offering.

A preferred conveyance service offering can be updated or changed in real time or near real time as a real time or near real time geographical location of a conveyance client changes or updates. A preferred conveyance service offering can relate to a conveyance industry segment. A preferred conveyance service offering can relate to a service provider, a good supplier, a fleet manager, a logistics provider, a logistics supplier, a map provider, a third party, or a combination thereof. A preferred conveyance service offering can be updated or refreshed in real time or near real time and can refer to being updated or refreshed in the highest level of development or state of the art. A preferred conveyance service offering can be identified as preferred with the highest weighted average of a conveyance client preference. When a conveyance client preference is updated, modified, added, removed, and/or refreshed, a new set of a preferred conveyance service offering can be generated or identified.

A conveyance service offering can be filtered in real time or near real time by using to a conveyance client preference to create a set of a filtered conveyance service offering. A filtered conveyance service offering can be sorted in real time or near real time relating to a weighted average of a conveyance client preference to identify a preferred conveyance service offering.

A preferred conveyance service offering can be updated in real time or near real time as traffic information changes or updates. A different geographical location can be used other than a real time or near real time geographical location of a conveyance client, when filtering a conveyance service offering, to identify a preferred conveyance service offering. An application can secure a preferred conveyance service offering. A preferred conveyance service offering can be visually identifiable from a filtered conveyance service offering displayed on a visual representation. A preferred conveyance service offering can relate to an individual conveyance industry segment. A preferred conveyance service offering can relate to an individual service provider, an individual map provider, an individual third party, an individual good supplier, or an individual fleet manager.

A preferred conveyance service offering can be identified from a filtered conveyance service offering that has the highest weighted average of a conveyance client preference. A conveyance client preference can have an equal weight or an unequal weight when using a weighted average to identify a preferred conveyance service offering. A preferred conveyance service offering can be perceived or referred to as a conveyance service offering or a filtered conveyance service offering. More than one representative or more than one AV can be secured for an individual preferred conveyance service offering.

A preferred conveyance service offering can be displayed on a geographical map of a visual representation. A preferred conveyance service offering can be displayed on an application. A central server, an application, a conveyance client, or a combination thereof, can secure a preferred conveyance service offering for or with a conveyance client. A preferred conveyance service offering can be pre-filtered or pre-categorized on a central server, an external server, an application, or a combination thereof.

A level of service preference can be used by a conveyance client to identify a luxury vehicle, an environmentally friendly vehicle, or a driverless vehicle. A level of service preference can be utilized to identify a newer vehicle over an older vehicle. A preferred conveyance service offering can be related to a scooter, a scooter service, a bicycle, or a bicycle service.

Representative Preference: The following are illustrative, non-limiting examples of a "representative preference" as used in the present disclosure A representative preference can be a rule or a parameter that can be used to facilitate an operation or a function to secure a preferred conveyance service request. A representative preference can be a rule or a parameter that can be utilized or operated by a representative, a service provider, a good supplier, a fleet manager, a logistics provider, a logistics supplier, a map provider, a third party, or a combination thereof. A representative preference can be any rule or parameter that can be used or utilized during a process of filtering and/or identifying a preferred conveyance service request.

A representative preference can be a rule or a parameter that can optimize all or some of conveyance data, a conveyance service request, or a combination thereof. A representative preference can relate directly or indirectly to a preferred conveyance service request. A representative preference can be associated with or have a feature or a various feature that can be used to match a representative for or with a preferred conveyance service request, a conveyance client, or a combination thereof. A representative preference can be a rule implemented in a rules-based system, a rules-based method, or a combination thereof.

A representative preference can be used by a representative, a good supplier, a fleet manager, a logistics provider, a logistics supplier, a map provider, a third party, or a combination thereof, to identify and secure a preferred conveyance service request for or with a representative. A representative preference or a set of a representative preference can be used to filter, identify as preferred, secure, or a combination thereof, a preferred conveyance service request.

A representative preference can be refined or customized by a representative, a service provider, a good supplier, a fleet manager, a logistics provider, a logistics supplier, a map provider, a third party, or a combination thereof. A representative preference can be fixed or built-in on a central server, an external server, an application, or a combination thereof. A representative preference can be made non-editable. A representative preference can be a digit or a number.

A representative preference can be a tool, a rule or a parameter to filter, identify, secure or obtain, or a combination thereof, a preferred conveyance service request, a filtered conveyance service request, a conveyance service request, or a combination thereof.

A representative preference can be used to match or satisfy a preferred conveyance service request, a filtered conveyance service request, a conveyance service request, or a combination thereof, with or for a representative. A representative preference can be used to match or satisfy a representative for or with a preferred conveyance service request, a filtered conveyance service request, a conveyance service request, or a combination thereof. A representative preference can be utilized by a representative, a service provider, a good supplier, an AV owner/controller, a fleet manager, a logistics provider, a logistics supplier, a map provider, a third party, or a combination thereof, to identify and secure a preferred conveyance service request.

A representative preference can include an option selected or provided by a representative, a good supplier, a fleet manager, a logistics provider, a logistics supplier, a map provider, a third party, or a combination thereof, to filter and/or sort a conveyance service request in real time or near real time in order to identify a preferred conveyance service request. A representative preference can be used to filter and identify a preferred conveyance service request and then filter and identify a representative that can be identified as preferred, all or some of conveyance data relating to a representative, or a combination thereof, and be secured together. A representative preference can have or be associated with a set of preferences or a set of parameters that can be used to filter and identify a preferred conveyance service request, a filtered conveyance service request, a conveyance service request, or a combination thereof.

A representative preference can be used to filter a conveyance service request in any order prior to securing a match between a preferred conveyance service request and a representative. A representative preference can be used to identify a preferred conveyance service request in any order prior to securing a match between a preferred conveyance service request and a representative.

A representative preference can be pre-set on one or more of a central server, an external server, an application, a terminal or a combination thereof. A representative preference can be either inclusive or exclusive for filtering a conveyance service request. An individual representative preference can have an equal weight or an unequal weight when calculating a weighted average to identify a preferred conveyance service request. A filtered conveyance service request can be sorted in real time or near real time in an order relating to a weighted average of a representative preference to identify a preferred conveyance service request.

A representative, a good supplier, a fleet manager, a logistics provider, a logistics supplier, a map provider, a third party, or a combination thereof, can optionally choose a weight for a representative preference to have an equal weight or an unequal weight. A representative, a good supplier, a fleet manager, a logistics provider, a logistics supplier, a map provider, a third party, or a combination thereof, can optionally choose a weight for a representative preference to filter, identify, secure or obtain, or a combination thereof, a preferred conveyance service request.

A representative preference can be used to filter a conveyance service request into a filtered conveyance service request. A representative preference can be used to identify a preferred conveyance service request from a filtered conveyance service request. A representative preference can be used to filter all or some of conveyance data relating to a representative.

A representative preference can be stored or cached on one or more of a central server, an application, an external server, a terminal, or a combination thereof. A representative preference can be stored or cached on or transmitted to a central server, an external server, a terminal, an application, or a combination thereof. A representative preference can be stored on or retrieved from a server that can be remote from a central server, an external server, an application, or a combination. A representative preference can be stored or cached in a database. A representative preference can be used in a database to filter and identify a preferred conveyance service request, a filtered conveyance service request, a conveyance service request, or a combination thereof.

A representative, an AV owner/controller, a service provider, a good supplier, a fleet manager, a logistics provider, a logistics supplier, a map provider, a third party, or a combination thereof, can use a representative preference to filter and identify a preferred conveyance service request, a filtered conveyance service request, a conveyance service request, or a combination thereof.

A representative can input or provide a representative preference into an application, a central server, an external server, or a combination thereof, that can be used to identify and secure a preferred conveyance service request. A representative, an AV owner/controller, a service provider, a good supplier, a fleet manager, a logistics provider, a logistics supplier, a map provider, a third party, or a combination thereof, can input or provide a representative preference into an application, a central server, or an external server that can be used to identify and secure a preferred conveyance service request for or with a representative.

A representative, an AV owner/controller, a service provider, a good supplier, a fleet manager, a logistics provider, a logistics supplier, a map provider, a third party, or a combination thereof, can use a representative preference to manage, control, or operate an at least one AV, a representative, or a combination thereof.

A representative preference can be updated or refreshed in real time or near real time and can refer to being updated or refreshed in the highest level of development or state of the art. A representative preference can be used to perform a function in real time or near real time being updated or refreshed in the highest level of development or state of the art. A representative preference can be updated or changed and a new or different set of filtered conveyance service request(s), preferred conveyance service request(s), or a combination thereof, can be identified.

A central server, an application, an external server, or a combination thereof, can filter out, hide, or remove a conveyance service request that does not meet or match the representative preference criteria for a representative. A representative preference can be used in conjunction with a real time or near real time geographical location of a representative or a different geographical location to filter a conveyance service request into a filtered conveyance service request.

A representative preference can be used to identify a preferred conveyance service request from a filtered conveyance service request or a pre-filtered conveyance service request. A representative preference can be used by a representative, a service provider, a good supplier, an AV owner/controller, a fleet manager, a logistics provider, a logistics supplier, a map provider, a third party, or a combination thereof.

A representative preference can be a rule or a parameter that can utilize a route planning information. A representative preference can be learned over time relating to a conveyance service request, all or some of conveyance data, a conveyance client, a representative, an AV, an AV owner/controller, a service provider, a good supplier, a fleet manager, a logistics provider, a logistics supplier, a map provider, a third party, or a combination thereof. A representative preference can be a predictive preference that can utilize machine learning technology and/or quantum computing.

A level of service preference can be used to identify, for example, a vehicle type, a service type, a vehicle detail, or an AV detail. A representative preference can have or relate to a cultural trait of a regional area or a country. A representative preference can be a capacity preference that can be utilized to manage or monitor a capacity level relating to a vehicle, an AV, a representative, an AV owner/controller, a service provider, a good supplier, a fleet manager, a logistics provider, a logistics supplier, a map provider, a third party, or a combination thereof.

A representative preference can be one or more preferences selected from or relating to pricing, elevated pricing, geographical location, distance, route, service duration, beginning service geographical location, ending service geographical location, time, predictive, historical, efficiency, sensor(s), event (inclusion or exclusion), traffic-based, road condition, weather condition, transportation, route planning, fuel economy, battery longevity, vehicle capacity, vehicle diagnostic, conveyance data, duration of conveyance service, conveyance service request density, conveyance client density, conveyance client detail, conveyance client rating, representative density, AV density, service provider (inclusion or exclusion), service provider density, level of service, good supplier, good supplier density, AV owner/controller, AV owner/controller density, fleet manager, fleet manager density, logistics provider, logistics provider density, logistics supplier, logistics supplier density, good detail, conveyance industry segment, freight, waypoint, delivery service, oldest outstanding request, oldest outstanding offering, or a combination thereof.

If an efficiency preference is selected, a representative can accept an additional food delivery service request for the same restaurant to perform an additional conveyance service and earn more money. If a price preference is selected, then a conveyance service request priced higher than a set minimum price can be identified as a preferred conveyance service request. If a distance preference is selected, then a conveyance service request within a selected distance can be identified as a preferred conveyance service request. A good detail preference can include an item being fragile. If a good detail preference is selected, then a conveyance service request for conveying a certain type and/or quantity of a good that a representative is capable of delivering can be identified as a preferred conveyance service request, such as the capability to deliver a refrigerator or a mirror. If a freight preference is selected, then a conveyance service request for conveying freight that a representative is capable of delivering can be identified as a preferred conveyance service request, such as a conveyance service request to deliver a biohazardous material or a flammable material.

A representative preference can be transmitted between or from an application to an external server by way of a link between an application and an external server.

A representative preference can be associated with a database, a database query, a database table, or a database result set. A database query can include or be associated with a representative preference. A representative preference can be related to or associated with another a representative preference. A representative preference can be used to retrieve data from database. A representative preference can be an internal part of a central server. A representative preference can be in a form or a format relating to a SQL parameter, or a variable. Multiple representative preferences can be used multiple times during a process of filtering and/or identifying a preferred conveyance service request for or with a representative. A representative preference can be used with or within a conditional statement, a conditional expression, or a conditional construct. A representative preference can be used for altering a control flow based on a condition.

A representative preference can have or be associated with a different set of preferences or a different set of parameters that can be used to filter and identify a preferred conveyance service request, a filtered conveyance service request, a conveyance service request, or a combination thereof. Some representative preferences can be more relevant than other representative preferences when a central server filters and/or identifies a preferred conveyance service request, a filtered conveyance service request, a conveyance service request, or a combination thereof. A representative preference can be used for filtering a conveyance service request in a food delivery industry segment and a different representative preference can be used for filtering a conveyance service request in a ride-hail industry segment.

Anytime a conveyance service request is going through a process to become filtered or identified as preferred, all or some of conveyance data relating to a representative can go through a same or a similar process. A representative preference can use a sensor data to evaluate and secure a preferred conveyance service request with or for a representative. A representative preference can use a sensor data to identify if an AV has enough battery to perform a conveyance service.

A transportation preference can be a parameter or a rule that can identify a conveyance service preference. A transportation preference can identify a conveyance service request that requires handicap assistance. A transportation preference can identify a conveyance service request that requires a luxury vehicle. An efficiency preference can be a parameter or a rule that can optimize vehicle utilization. A representative preference can be stored or cached in a database table. A representative preference can be stored or cached in a database that a central server, an external server, an application, or a combination thereof, can connect to or be associated with.

A predictive preference can be identified or learned over time based on a pattern relating to a conveyance service request, all or some of conveyance data relating to a representative, a conveyance client, a representative, an AV, an AV owner/controller, a service provider, a good supplier, a fleet manager, a logistics provider, a logistics supplier, a map provider, a third party, or a combination thereof.

A time preference can relate to a time range, a pick-up time, a drop-off time, a pre-scheduled time, during a time of a day, time of a week, a time of a month, a time of a year, or a combination thereof. A conveyance client detail preference can be a route preference provided by a conveyance client, an application, a central server, an external server, a third party, a map provider, or a combination thereof. A route planning preference can identify a route that can avoid toll roads. A route planning preference can identify an optimal navigational route that can aid in identifying a preferred conveyance service request.

A route preference can be utilized to identify a historical route, a specific route, a favored route, an area, a specific location, or pricing information. A route preference can be learned over time to avoid traffic congestion on Highway Interstate 5 around 5 PM during the week. A route preference can be to avoid a road, a street, a highway, or a neighborhood that a conveyance client or a recipient of a conveyance service prefers.

A level of service preference can be displayed as an icon or a visual with or on the visual representation to allow a selection of different levels of service that a representative, an AV, a service provider, or a good supplier can provide.

A level of service preference can be displayed on or with a visual representation to identify different levels of service that an AV owner/controller, a service provider, a good supplier, a fleet manager, a logistics provider, a logistics supplier, a map provider, a third party, a representative, an AV, or a conveyance client can provide or receive. A level of service preference can be displayed as an icon with or on a visual representation to allow a selection of different levels of service that a representative, an AV, a conveyance client, a service provider, a good supplier, a fleet manager, an AV owner/controller, a logistics provider, a logistics supplier, a map provider, or a third party can provide.

A level of service preference can be displayed on a dynamic map to identify different levels of service that a representative, an AV, a conveyance client, a service provider, a good supplier, a fleet manager, an AV owner/controller, a logistics provider, a logistics supplier, a map provider, or a third party can provide or receive. A representative, an AV, a conveyance client, a service provider, a good supplier, a fleet manager, an AV owner/controller, a logistics provider, a logistics supplier, a map provider, a third party, or a combination thereof, can be displayed on or with a dynamic map that can display a level of service preference and can be represented by a mobile or transitory icon.

An event inclusion preference can identify a destination rating with 4 out of 5 stars for or with a representative. An event inclusion preference can identify an event or an area that can be optimal for a representative, or a service provider that can be currently well positioned in or near that event or area, but it may not be optimal for other representatives or service providers further away from that event or area.

A representative preference can be a good supplier preference that can enable a good supplier to delay or postpone a current or a future conveyance service request. A conveyance client preference or a preference of a recipient of a conveyance service, can be compared to or with a representative preference, to identify a match and secure a preferred conveyance service request for or with a representative.

A representative preference can have or relate to a cultural trait that can impact a match between a representative and a preferred conveyance service request. A representative preference can have or relate to a cultural trait that can impact all or some of a conveyance service request. For example, Americans may prefer to have a representative preference with a shorter estimated time of arrival compared to Canadians.

A capacity preference can identify a maximum number of passengers or goods in a vehicle or an AV. A conveyance client can utilize a preference to specify if a conveyance client prefers an AV or a representative. A representative preference can be at least carpool preference. A representative preference can be used to identify a conveyance client or a group of a conveyance client that can be pooled together for a conveyance service to an ending service geographical location. A representative preference can relate to safety, for example, a vehicle being handicap friendly.

A delivery service preference can be to filter out deliveries that can add more than 10 minutes to total travel time. A delivery service preference can specify a dimension for a good or an item. A delivery service preference can be used to identify a representative or a vehicle with a specific feature relating to a good or item delivery. A delivery service preference can be used to identify a pre-scheduled conveyance service request or a pre-scheduled conveyance client.

A vehicle diagnostic preference can be to take a vehicle off the road or to not secure another conveyance service request if a vehicle is due for maintenance. A vehicle diagnostic preference can be to take a vehicle off the road or to not secure another conveyance service request if criteria regarding a vehicle is met. A vehicle diagnostic preference can be related to a sensor data on a vehicle or an AV.

A central server or an application can use or apply a second representative preference and a process can optionally be referred to or seen as an additional level of filtering. A central server or an application can filter conveyance service requests using a two-step process to first filter conveyance service requests based on a representative preference and then filter a subset of conveyance service requests based on a different representative preference.

A representative preference can be transmitted to or uploaded to an external server. A representative preference can be utilized for pre-filtering conveyance service requests on or at an external server, a central server, an application, or a combination thereof.

For example, when an individual representative preference has an unequal weight, a pricing preference can have 70% weight and a distance preference can have 30% weight which can be used to identify a preferred conveyance service request when determining which a filtered conveyance service request has the highest weighted average.

A representative preference can be used for an individual conveyance industry segment. A representative preference can be used for an individual service provider, or a map provider. A representative can specify a representative preference to work in a given area by using a geographical location preference. A representative can specify a representative preference to work in a six-mile perimeter by using a geographical location preference.

A representative preference, once inputted or provided into an application, can be stored or cached on an application, a computer readable memory of a central server, or a combination thereof, and a representative preference is not inputted or provided again into an application by a representative. A representative preference can be stored or cached in a computer readable memory of a central server and a representative preference is not transmitted again from an application to a central server. A representative preference, a real time or near real time geographical location of a representative, or a combination thereof, can be transmitted from an application to a central server at any time prior to filtering a conveyance service request.

A representative preference can be the same or similar to a conveyance client preference. A representative preference can be the same or have similar logic as a conveyance client preference.

Conveyance Client Preference: The following are illustrative, non-limiting examples of a "conveyance client preference" as used in the present disclosure A conveyance client preference is a rule or a parameter that is generally used to facilitate an operation or a function to secure a preferred conveyance service offering. A conveyance client preference can be a rule or a parameter that can be utilized or operated by a conveyance client, a service provider, a good supplier, a fleet manager, a logistics provider, a logistics supplier, a map provider, a third party, or a combination thereof. One or more conveyance client preferences can be any rule or parameter (or a set of rules or parameters) that is/are used during the process of filtering, identifying, matching and/or securing a filtered or preferred conveyance service offering.

A conveyance client preference can be used to optimize all or some of conveyance data, a conveyance service offering, or a combination thereof. A conveyance client preference can be one or more feature that is used to match a conveyance client with a preferred conveyance service offering, a representative, an AV, or a combination thereof. A conveyance client preference can be a rule implemented in a rules based system and/or method.

A conveyance client preference can be refined or customized by one or a combination of a conveyance client, a service provider, a good supplier, a fleet manager, a logistics provider, a logistics supplier, a map provider, a third party. A conveyance client preference can be fixed or built-in on a central server, an external server, an application, or a combination thereof. A conveyance client preference can be made non-editable. A conveyance client preference can be a digit or a number.

A conveyance client preference can be used to match or satisfy a preferred conveyance service offering, a filtered conveyance service offering, a conveyance service offering, or a combination thereof, with or for a conveyance client. A conveyance client preference can be used to match a conveyance client with a preferred conveyance service offering, a filtered conveyance service offering, a conveyance service offering, or a combination thereof. A conveyance client preference can be used by a conveyance client, a service provider, a good supplier, an AV owner/controller, a fleet manager, a logistics provider, a logistics supplier, a map provider, a third party, or a combination thereof, to identify and secure a preferred conveyance service offering.

A conveyance client preference can include an option selected or provided by a conveyance client, a good supplier, a fleet manager, a logistics provider, a logistics supplier, a map provider, a third party, or a combination thereof, to filter and/or sort a conveyance service offering in real time or near real time in order to identify a preferred conveyance service offering.

A conveyance client preference can be applied in any order to filter a conveyance service offering prior to securing a match between a preferred conveyance service offering and a conveyance client.

A conveyance client preference can be pre-set on one or more of a central server, an external server, an application, a terminal. A conveyance client preference can be either inclusive or exclusive. An individual conveyance client preference can have an equal weight or an unequal weight when calculating a weighted average to identify a preferred conveyance service offering. The weight for a given conveyance client preference can optionally be chosen and/or input by one or a combination of the conveyance client, a good supplier, a service provider, a fleet manager, a logistics provider, a logistics supplier, a map provider, and a third party. A filtered conveyance service offering can be sorted in substantially real time in an order according to a weighted average of the conveyance client preferences.

A conveyance client preference can be stored or cached on one or more of a central server, an application, an external server, a terminal, or a database within the network.

A conveyance client preference can be updated or refreshed in real time or near real time and can refer to being updated or refreshed in the highest level of development or state of the art. A conveyance client preference can be used to perform a function in real time or near real time being updated or refreshed in the highest level of development or state of the art. A conveyance client preference can be updated or changed and a new or different set of filtered conveyance service offering(s), preferred conveyance service offering(s), or a combination thereof, can be identified.

A central server, an application, an external server, or a combination thereof, can filter out, hide, or remove a conveyance service offering that does not meet or match conveyance client preference criteria for a conveyance client. A conveyance client preference can be used in conjunction with a real time or near real time geographical location of a conveyance client or a different geographical location to filter a conveyance service offering into a filtered conveyance service offering.

A conveyance client preference can be used to identify a preferred conveyance service offering from a filtered conveyance service offering or a pre-filtered conveyance service offering. A conveyance client preference can be used by a conveyance client, a service provider, a good supplier, an AV owner/controller, a fleet manager, a logistics provider, a logistics supplier, a map provider, a third party, or a combination thereof.

A conveyance client preference can be a rule or a parameter that can utilize a route planning information. A conveyance client preference can be learned over time relating to a conveyance service offering, all or some of conveyance data, a conveyance client, a representative, an AV, an AV owner/controller, a service provider, a good supplier, a fleet manager, a logistics provider, a logistics supplier, a map provider, a third party, or a combination thereof. A conveyance client preference can be a predictive preference that can utilize machine learning technology and/or quantum computing.

A level of service preference can be used to identify, for example, a vehicle type, a service type, a vehicle detail, or an AV detail. A conveyance client preference can have or relate to a cultural trait of a regional area or a country. A conveyance client preference can be a capacity preference that can be utilized to manage or monitor a capacity level relating to a vehicle, an AV, a conveyance client, a representative, an AV owner/controller, a service provider, a good supplier, a fleet manager, a logistics provider, a logistics supplier, a map provider, a third party, or a combination thereof.

A conveyance client preference can be one or more preferences related to pricing, elevated pricing, geographical location, distance, route, service duration, beginning service geographical location, ending service geographical location, time, predictive, historical, efficiency, event inclusion, event exclusion, traffic-based, road condition, weather condition, duration of conveyance service, conveyance service offering density, representative detail, representative rating, representative density, conveyance client density, service provider inclusion, service provider exclusion, service provider density, level of service, good supplier inclusion, a good supplier exclusion, good supplier density, good detail, conveyance industry segment, freight, waypoint, delivery service, oldest outstanding offering, or a combination thereof.

The conveyance client preferences may also be preferences relating to transportation, route planning, fuel economy, battery longevity, vehicle capacity, vehicle diagnostic, conveyance data, conveyance client detail, conveyance client rating, AV density, service provider, good supplier, AV owner/controller, AV owner/controller density, fleet manager, fleet manager density, logistics provider, logistics provider density, logistics supplier, logistics supplier density, conveyance industry segment, or a combination thereof.

If a price preference is selected as a conveyance client preference, then a conveyance service offering without elevated pricing can be identified as a preferred conveyance service offering. If a level of service preference is selected, then a conveyance service offering with a higher quality of service such as "white glove services" or luxury services can be identified as a preferred conveyance service offering. If a price preference is selected, then a conveyance service offering priced lower than a set maximum price can be identified as a preferred conveyance service offering for a conveyance client.

If a representative rating preference is selected, then a conveyance service offering from a representative with a rating greater than or equal to a set minimum rating can be identified as a preferred conveyance service offering. When an individual conveyance client preference has an unequal weight, a pricing preference can have 90% weight and a service provider inclusion preference can have 10% weight which can be used to identify a preferred conveyance service offering when determining which a filtered conveyance service offering has a highest weighted average. For example, if an additional conveyance client preference were added to a first conveyance client preference, a weight of a conveyance client preference would sum to 100%.

A conveyance client preference can be transmitted between or from an application to an external server by way of a link between an application and an external server.

A conveyance client preference can be associated with a database, a database query, a database table, or a database result set. A database query can include or be associated with a conveyance client preference. A conveyance client preference can be related to or associated with another a conveyance client preference. A conveyance client preference can be used to retrieve data from database. A conveyance client preference can be an internal part of a central server. A conveyance client preference can be in a form or a format relating to a SQL parameter, or a variable. For example, conveyance client preferences can be used multiple times during a process of filtering and/or identifying a preferred conveyance service offering for or with a conveyance client. A conveyance client preference can be used with or within a conditional statement, a conditional expression, or a conditional construct. A conveyance client preference can be used for altering a control flow based on a condition.

A conveyance client preference can have or be associated with a different set of preferences or a different set of parameters that can be used to filter and identify a preferred conveyance service offering, a filtered conveyance service offering, a conveyance service offering, or a combination thereof. Some conveyance client preferences can be more relevant than other conveyance client preferences when a central server filters and/or identifies a preferred conveyance service offering, a filtered conveyance service offering, a conveyance service offering, or a combination thereof. A conveyance client preference can be used for filtering a conveyance service offering in a food delivery industry segment and a different conveyance client preference can be used for filtering a conveyance service offering in a ride-hail industry segment.

Anytime a conveyance service offering is going through a process to become filtered or identified as preferred, all or some of conveyance data relating to a conveyance client can go through a same or a similar process. A conveyance client preference can use a sensor data from a vehicle to evaluate and secure a preferred conveyance service offering with or for a conveyance client. A conveyance client preference can use a sensor data to identify if an AV has enough battery to perform a conveyance service.

A transportation preference can be a parameter or a rule that can identify a conveyance service preference. A transportation preference can identify a conveyance service offering that requires handicap assistance. A transportation preference can identify a conveyance service offering that requires a luxury vehicle. An efficiency preference can be a parameter or a rule that can optimize vehicle utilization. A conveyance client preference can be stored or cached in a database table. A conveyance client preference can be stored or cached in a database that a central server, an external server, an application, or a combination thereof, can connect to or be associated with.

A predictive preference can be identified or learned over time based on a pattern relating to a conveyance service offering, all or some of conveyance data relating to a conveyance client, a conveyance client, a representative, an AV, an AV owner/controller, a service provider, a good supplier, a fleet manager, a logistics provider, a logistics supplier, a map provider, a third party, or a combination thereof.

A time preference can relate to a time range, a pick-up time, a drop-off time, a pre-scheduled time, during a time of a day, a time of a week, a time of a month, a time of a year, or a combination thereof. A conveyance client detail preference can be a route preference provided by a conveyance client, an application, a central server, an external server, a third party, a map provider, or a combination thereof. A route planning preference can identify a route that can avoid toll roads. A route planning preference can identify an optimal navigational route that can aid in identifying a preferred conveyance service offering.

A route preference can be utilized to identify a historical route, a specific route, a favored route, an area, a specific location, or pricing information. A route preference can be learned over time to avoid traffic congestion on Highway Interstate 5 around 5 PM during the week. A route preference can be to avoid a road, a street, a highway, or a neighborhood that a conveyance client or a recipient of a conveyance service prefers.

A level of service preference can be displayed as an icon or a visual with or on the visual representation to allow a selection of different levels of service that a representative, an AV, a service provider, or a good supplier can provide.

A level of service preference can be displayed on or with a visual representation to identify different levels of service that an AV owner/controller, a service provider, a good supplier, a fleet manager, a logistics provider, a logistics supplier, a map provider, a third party, a representative, an AV, or a conveyance client can provide or receive. A level of service preference can be displayed as an icon with or on a visual representation to allow a selection of different levels of service that a representative, an AV, a conveyance client, a service provider, a good supplier, a fleet manager, an AV owner/controller, a logistics provider, a logistics supplier, a map provider, or a third party can provide or receive. A conveyance client preference can be related to a scooter, a scooter service, a bicycle, or a bicycle service.

A level of service preference can be displayed on a dynamic map to identify different levels of service that a representative, an AV, a conveyance client, a service provider, a good supplier, a fleet manager, an AV owner/controller, a logistics provider, a logistics supplier, a map provider, or a third party can provide or receive. A representative, an AV, a conveyance client, a service provider, a good supplier, a fleet manager, an AV owner/controller, a logistics provider, a logistics supplier, a map provider, a third party, or a combination thereof, can be displayed on or with a dynamic map that can display a level of service preference and can be represented by a mobile or transitory icon.

A conveyance client preference can be a good supplier preference that can enable a good supplier to rush or advance a current or a future conveyance service offering. A conveyance client preference or a preference of a recipient of a conveyance service, can be compared to or with a representative preference, to identify a match and secure a preferred conveyance service offering for or with a conveyance client.

A conveyance client preference can have or relate to a cultural trait that can impact a match between a conveyance client and a preferred conveyance service offering. A conveyance client preference can have or relate to a cultural trait that can impact all or some of a conveyance service offering. For example, Americans may prefer to have a conveyance client preference with a shorter estimated time of arrival compared to Canadians.

A capacity preference can identify a maximum number of passengers or goods in a vehicle or an AV. A conveyance client can utilize a preference to specify if a conveyance client prefers an AV or a representative. A conveyance client preference can be at least carpool preference. A conveyance client preference can be used to identify a conveyance client or a group of a conveyance client that can be pooled together for a conveyance service to an ending service geographical location. A conveyance client preference can relate to safety for example, a vehicle being handicap friendly.

A delivery service preference can be to filter out deliveries that can add more than 10 minutes to total travel time. A delivery service preference can specify a dimension for a good or item. A delivery service preference can be used to identify a representative or a vehicle with a specific feature relating to a good or item delivery. A delivery service preference can be used to identify a pre-scheduled conveyance service offering or a pre-scheduled representative.

A central server or an application can use or apply a second conveyance client preference and a process can optionally be referred to or seen as an additional level of filtering. A central server or an application can filter conveyance service offerings using a two-step process to first filter conveyance service offerings based on a conveyance client preference and then filter a subset of conveyance service offerings based on a different conveyance client preference.

A conveyance client preference can be transmitted to or uploaded to an external server. A conveyance client preference can be utilized for pre-filtering conveyance service offerings on or at an external server, a central server, an application, or a combination thereof. A conveyance client preference can be used for an individual conveyance industry segment. A conveyance client preference can be used for an individual service provider, or a map provider.

A conveyance client preference, once inputted or provided into an application, can be stored or cached on an application, a computer readable memory of a central server, or a combination thereof, and a conveyance client preference is not inputted or provided again into an application by a conveyance client. A conveyance client preference can be stored or cached in a computer readable memory of a central server and a conveyance client preference is not transmitted again from an application to a central server. A conveyance client preference, a real time or near real time geographical location of a conveyance client, or a combination thereof, can be transmitted from an application to a central server at any time prior to filtering a conveyance service offering.

A conveyance client preference can be the same or similar to a representative preference. A conveyance client preference can be the same or have similar logic as a representative preference.

Geographical Location: The following are illustrative, non-limiting examples of a "geographical location" as used in the present disclosure A geographical location of a conveyance client can be a geographical location, a coordinate, a position, or a place where a conveyance client can be at any given point in time. A geographical location of a conveyance client, a representative, an AV, a service provider, a good supplier, or a combination thereof, can be in real time, near real time, static, or non-real time.

A geographical location of any individual person, machine, entity, or a combination thereof, can be related to or have a longitude and a latitude in a decimal point or format. A geographical location of any individual person, machine, entity, or a combination thereof, can be related to or have a longitude and a latitude in a database with a decimal point or format. A geographical location of any individual person, machine, entity, or a combination thereof, can be related to or have a longitude and a latitude in a different decimal point or format. A geographical location of any individual person, machine, entity, or a combination thereof, can be related to or have a longitude and a latitude in a database with a different decimal point or format.

A geographical location of a representative, an AV, a conveyance client, a service provider, a good supplier, a fleet manager, an AV owner/controller, a logistics provider, a logistics supplier, or a combination thereof, can have or utilize a variable precision, that can be standardized in a uniform format. Due to many different systems and methods of coding a geographical location, a variable precision can be preferred to standardize a geographical location. Due to many different systems and methods of coding a real time or near real time geographical location of a conveyance client, a variable precision can be preferred to standardize a digit or a decimal.

A geographical location of a representative can be a geographical location, a coordinate, a position, or a place where a representative can be at any given point in time. A geographical location of an AV can be a geographical location, a coordinate, a position, or a place where an AV can be at any given point in time. A geographical location of a service provider can be a geographical location, a coordinate, a position, or a place where a service provider can be at any given point in time. A geographical location of a good supplier can be a geographical location, a coordinate, a position, or a place where a good supplier can be at any given point in time.

A geographical location of a conveyance client, a representative, an AV, a service provider, a good supplier, a fleet manager, an AV owner/controller, a logistics provider, a logistics supplier, a third party, a map provider, or a combination thereof, can be displayed on a visual representation.

A geographical location of any individual person, machine, entity, or a combination thereof, can be updated or refreshed in real time or near real time and can refer to being updated or refreshed in the highest level of development or state of the art. A geographical location of any individual person, machine, entity, or a combination thereof, can be used to perform a function in real time or near real time being updated or refreshed in the highest level of development or state of the art. A geographical location can be pre-set on one or more of a central server, an external server, an application, a visual representation, or a combination thereof. A geographical location of a conveyance client, a representative, an AV, a service provider, a good supplier, or a combination thereof, can relate to a service provider.

When a geographical location of any individual person, machine, entity, or a combination thereof, is considered, a geographical location of a representative, an AV, a conveyance client, a service provider, a good supplier, a fleet manager, an AV owner/controller, a logistics provider, a logistics supplier, a third party, or a map provider can also be considered.

A geographical location of a conveyance client, a representative, an AV, a service provider and/or a good supplier can be used for respective density preferences. A geographical location of a conveyance client, a representative, an AV, a service provider, a good supplier, or a combination thereof, can be used for a dynamic map. A geographical location of a conveyance client, a representative, an AV, a service provider, a good supplier, or a combination thereof, can be used for a heat map. A geographical location of a conveyance client, a representative, an AV, a service provider, a good supplier, or a combination thereof, can relate to an individual service provider operating in an individual conveyance industry segment.

A geographical location of a conveyance client, a representative, an AV, a service provider, a good supplier, or a combination thereof, can be static or non-real time. A geographical location of a good supplier can be static or non-real time as it can relate to a brick-and-mortar geographical location.

A geographical location of any individual person, machine, entity, or a combination thereof, can be sourced or provided from three external servers, and can be associated with or have a longitude and a latitude in a database table with a different decimal point or format that can be standardized to have a similar decimal point or format. A geographical location of a representative, an AV, a conveyance client, a service provider, a good supplier, a fleet manager, an AV owner/controller, a logistics provider, a logistics supplier, a third party, a map provider, or a combination thereof, can have or be associated with a variable precision, that can be standardized in a uniform format.

A geographical location of an individual person, an individual machine, an individual entity, a representative, an AV, a conveyance client, a service provider, a good supplier, a fleet manager, an AV owner/controller, a logistics provider, a logistics supplier, a third party, a map provider, or a combination thereof, can have or be associated with a longitude and a latitude in a database table with a decimal point or format. A geographical location of an individual person, an individual machine, an individual entity, a representative, an AV, a conveyance client, a service provider, a good supplier, a fleet manager, an AV owner/controller, a logistics provider, a logistics supplier, a third party, a map provider, or a combination thereof, can have or be associated with a longitude and a latitude in a database table with a different decimal point or format.

Due to many different systems and methods of coding a geographical location of a representative, an AV, a conveyance client, a service provider, a good supplier, a fleet manager, an AV owner/controller, a logistics provider, a logistics supplier, a third party, a map provider, or a combination thereof, a variable precision is preferred to standardize a digit or a decimal.

Beginning Service Geographical Location: The following are illustrative, non-limiting examples of a "beginning service geographical location" as used in the present disclosure A beginning service geographical location can be a geographical location requested by a conveyance client or an entity where a conveyance service begins or is requested. A beginning service geographical location can be modified before and/or during a conveyance service, if utilizing a waypoint. A beginning service geographical location need not be a real time or near real time geographical location of a conveyance client. A beginning service geographical location can be updated or refreshed in real time or near real time and can refer to being updated or refreshed in the highest level of development or state of the art. A beginning service geographical location can be used to perform a function in real time or near real time being updated or refreshed in the highest level of development or state of the art. A beginning service geographical location can be pre-set or pre-determined on a central server, an external server, an application, or a combination thereof. A beginning service geographical location can be associated with a conveyance service request or a conveyance service offering.

A conveyance client can input or provide a beginning service geographical location into an application. A conveyance client can input or provide a beginning service geographical location into an application to find a conveyance service offering, a filtered conveyance service offering, a preferred conveyance service offering, or a combination thereof. A beginning service geographical location can be static or non-real time. A representative or an AV can pick up a conveyance client at a beginning service geographical location.

A beginning service geographical location can have or be associated with a waypoint. A beginning service geographical location can have or be associated with a waypoint, where a conveyance client can walk to a beginning service geographical location. A conveyance client can have or use two or multiple beginning service geographical locations including a waypoint, where a conveyance client can take a public bus from one beginning service geographical location to then be picked up by an AV from a second beginning service geographical location.

A beginning service geographical location can be at a future beginning service geographical location. A beginning service geographical location can used for or with an AV to create a conveyance service offering. A beginning service geographical location can be dynamic. A beginning service geographical location can be associated with latitude and longitude.

Ending Service Geographical Location: The following are illustrative, non-limiting examples of an "ending service geographical location" as used in the present disclosure An ending service geographical location can be a geographical location requested by a conveyance client or an entity where a conveyance service ends. An ending service geographical location can be modified before and/or during a conveyance service. An ending service geographical location can include a waypoint. An ending service geographical location can be updated or refreshed in real time or near real time and can refer to being updated or refreshed in the highest level of development or state of the art. An ending service geographical location can be used to perform a function in real time or near real time being updated or refreshed in the highest level of development or state of the art. An ending service geographical location can be pre-set or pre-determined on a central server, an external server, an application, or a combination thereof. An ending service geographical location can be associated with a conveyance service request or a conveyance service offering.

A conveyance client can input or provide an ending service geographical location into an application. A conveyance client can input or provide an ending service geographical location into an application to find a conveyance service offering, a filtered conveyance service offering, a preferred conveyance service offering, or a combination thereof. An ending service geographical location can be static or non-real time. A representative or an AV can drop off a conveyance client at an ending service geographical location.

An ending service geographical location can have or be associated with a waypoint, where a conveyance client can stop at a coffee shop prior to being dropped off at an ending service geographical location. An ending service geographical location can be at a future ending service geographical location. An ending service geographical location can used for or with an AV to create a conveyance service offering. An ending service geographical location can be dynamic. An ending service geographical location can be associated with latitude and longitude.

Conveyance Industry Segment: The following are illustrative, non-limiting examples of a "conveyance industry segment" as used in the present disclosure.

The conveyance industry can be an industry categorized by the transportation of someone or something from a geographical location to another geographical location. The conveyance industry can be an industry categorized by the transportation of someone or something from a geographical location to another geographical location in real time or near real time. A conveyance industry segment can be a smaller part of the overall conveyance industry as a whole, categorized by different limiting characteristics. A conveyance industry segment can be updated or refreshed in real time or near real time and can refer to being updated or refreshed in the highest level of development or state of the art.

A service provider, an AV owner/controller, a good supplier, a fleet manager, a logistics provider, a logistics supplier, an AV, a third party, a map provider, or a combination thereof, can operate in a conveyance industry segment. An AV owner/controller, a service provider, a good supplier, a fleet manager, a logistics provider, a logistics supplier, a third party, a map provider, or a combination thereof, can manage, control, or operate an AV or a representative in a conveyance industry segment. A conveyance service request or a conveyance service offering can be associated with a conveyance industry segment.

Conveyance industry segments that stand to benefit from the inventive approached describe herein include, but are not limited to, ride-hail, ride-share, car-share, a peer-to-peer, person delivery, taxi, item delivery, a good delivery, a freight, a medical service and delivery, food delivery, courier, an animal delivery, transportation, a mobility, or a combination thereof.

An individual service provider can operate within a single conveyance industry segment or in multiple industry segments. For example, by employing features of the present invention, a conveyance client can receive a ride back home in the ride-hail industry segment and order food to be delivered to their home more or less at the same time from a similar service provider.

The invention claimed is:

1. A platform for monitoring an autonomous vehicle (AV) performing a conveyance service for conveyance of a person or an object in response to conveyance service requests (CSRs) communicated to a network, wherein the AV is a self-governing machine that performs the conveyance service unaided by a human driver, the platform comprising:

one or more external server in communication with the network and configured to be a source of the CSRs, the one or more external server associated with a business entity that provides goods or services;

a central server in communication with the network, the central server configured for repeatedly receiving the CSRs from the one or more external server, the CSRs for conveyance from a first geographical location to at least one second geographical location, the CSRs comprising conveyance data comprising information relating to one or more of the person or the object to be conveyed in fulfillment of a client order, an estimated time of arrival, and a vehicle detail, wherein the CSRs are repeatedly updated;

an application in communication with the network, the application configured for receiving one or a combination of a business entity preference, geographical location data, and vehicle-related data;

a terminal in communication with the network, the terminal having an input device;

a display device associated with the terminal, the display device configured to display information associated with the conveyance service;

wherein one or a combination of the central server and the application is automated in whole or in part and further configured to standardize and aggregate at least a portion of the CSRs and after standardizing and aggregating:

(a) first filter, one or a combination of, in any order:

(i) at least a portion of the CSRs using a first combination of one or more of the business entity preference, the estimated time of arrival, the conveyance data, the vehicle-related data, and the geographical location data to identify a filtered subset of CSRs;

(ii) at least a portion of the vehicle-related data using the first combination to identify a filtered subset of vehicle-related data; and (iii) at least a portion of the geographical location data using the first combination to identify a filtered subset of geographical location data;

(b) second filter to identify a match between two or more of the filtered subset of CSRs, the CSRs, the filtered subset of geographical location data, the geographical location data, the vehicle-related data, and the filtered subset of vehicle-related data using a second combination of one or more of the business entity preference, the estimated time of arrival, the CSRs, the conveyance data, the vehicle-related data, and the geographical location data;

(c) secure the conveyance service associated with the match;

(d) determine a route from the first geographical location to the at least one second geographical location for the AV to perform the secured conveyance service and communicate instructions to the AV, wherein the instructions comprise the route;

(e) generate on the display device a visual representation, the visual representation comprising a map having superimposed thereon a vehicle marker associated with an AV location relative to the route; and (f) dynamically update a position of the vehicle marker on the map to display the AV location relative to the route;

wherein the AV receives the instructions via the network and follows the route to perform the secured conveyance service unaided by a human driver.

2. The platform of claim 1, wherein the conveyance service is one or a combination of services that support or provide transportation of the person, freight, or the object be conveyed.

3. The platform of claim 1, wherein the business entity comprises one or more of an entity that conveys goods or services, an entity that produces or supplies freight, an entity that provides transportation services, a courier, an AV owner, a goods supplier, a service provider, a dispatcher, a logistics provider, a broker, a freight provider, a fleet manager, and a map provider.

4. The platform of claim 1, wherein the AV comprises one or more of a wheeled vehicle, a delivery vehicle, a truck, a trailer, a train, an aircraft, a vessel, a transportation machine, and a space vehicle.

5. The platform of claim 1, wherein the application comprises one or a combination of a web application, a mobile application, a cloud application, a computer application, an application programming interface (API), a software as a service (SaaS), an application associated with the AV, a computer program, and system software.

6. The platform of claim 1, wherein one or a combination of the application and the central server is further configured to repeat steps (a) through (c) to optimize utilization of the AV by securing an additional conveyance service.

7. The platform of claim 1, wherein the business entity preference comprises an efficiency preference.

8. The platform of claim 1, wherein at least a portion of one or more of the CSRs, the vehicle-related data, and the geographical location data is pre-filtered, pre-standardized, or pre-categorized.

9. The platform of claim 1, wherein, prior to step (a), at least a portion of one or a combination of the CSRs, the estimated time of arrival, the vehicle detail, the business entity preference, the geographical location data, and the vehicle-related data is structured in a uniform format.

10. The platform of claim 1, wherein filtering in step (a) further comprises using a different geographical location.

11. The platform of claim 1, wherein the terminal is further configured to enable one of the client, a service provider, and the business entity to perform one or a combination of monitoring the estimated time of arrival associated with the conveyance service and navigating within an area of the visual representation.

12. The platform of claim 1, wherein the visual representation further comprises one or a combination of a geographical map, the estimated time of arrival, the conveyance data, the business entity, and a service provider.

13. The platform of claim 1, wherein at least one function of one or a combination of the central server and the application comprises using one of machine learning technology and blockchain technology.

14. The platform of claim 1, wherein the business entity preference comprises a vehicle capacity preference configured for optimizing utilization of the AV by managing a capacity level for the AV.

15. The platform of claim 1, wherein the application comprises a plurality of applications, wherein each application is associated with one or a combination of the AV, the client, a map provider, the business entity, and a service provider.

16. The platform of claim 1, wherein the visual representation is displayed within the AV.

17. The platform of claim 1, wherein the business entity comprises a first business entity associated with a service provider and a second business entity associated with one of a dispatcher, a fleet manager, and the AV.

18. The platform of claim 1, wherein the business entity comprises a first business entity associated with one of a dispatcher, the AV, and a fleet manager, and a second business entity associated with a service provider that supports the conveyance service.

19. The platform of claim 1, wherein the business entity comprises a first business entity associated with a map provider and a second business entity associated with one of a service provider, a dispatcher, and the AV that provides the conveyance service.

20. The platform of claim 1, wherein the business entity comprises a first business entity associated with one of a fleet manager and the AV, and a second business entity associated with a service provider that provides the conveyance service.

21. The platform of claim 1, wherein the display device further displays one or a combination of the map, the business entity preference, the secured conveyance service, an additional conveyance service, the estimated time of arrival, the vehicle detail, the vehicle marker, the route, the conveyance data, the business entity, a service provider, the client, a representative, and the CSRs.

22. The platform of claim 1, wherein the application is associated with one or a combination of the AV, an AV owner, the client, the business entity, a dispatcher, a service provider, a fleet manager, and a map provider.

23. The platform of claim 1, wherein the terminal comprises one or a combination of a computer, a smartphone, a tablet, a wearable device, a plugin, a computing device associated with the AV, a tracking device, an In-Vehicle device, a projecting device, a voice-controlled device, a network interface, a platform device, and an Internet of Things (IoT) device.

24. The platform of claim 1, wherein the terminal is associated with one or more of a geographical location module, an Inertial Measurement Unit (IMU), a different input device, the business entity, a service provider, the AV, the client, a computer processor, a computer readable memory, a remote display device, a network interface, and a sensor.

25. The platform of claim 1, wherein one or a combination of the central server and the application is further configured to secure one of the conveyance service and an additional conveyance service in response to a manual entry at the terminal.

26. The platform of claim 1, wherein, after one of the conveyance service and an additional conveyance service is secured, one or a combination of the central server and the application is further configured to generate one or more of an updated order, an updated visual representation, an updated estimated time of arrival, updated conveyance data, and an updated route.

27. The platform of claim 1, wherein one or a combination of the central server and the application is further configured to receive input from a dispatcher associated with one of the business entity, a service provider, and the AV to communicate or secure one of the conveyance service and an additional conveyance service.

28. A method using a platform within a network for monitoring an autonomous vehicle (AV) performing a conveyance service for conveyance of a person or an object in response to conveyance service requests (CSRs) communicated to a network, wherein the AV is a self-governing machine that performs the conveyance service unaided by a human driver, the method comprising:

(a) receiving within one or a combination of a central server and an application in communication with the network, one or a combination of, in any order:

(i) CSRs from one or more external server associated with a business entity that provides goods or services, the CSRs for conveyance from a first geographical location to at least one second geographical location, the CSRs comprising conveyance data, at least a portion of the conveyance data comprising information relating to one or more of the person or the object to be conveyed in fulfillment of a client order, an estimated time of arrival, and a vehicle detail, wherein the CSRs are repeatedly updated;

(ii) vehicle-related data;

(iii) geographical location data; and (iv) a business entity preference, the business entity preference provided via a terminal, the terminal having an input device and associated with a display device;

(b) processing at least a portion of one or a combination of the CSRs, the business entity preference, the conveyance data, the geographical location data, and the vehicle-related data by:

(i) standardizing and aggregating at least a portion of the CSRs;

(ii) first filtering, in any order, at least a portion of one or a combination of the CSRs, the business entity preference, the estimated time of arrival, the conveyance data, the geographical location data, and the vehicle-related data to identify one or more of:

(a) a filtered subset of CSRs using a first combination of one or more of the business entity preference, the estimated time of arrival, the conveyance data, the vehicle-related data, and the geographical location data;

(b) a filtered subset of vehicle-related data using the first combination; and (c) a filtered subset of geographical location data using the first combination; and (iii) second filtering to identify a match between two or more of the filtered subset of CSRs, the CSRs, the filtered subset of geographical location data, the geographical location data, the vehicle-related data, and the filtered subset of vehicle-related data using a second combination of one or more of the business entity preference, the estimated time of arrival, the CSRs, the conveyance data, the vehicle-related data, and the geographical location data;

(c) securing the conveyance service associated with the match;

(d) determining a route from the first geographical location to the at least one second geographical location for the AV to perform the secured conveyance service and communicate instructions to the AV, wherein the instructions comprise the route;

(e) generating on the display device a visual representation, the visual representation comprising a map having superimposed thereon a vehicle marker associated with an AV location relative to the route; and (f) dynamically updating a position of the vehicle marker on the map to display the AV location relative to the route;

wherein the AV receives the instructions via the network and follows the route to perform the secured conveyance service unaided by a human driver.

29. The method of claim 28, wherein the conveyance service is one or a combination of services that support or provide transportation of the person, freight, or the object be conveyed.

30. The method of claim 28, wherein the business entity comprises one or more of an entity that conveys goods or services, an entity that produces or supplies freight, an entity that provides transportation services, a courier, an AV owner, a goods supplier, a service provider, a dispatcher, a logistics provider, a broker, a freight provider, a fleet manager, and a map provider.

31. The method of claim 28, wherein the AV comprises one or more of a wheeled vehicle, a delivery vehicle, a truck, a trailer, a train, an aircraft, a vessel, a transportation machine, and a space vehicle.

32. The method of claim 28, wherein the application comprises one or a combination of a web application, a mobile application, a cloud application, a computer application, an application programming interface (API), a software as a service (SaaS), an application associated with the AV, a computer program, and system software.

33. The method of claim 28, wherein one or a combination of the application and the central server is further configured to repeat steps (a) through (c) to optimize utilization of the AV by securing an additional conveyance service.

34. The method of claim 28, wherein one or more of steps (a) through (f) comprises using one of machine learning technology and blockchain technology.

35. The method of claim 28, wherein at least a portion of one or more of the CSRs, the conveyance data, the vehicle-related data, and the geographical location data is pre-filtered, pre-standardized, or pre-categorized.

36. The method of claim 28, wherein, prior to step (a), at least a portion of one or a combination of the CSRs, the estimated time of arrival, the vehicle detail, the business entity preference, the geographical location data, and the vehicle-related data is structured in a uniform format.

37. The method of claim 28, wherein filtering in step (b) (ii) further comprises using a different geographical location.

38. The method of claim 28, wherein the terminal is further configured to enable one of the client, a service provider, and the business entity to perform one or a combination of monitor the estimated time of arrival associated with the conveyance service and navigate within an area of the visual representation.

39. The method of claim 28, wherein the visual representation further comprises one or a combination of a geographical map, the estimated time of arrival, the conveyance data, the business entity, and a service provider.

40. The method of claim 28, wherein the business entity preference comprises an efficiency preference.

41. The method of claim 28, wherein the business entity preference comprises a vehicle capacity preference configured for optimizing utilization of the AV by managing a capacity level for the AV.

42. The method of claim 28, wherein the application comprises a plurality of applications, wherein each application is associated with one or a combination of the AV, the client, a map provider, the business entity, and a service provider.

43. The method of claim 28, wherein the visual representation is displayed within the AV.

44. The method of claim 28, wherein the business entity comprises a first business entity associated with a service provider and a second business entity associated with one of a dispatcher, a fleet manager, and the AV.

45. The method of claim 28, wherein the business entity comprises a first business entity associated with one of a dispatcher, the AV, and a fleet manager, and a second business entity associated with a service provider that supports the conveyance service.

46. The method of claim 28, wherein the business entity comprises a first business entity associated with a map provider and a second business entity associated with one of a service provider, a dispatcher, and the AV that provides the conveyance service.

47. The method of claim 28, wherein the business entity comprises a first business entity associated with one of a fleet manager and the AV, and a second business entity associated with a service provider that provides the conveyance service.

48. The method of claim 28, wherein the display device further displays one or a combination of the map, the business entity preference, the secured conveyance service, an additional conveyance service, the estimated time of arrival, the vehicle detail, the vehicle marker, the route, the conveyance data, the business entity, a service provider, the client, a representative, and the CSRs.

49. The method of claim 28, wherein the application is associated with one or a combination of the AV, an AV owner, the client, a representative, the business entity, a dispatcher, a service provider, a fleet manager, and a map provider.

50. The method of claim 28, wherein the terminal comprises one or a combination of a computer, a smartphone, a tablet, a wearable device, a plugin, a computing device associated with the AV, a tracking device, an In-Vehicle device, a projecting device, a voice-controlled device, a network interface, a platform device, and an Internet of Things (IoT) device.

51. The method of claim 28, wherein the terminal is associated with one or more of a geographical location module, an Inertial Measurement Unit (IMU), a different input device, the business entity, a service provider, the AV, the client, a computer processor, a computer readable memory, a remote display device, a network interface, and a sensor.

52. The method of claim 28, wherein one or a combination of the central server and the application is further configured to secure one of the conveyance service and an additional conveyance service in response to a manual entry at the terminal.

53. The method of claim 28, wherein, after one of the conveyance service and an additional conveyance service is secured, one or a combination of the central server and the application is further configured to generate one or more of an updated order, an updated visual representation, an updated estimated time of arrival, updated conveyance data, and an updated route.

54. The method of claim 28, wherein one or a combination of the central server and the application is further configured to receive input from a dispatcher associated with one of the business entity, a service provider, and the AV to communicate or secure one of the conveyance service and an additional conveyance service.

\* \* \* \* \*